(12) United States Patent
Gao et al.

(10) Patent No.: US 11,370,921 B2
(45) Date of Patent: *Jun. 28, 2022

(54) REACTIVE DYE COMPOUND AND PREPARATION METHOD AND APPLICATION THEREOF

(71) Applicants: Zhejiang Keyong Chemical Co., Ltd., Zhejiang (CN); Shanghai Kehua Dyestuff Industry Co., Ltd., Shanghai (CN)

(72) Inventors: Huaiqing Gao, Zhejiang (CN); Yaoyao He, Zhejiang (CN); Zhuan Wang, Zhejiang (CN); Renliang Wang, Zhejiang (CN); Yuanzhi Guo, Zhejiang (CN); Haibin Zhang, Zhejiang (CN); Weizhang Chen, Zhejiang (CN)

(73) Assignee: Shanghai Kehua Dyestuff Industry Co., Ltd., Shanghai (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/632,182

(22) PCT Filed: Jul. 30, 2018

(86) PCT No.: PCT/CN2018/097755
§ 371 (c)(1),
(2) Date: Jan. 17, 2020

(87) PCT Pub. No.: WO2019/020123
PCT Pub. Date: Jan. 31, 2019

(65) Prior Publication Data
US 2020/0231819 A1    Jul. 23, 2020

(30) Foreign Application Priority Data

Jul. 28, 2017   (CN) .......................... 201710632964.1

(51) Int. Cl.
*C09B 62/513*      (2006.01)
*C09B 67/36*       (2006.01)
(Continued)

(52) U.S. Cl.
CPC ........ *C09B 62/513* (2013.01); *C09B 67/0079* (2013.01); *D06P 1/384* (2013.01); *D06P 3/666* (2013.01)

(58) Field of Classification Search
CPC .......................... C09B 62/513; C09B 67/0079
See application file for complete search history.

(56) References Cited

U.S. PATENT DOCUMENTS

| 10,954,392 | B2 * | 3/2021 | Wang | .......................... D06P 3/24 |
| 2020/0283634 | A1 * | 9/2020 | Wang | .......................... D06P 3/66 |

FOREIGN PATENT DOCUMENTS

| CN | 1781996 A | | 6/2006 |
| CN | 103205137 A | * | 7/2013 |

(Continued)

OTHER PUBLICATIONS

Wang et al. CN-107501997-A English machine translation obtained online from https://patentscope.wipo.int (downloaded on Jul. 3, 2021). (Year: 2021).*

*Primary Examiner* — Amanda L. Aguirre
(74) *Attorney, Agent, or Firm* — Muncy, Geissler, Olds & Lowe, P.C.

(57) ABSTRACT

A reactive dye compound and preparation method and application for printing and dyeing of cellulosic fibers, polyamide fibers and fabrics thereof. Formula (I) is the dye compound structure where $D^1$ and $D^2$ are each independently the group of the following formula (a) or (b) or (c), and $D^1$ and $D^2$ are not simultaneously selected from the following formula (a). $R^1$, $R^2$, $R^4$, $R^5$, $R^7$ and $R^8$ are each independently H, linear or branched $C_1$~$C_4$ alkyl, $C_1$~$C_4$ alkoxy or sulfo; m=0-3. Each $R^3$ is independently selected from amino, sulfo, ureido, $C_1$~$C_4$ alkyl, $C_1$~$C_4$ alkanoylamino or $C_1$~$C_4$ alkoxy, n=0-3, and each $R^6$ is independently selected from hydroxyl, amino and sulfo. $X^1$, $X^2$ and $X^3$ are each independently H, $C_1$~$C_4$ alkyl, $C_1$~$C_4$ alkoxy, —$SO_2Y^1$, —$NHCO(CH_2)_pSO_2Y^2$ or —$CONH(CH_2)_q SO_2Y^3$, and at least one of $D^1$ and $D^2$ contains a fiber-reactive group. $Y^1$~$Y^3$ are each independently —CH=$CH_2$, —$C_2H_4OSO_3H$ or —$CH_2CH_2Cl$, p=1-3, and q=1-3.

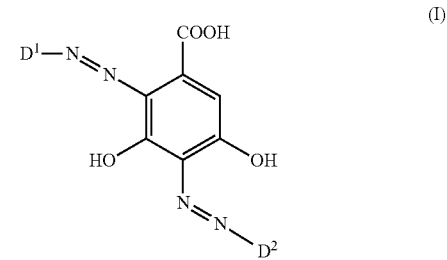

(I)

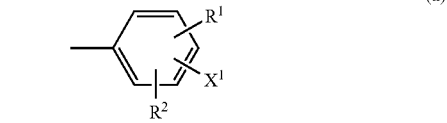

(a)

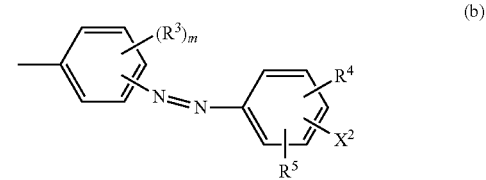

(b)

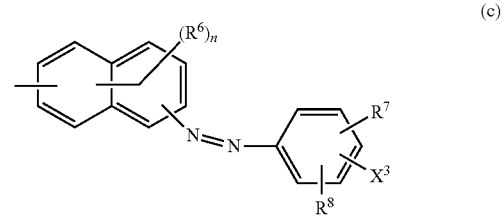

(c)

19 Claims, 5 Drawing Sheets

(51) Int. Cl.
*D06P 1/384* (2006.01)
*D06P 3/66* (2006.01)

(56) References Cited

FOREIGN PATENT DOCUMENTS

| CN | 103205137 | A |   | 7/2013  |         |           |
|----|-----------|---|---|---------|---------|-----------|
| CN | 104755561 | A |   | 7/2015  |         |           |
| CN | 107501995 | A |   | 12/2017 |         |           |
| CN | 107501997 | A | * | 12/2017 | ......... | C09B 67/0059 |

* cited by examiner

REACTIVE DYE COMPOUND AND PREPARATION METHOD AND APPLICATION THEREOF

TECHNICAL FIELD

The present invention relates to reactive dye compounds, in particular to reactive dye compounds and their preparation method and application in printing and dyeing of cellulosic fibers, polyamide fibers and fabrics thereof.

BACKGROUND ART

Improving the build-up and washing fastness of reactive dye-dyed fabrics has always been the focus and difficulty in print and dye production. Covalent bonds between some reactive dyes and cotton fibers are affected by external conditions and prone to being broken and hydrolysis, which causes deterioration of fastness of the dyed fabrics, particularly the washing fastness cannot meet the requirements of production. In order to solve the above problems, the inventors developed a new reactive dye structure, used 3,5-dihydroxybenzoic acid as a coupling component, carried out intensive research on the compounds, and obtained orange to reddish brown dyes with excellent properties such as good fastness and build-up on the basis of a large number of experiments.

SUMMARY OF THE INVENTION

The object of the present invention is to provide reactive dye compounds with novel structure and excellent performance, their preparation method and application in printing and dyeing of cellulose fibers, polyamide fibers and fabrics thereof, the dyes have good build-up, clear remanent dyeing liquor; excellent staining fastness to washing and good fiber-bonding stability, and can meet the requirements of conventional dyeing and printing of cotton, rayon, silk, viscose, wool and blended fabrics thereof.

The technical solution adopted by the present invention is specifically described as follows.

The present invention provides a reactive dye compound of formula (I):

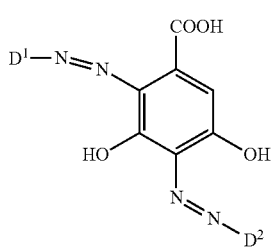

(I)

in formula (I):

$D^1$ and $D^2$ are each independently the group of the following formula (a) or (b) or (c), and $D^1$ and $D^2$ are not simultaneously selected from the following formula (a):

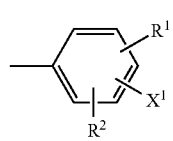

(a)

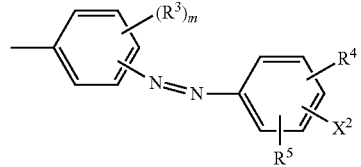

(b)

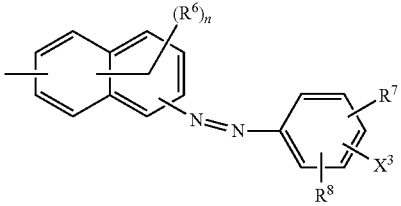

(c)

in the above formulae (a)~(c): $R^1$, $R^2$, $R^4$, $R^5$, $R^7$ and $R^8$ are each independently H, linear or branched $C_1$~$C_4$ alkyl, $C_1$~$C_4$ alkoxy or sulfo; m=0-3, and each $R^3$ is independently selected from the group consisting of amino, sulfo, ureido, $C_1$~$C_4$ alkyl, $C_1$~$C_4$ alkanoylamino and $C_1$~$C_4$ alkoxy; n=0-3, and each $R^6$ is independently selected from the group consisting of hydroxyl, amino and sulfo; $X^1$, $X^2$ and $X^3$ are each independently H, linear or branched $C_1$~$C_4$ alkyl, $C_1$~$C_4$ alkoxy, —$SO_2Y^1$, —NHCO($CH_2$)$_p$$SO_2Y^2$ or —CONH($CH_2$)$_q$$SO_2Y^3$, and at least one of $D^1$ and $D^2$ contains a fiber-reactive group which is —$SO_2Y^1$, —NHCO($CH_2$)$_p$$SO_2Y^2$ or —CONH($CH_2$)$_q$$SO_2Y^3$, wherein $Y^1$~$Y^3$ are each independently —CH=$CH_2$, —$C_2H_4OSO_3H$ or —$CH_2CH_2Cl$, p=1-3, and q=1-3.

In the present invention, the linear or branched $C_1$~$C_4$ alkyl can be methyl, ethyl, n-propyl, isopropyl, n-butyl, isobutyl, t-butyl, etc.; the $C_1$~$C_4$ alkoxy can be methoxy, ethoxy, n-propoxy, isopropoxy, n-butoxy, isobutoxy, t-butoxy, etc.; the $C_1$~$C_4$ alkanoylamino can be formylamino, acetylamino, n-propionylamino, isopropionylamino, n-butyrylamino, isobutyrylamino, tert-butyrylamino, etc.

Preferably, the reactive dye compound is shown as the following formula (IA):

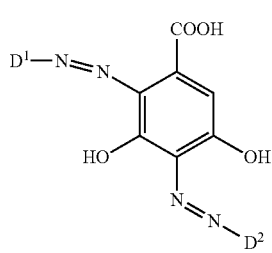

(IA)

in formula (IA):

$D^1$ and $D^2$ are each independently the group of the following formula (a) or (b) or (c), and $D^1$ and $D^2$ are not simultaneously selected from the following formula (a):

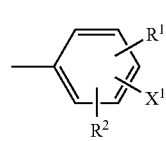

(a)

(b)

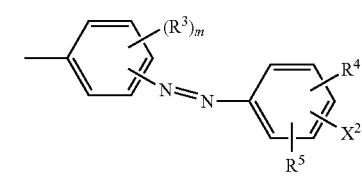

(c)

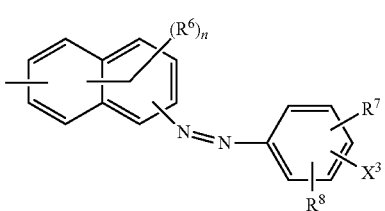

in the above formulae (a), (b) and (c): $R^1$, $R^2$, $R^4$, $R^5$, $R^7$ and $R^8$ are each independently H, linear or branched $C_1$~$C_4$ alkyl, $C_1$~$C_4$ alkoxy or sulfo; m=0-3, and each $R^3$ is independently selected from the group consisting of sulfo, ureido, or $C_1$~$C_4$ alkanoylamino; n=0-3, and each $R^6$ is independently selected from hydroxyl or sulfo; $X^1$, $X^2$ and $X^3$ are each independently —$SO_2Y^1$, —$NHCO(CH_2)_p SO_2Y^2$ or —$CONH(CH_2)_qSO_2Y^3$, wherein $Y^1$~$Y^3$ are each independently —CH=$CH_2$, —$C_2H_4OSO_3H$ or —$CH_2CH_2Cl$, p=1-3, and q=1-3.

Further, $D^1$ is preferably a group of formula (a), and $D^2$ is preferably a group of formula (b) or formula (c).

Even further, the reactive dye compound is represented by the following formula (IAa):

(IAa)

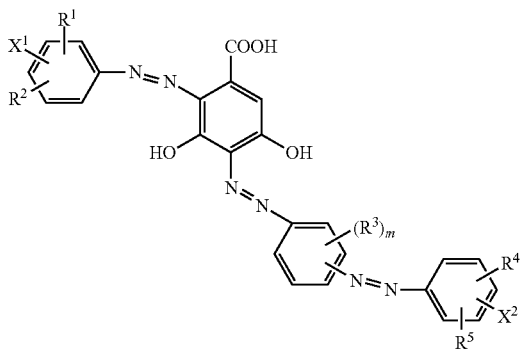

each substituent of formula (IAa) has the same definition as that of formula (IA).

Further, $R^1$, $R^2$, $R^4$, $R^5$, $R^7$ and $R^8$ of the reactive dye compound are each independently preferably H, methyl, methoxy or sulfo.

Further, in the group represented by formula (b) of the reactive dye compound, preferably m is 1 or 2, and each $R^3$ is independently methyl, sulfo, ureido, or acetylamino.

Even further, $D^1$ of the reactive dye compound is preferably selected from the group consisting of the following groups:

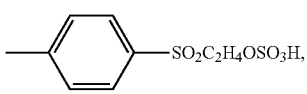

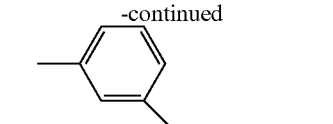

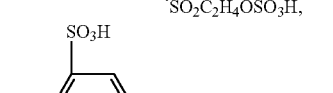

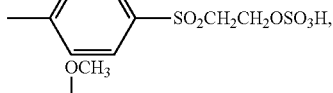

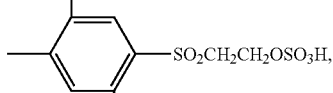

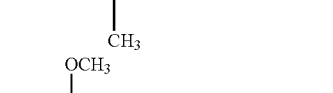

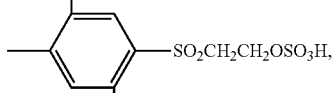

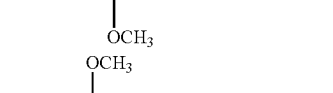

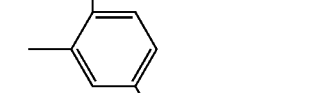

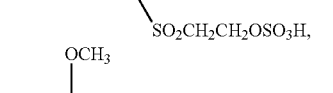

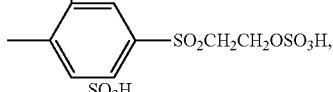

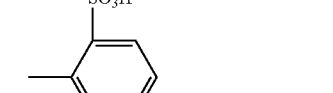

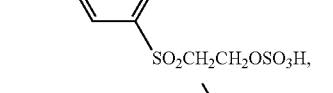

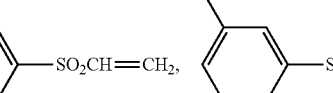

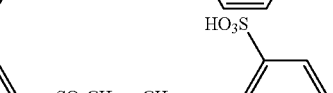

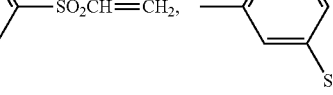

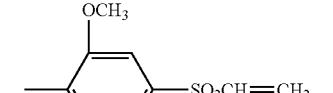

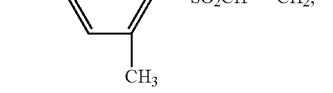

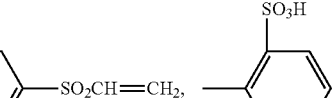

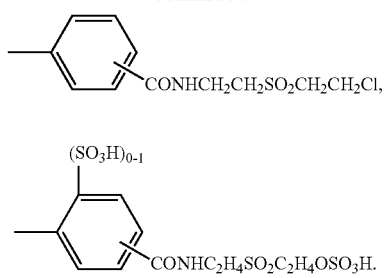
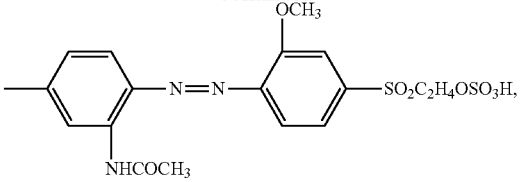
Even further, $D^2$ of the reactive dye compound is preferably selected from the group consisting of the following groups:
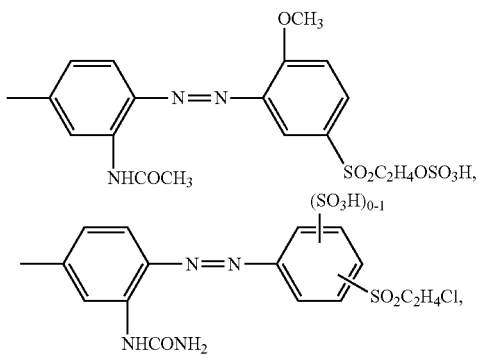
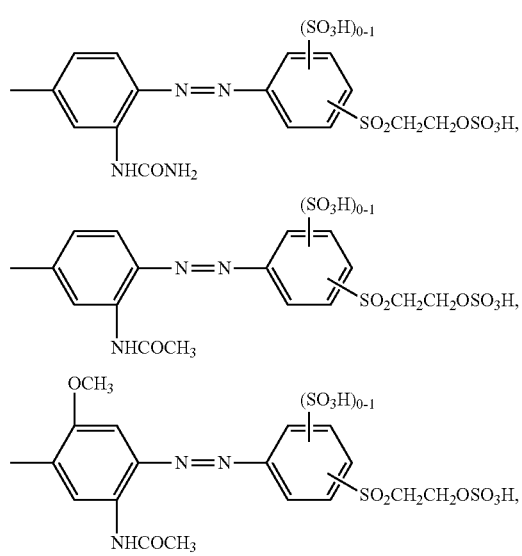
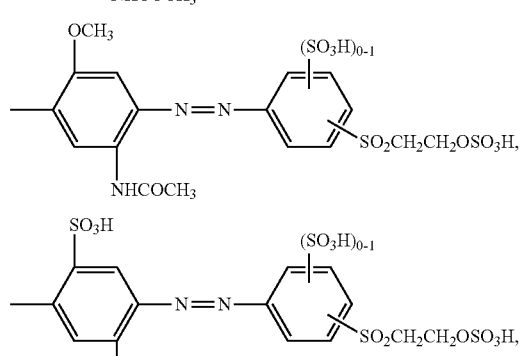
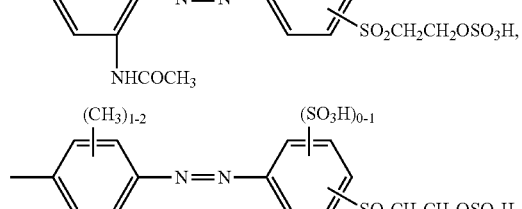
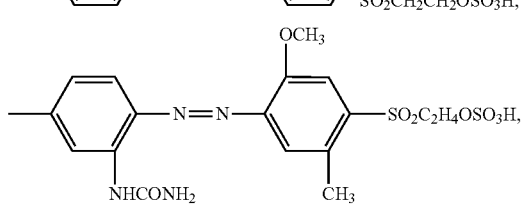
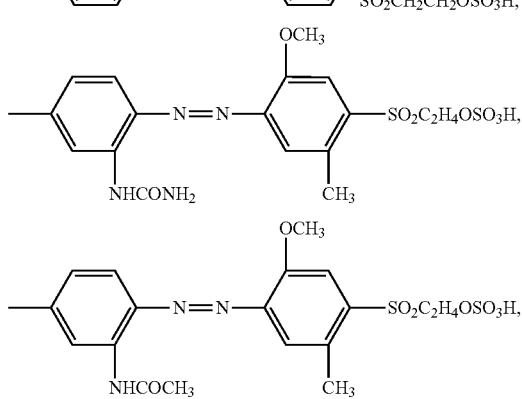
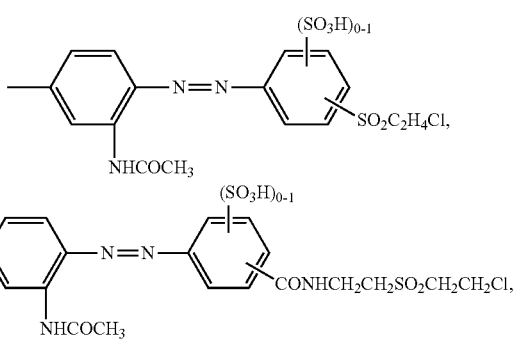
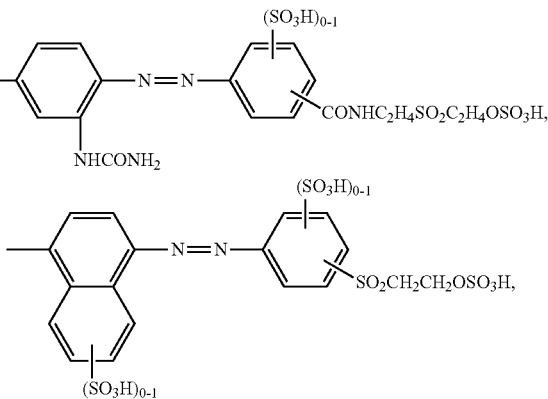

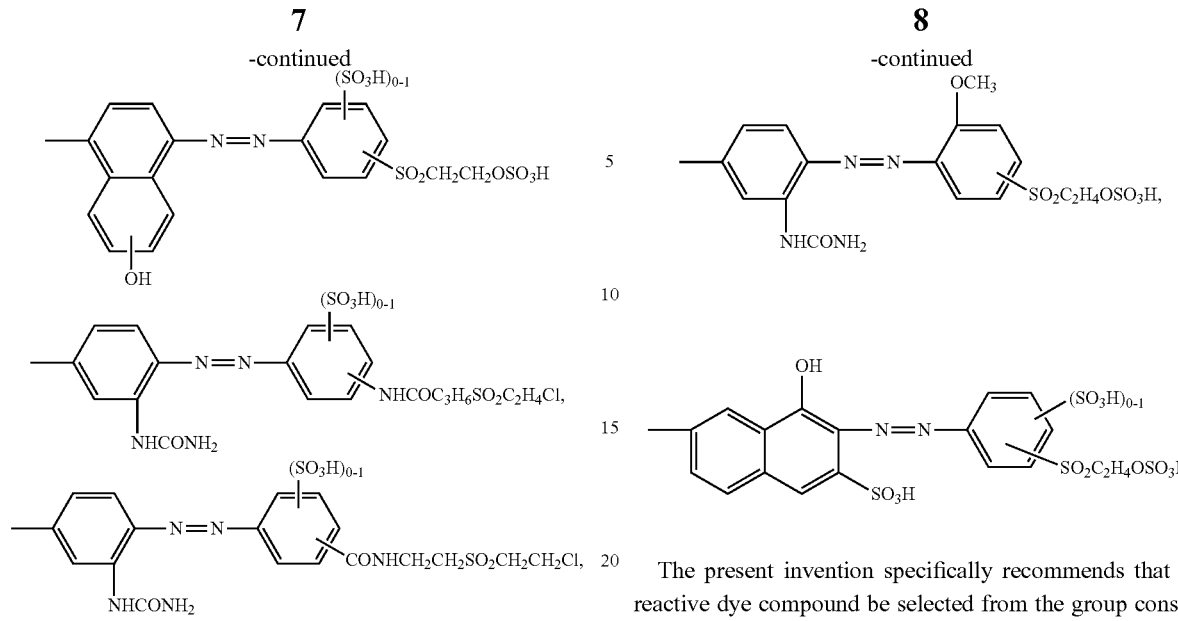
The present invention specifically recommends that the reactive dye compound be selected from the group consisting of the following structures:
(I-1)
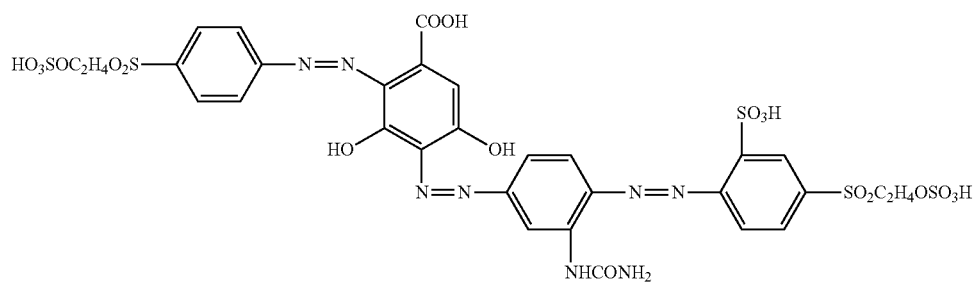
(I-2)
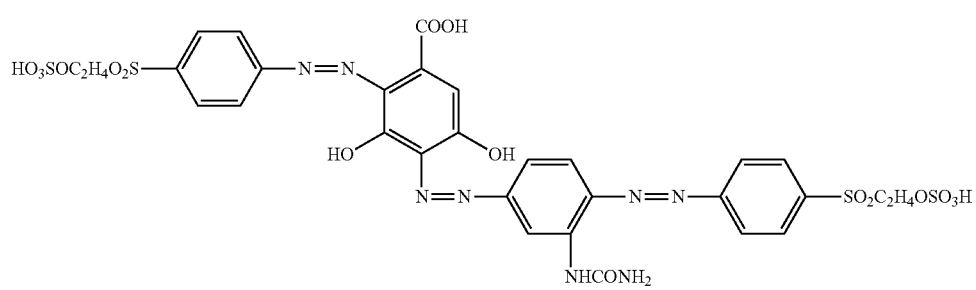
(I-3)
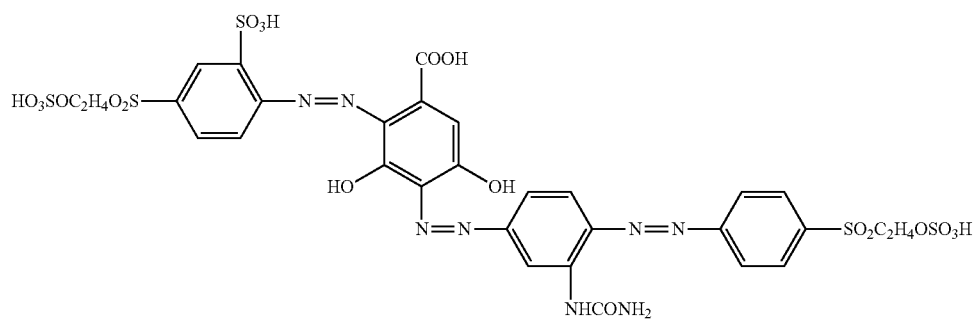

-continued
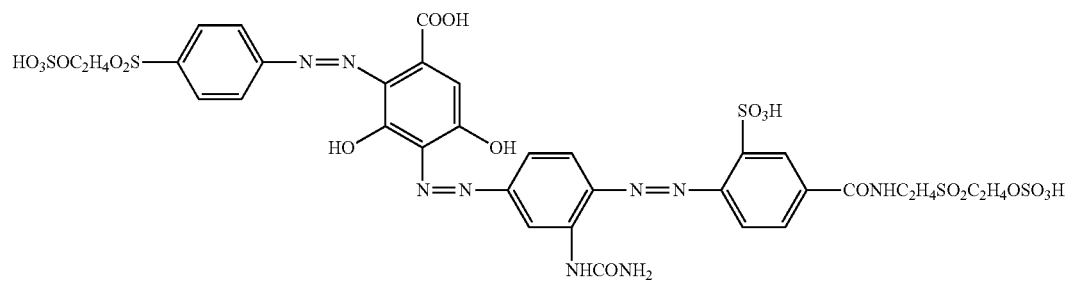
(I-4)
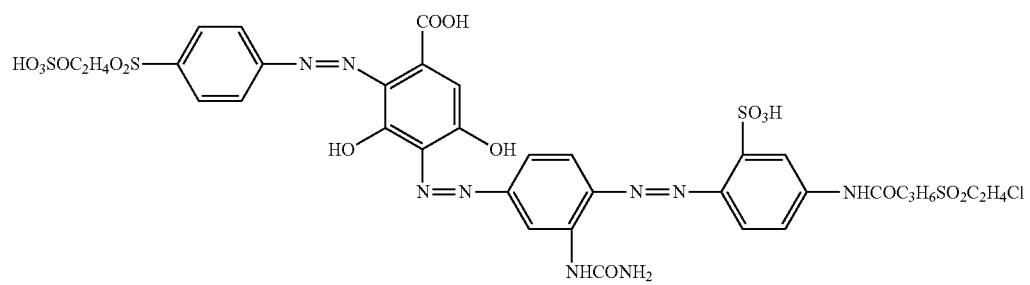
(I-5)
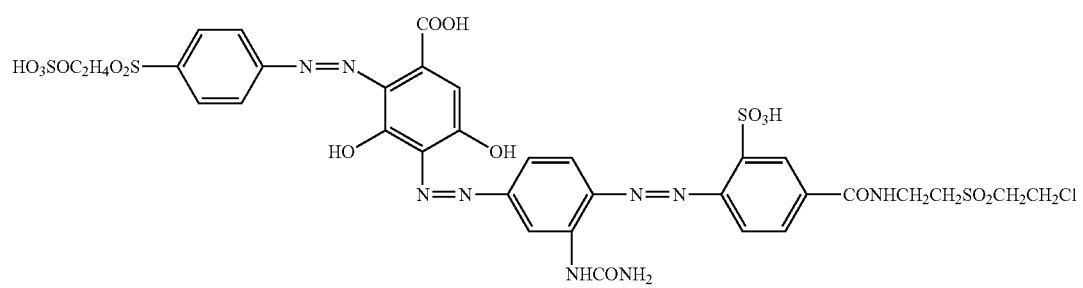
(I-6)
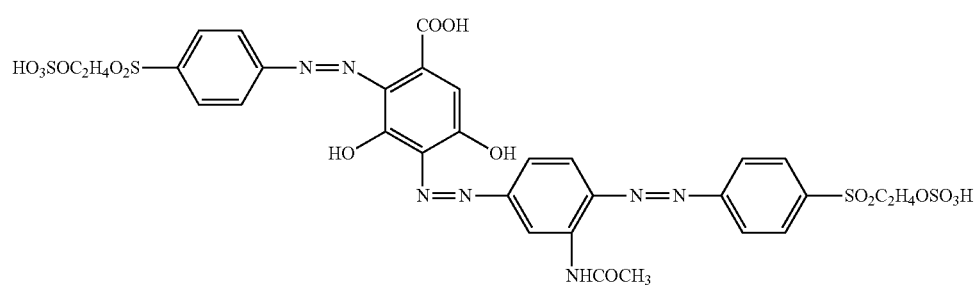
(I-7)
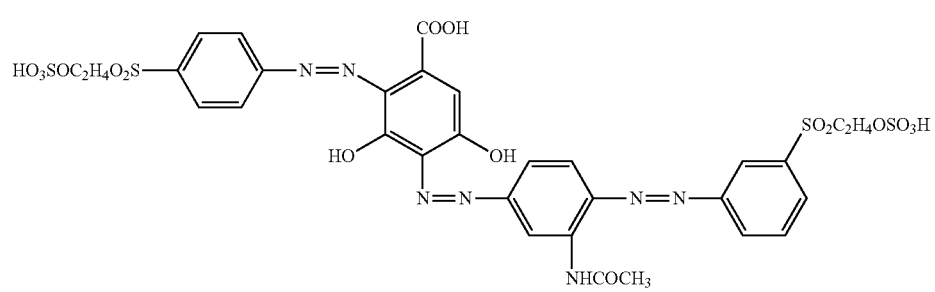
(I-8)

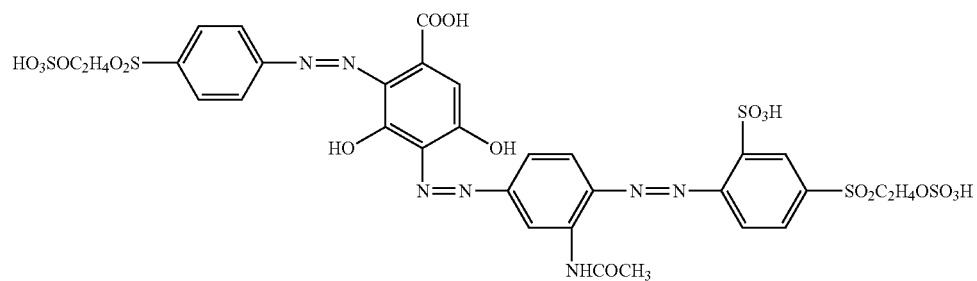
(I-9)
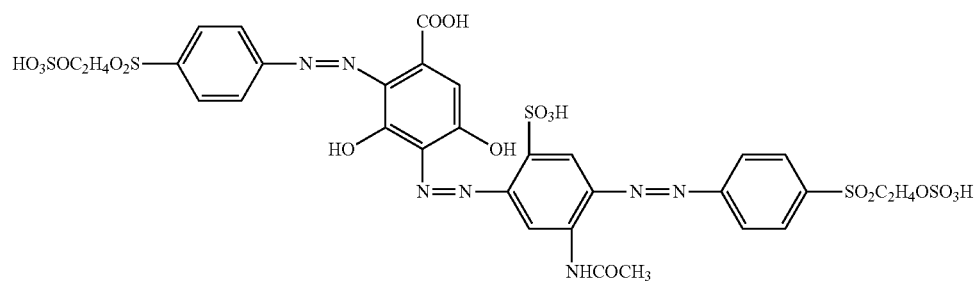
(I-10)
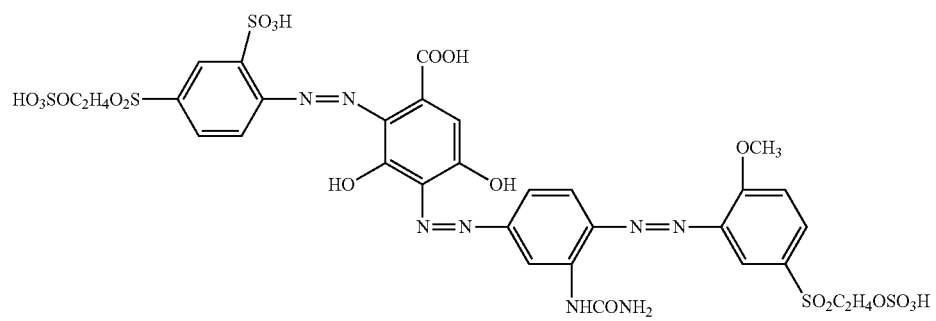
(I-11)
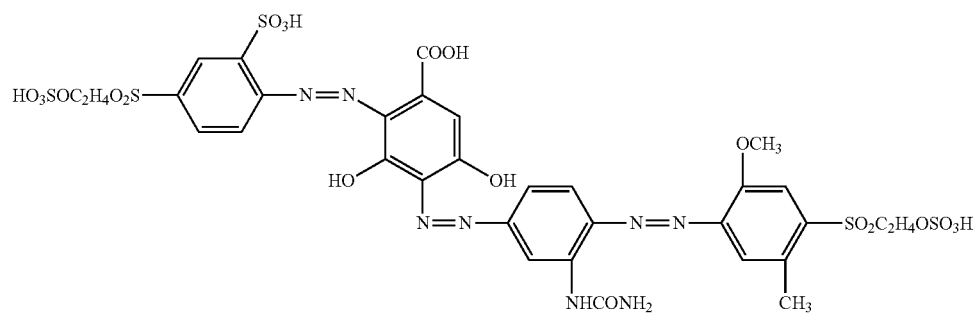
(I-12)
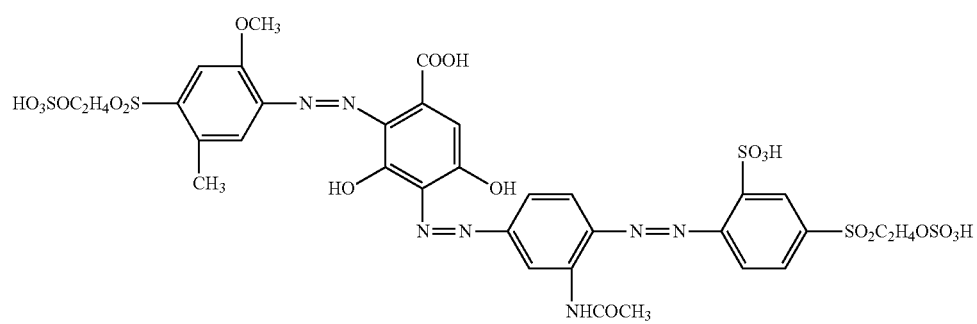
(I-13)

-continued
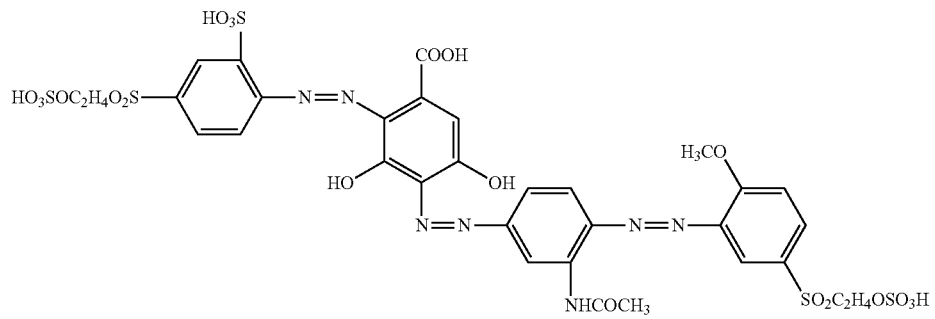
(I-14)
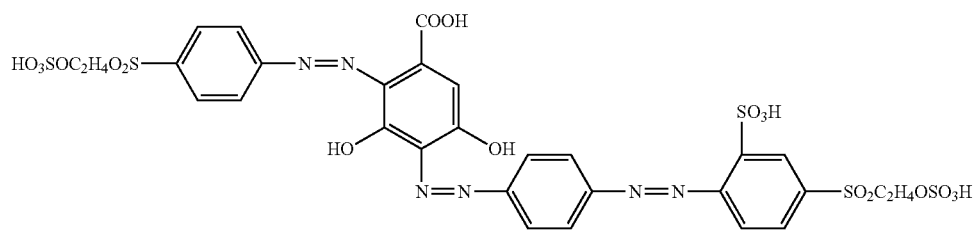
(I-15)
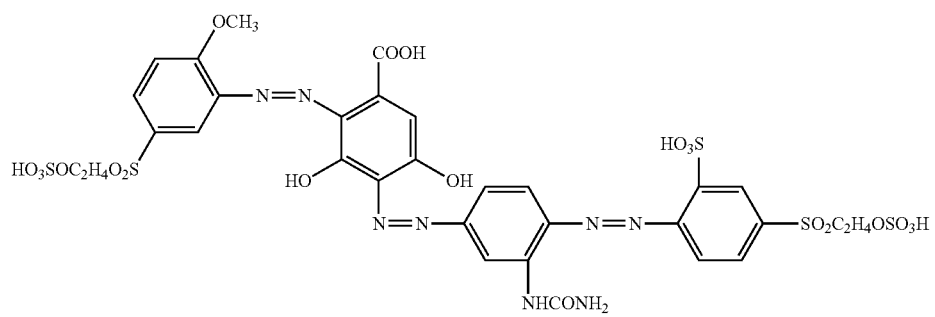
(I-16)
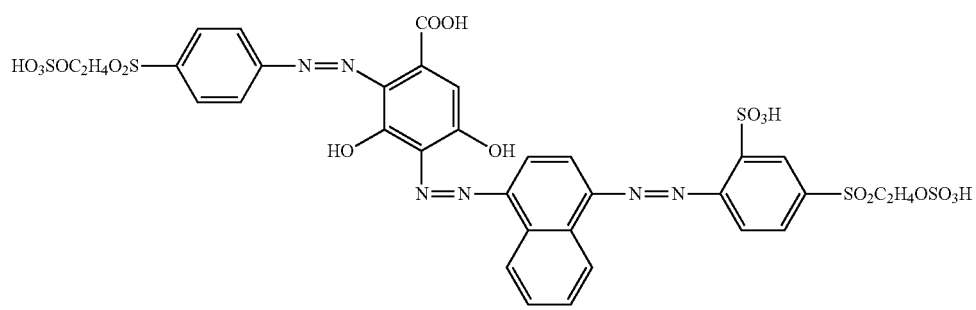
(I-17)
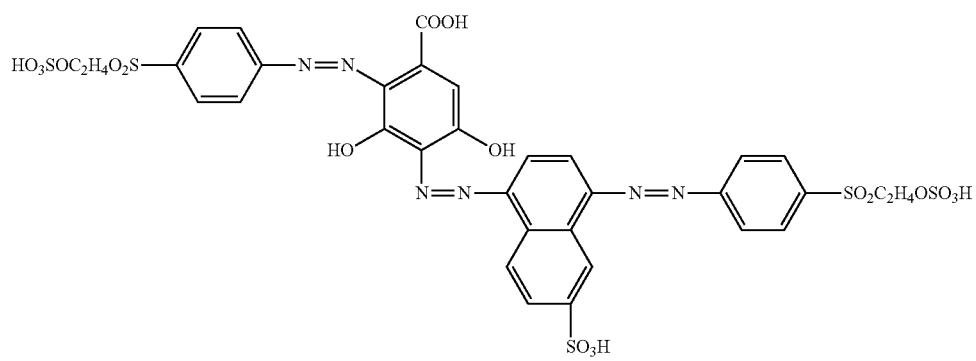
(I-18)

-continued
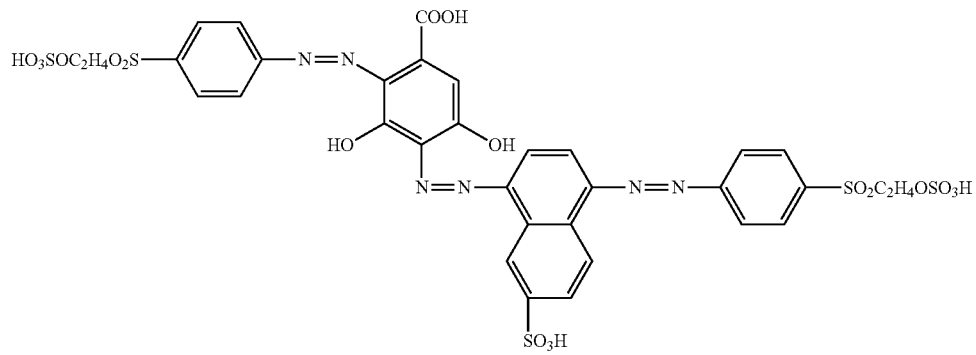
(I-19)
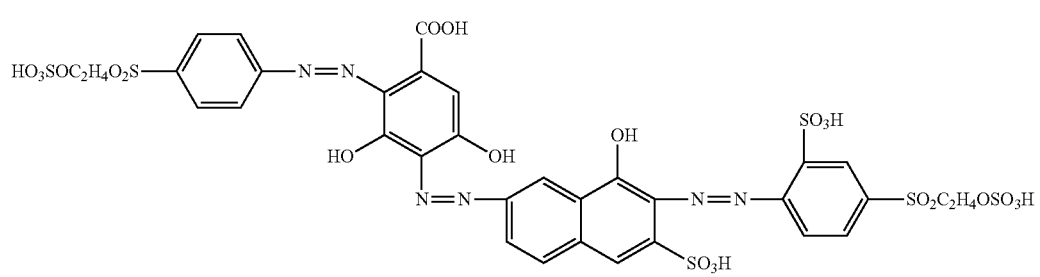
(I-20)
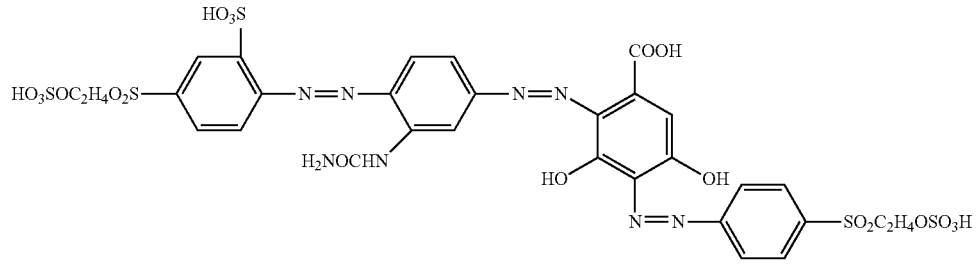
(I-21)
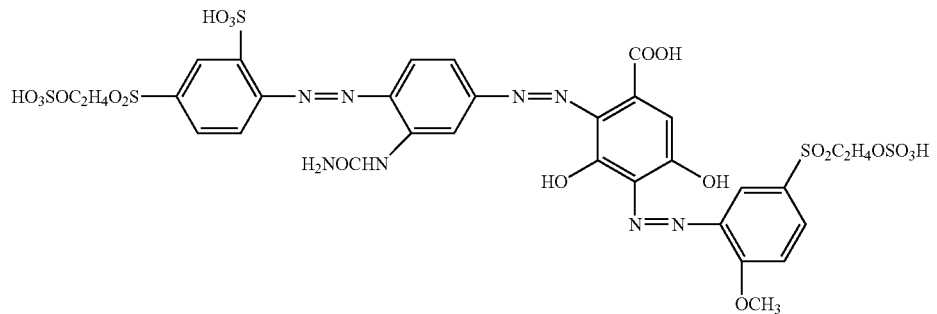
(I-22)
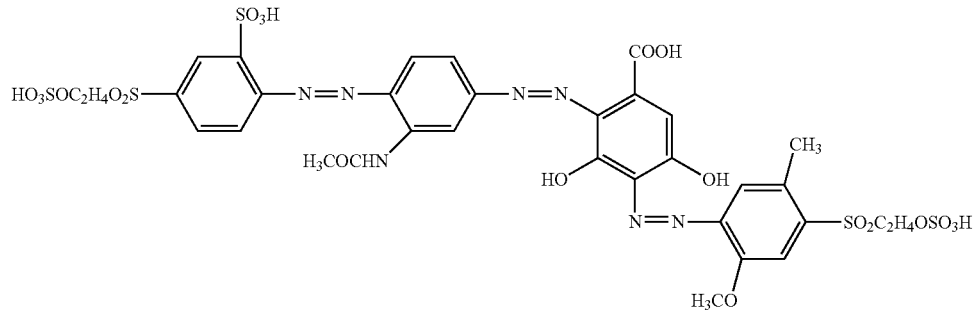
(I-23)

-continued
(I-24)
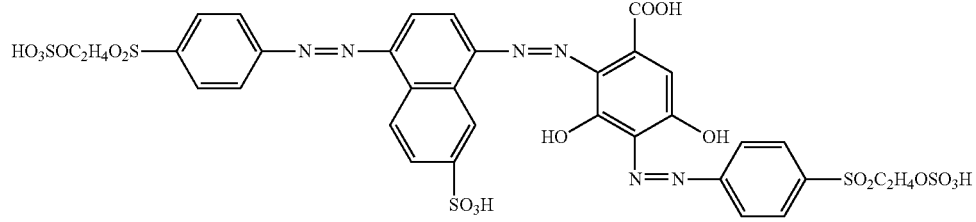
(I-25)
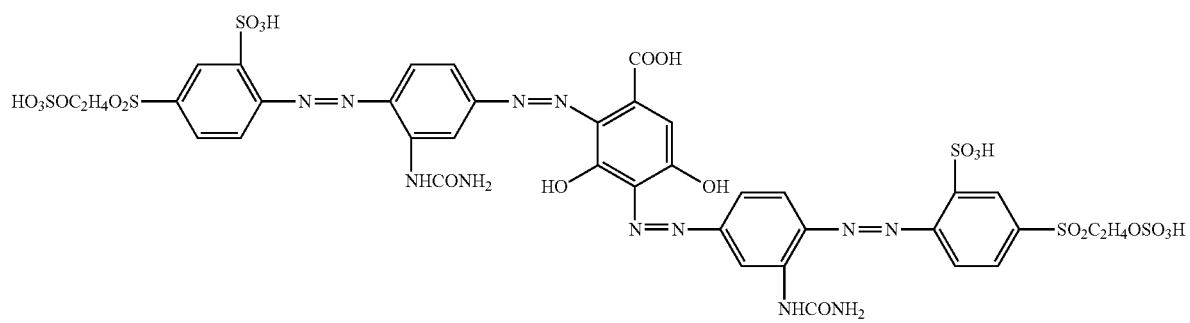
(I-26)
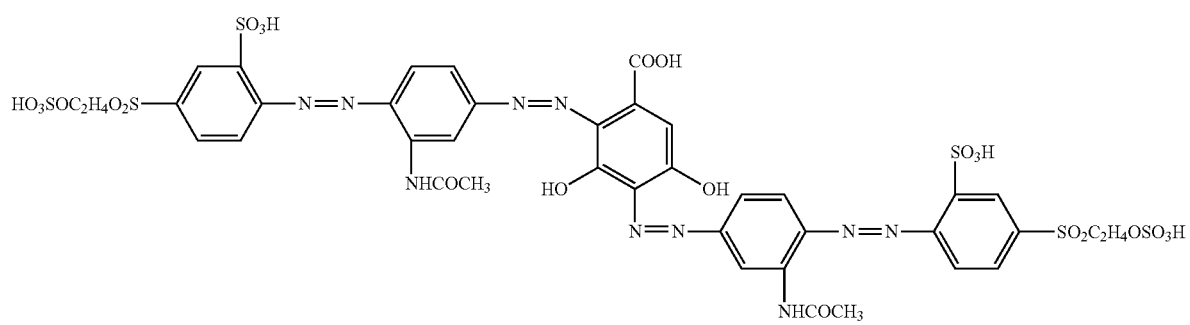
(I-27)
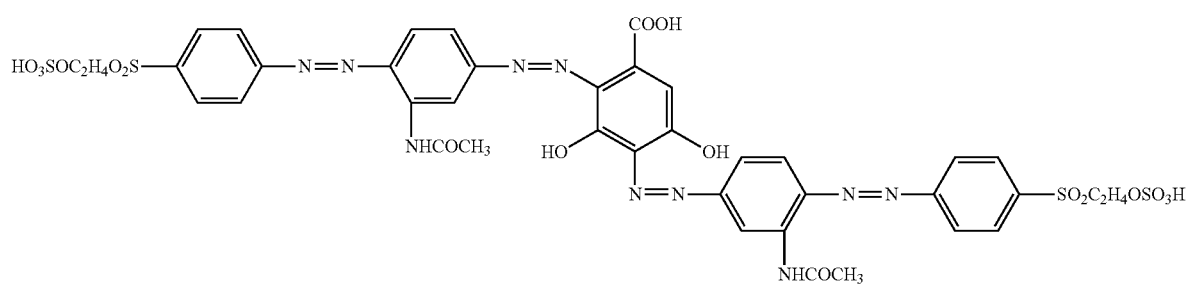
(I-28)
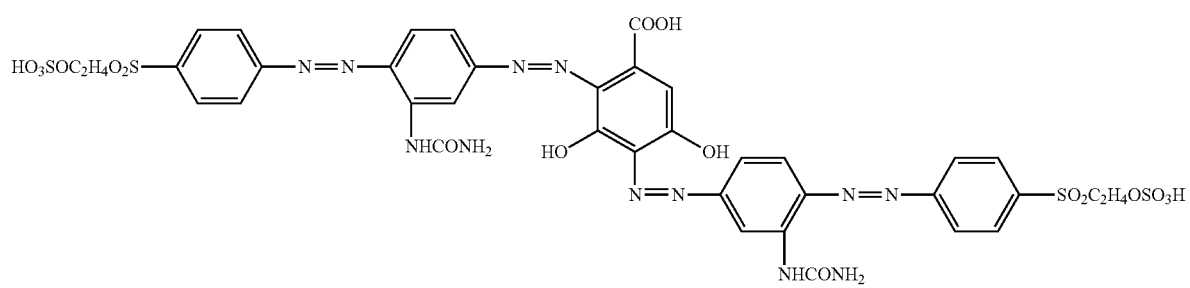

-continued
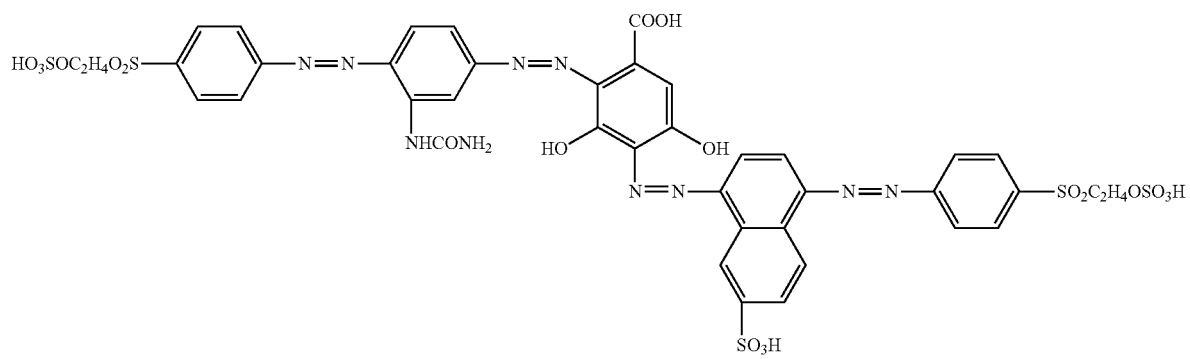
(I-29)
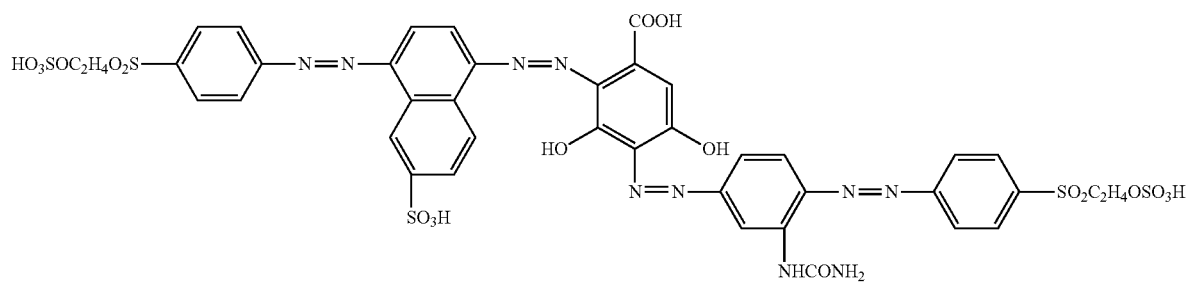
(I-30)
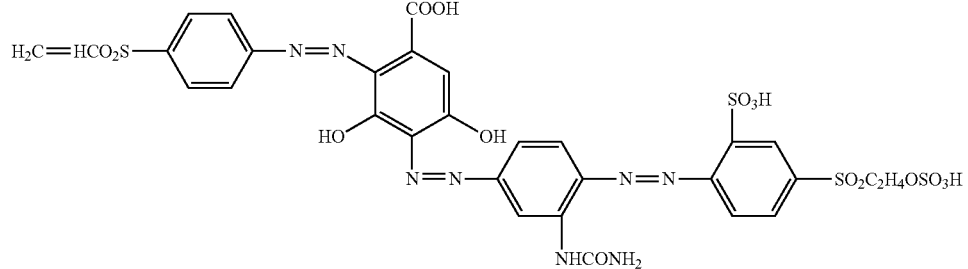
(I-31)
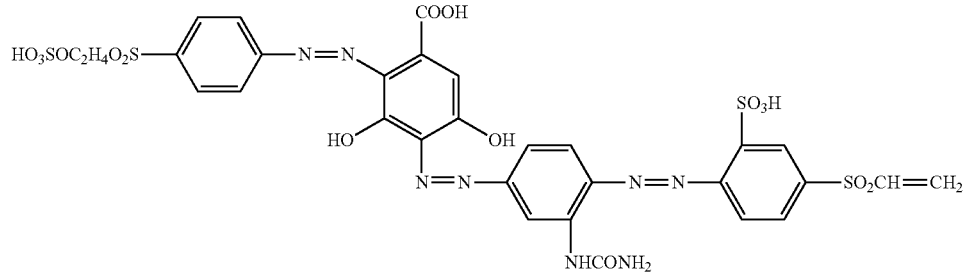
(I-32)
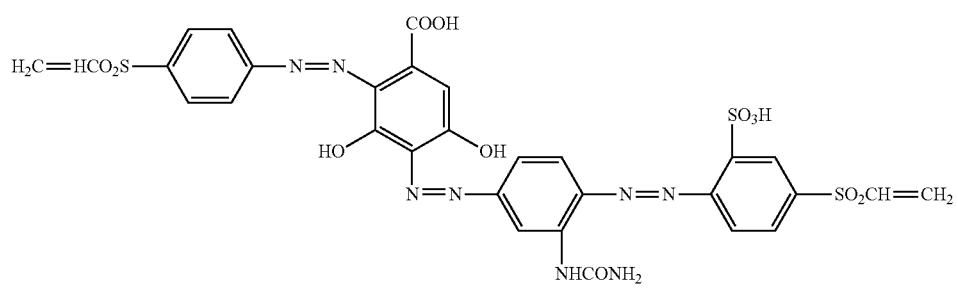
(I-33)

-continued
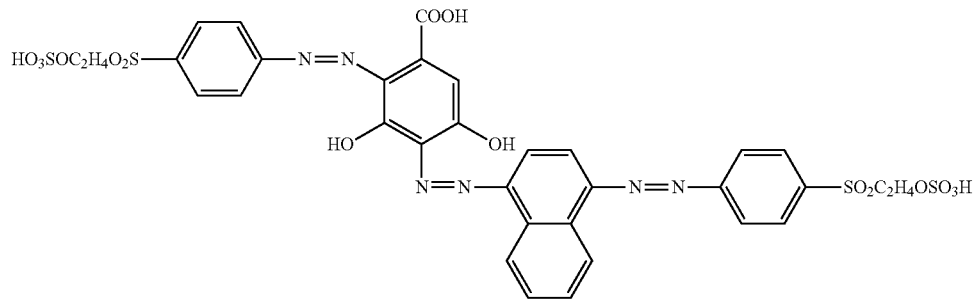
(I-34)
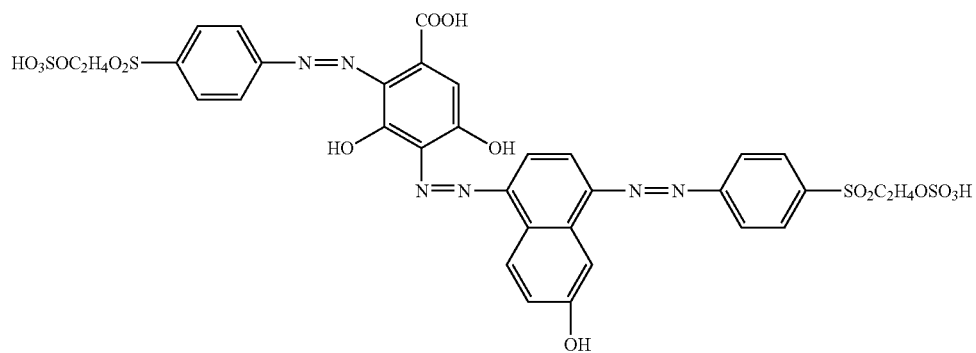
(I-35)
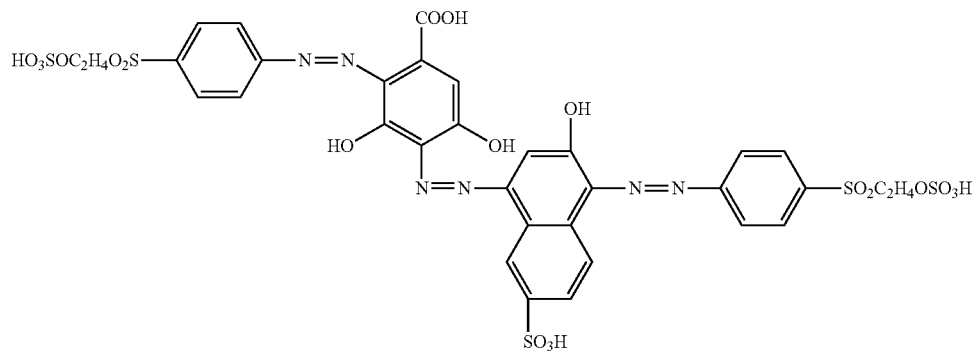
(I-36)
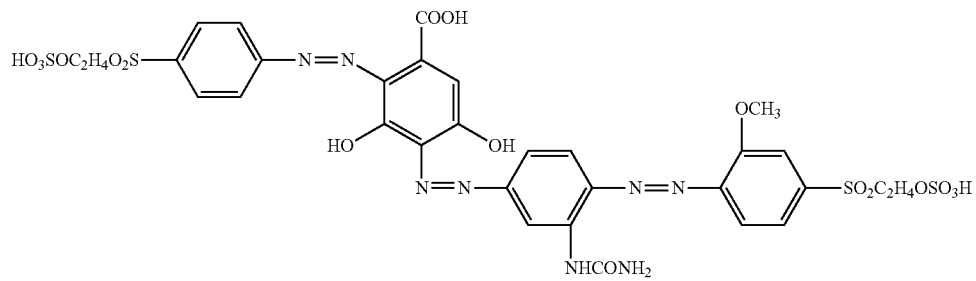
(I-37)
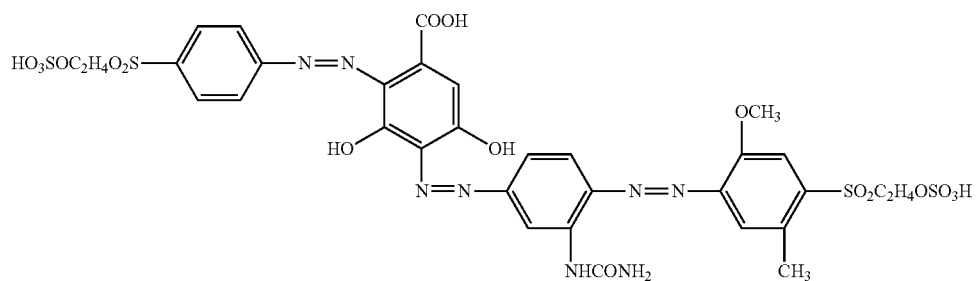
(I-38)

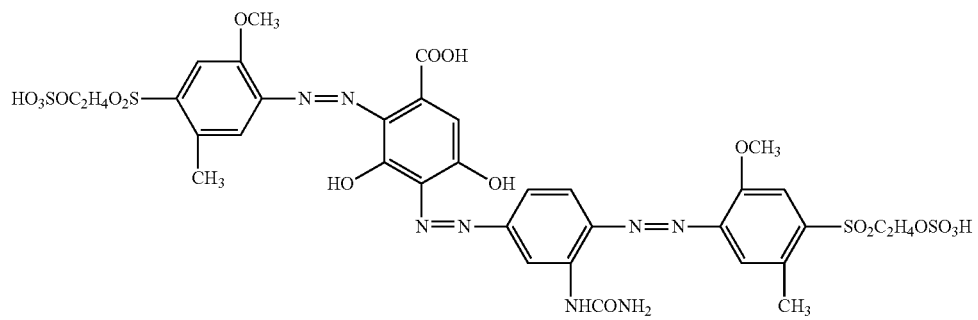
(I-39)
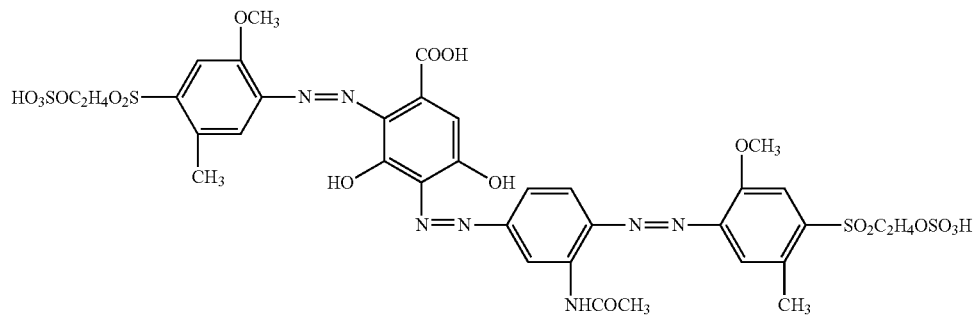
(I-40)
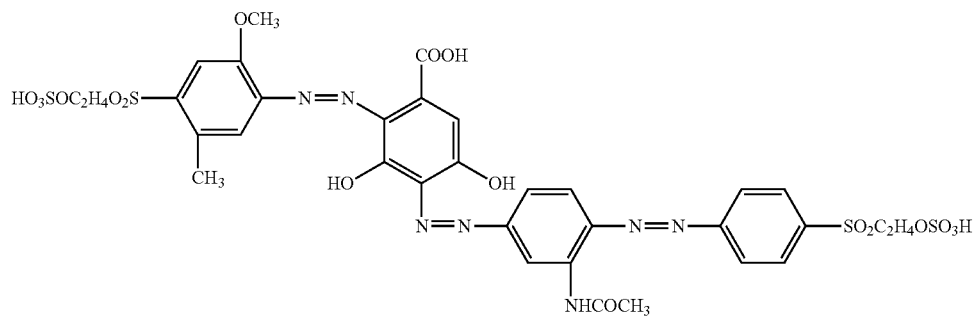
(I-41)
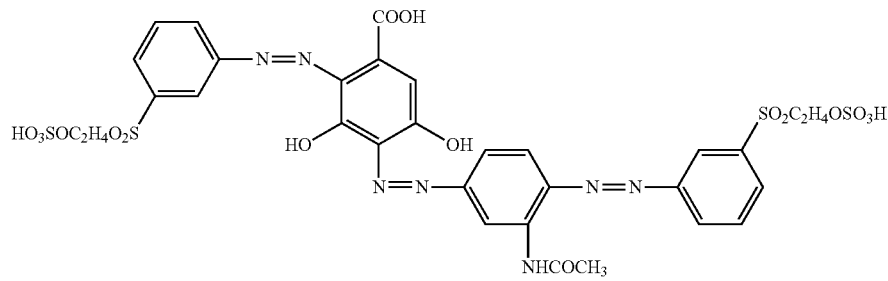
(I-42)
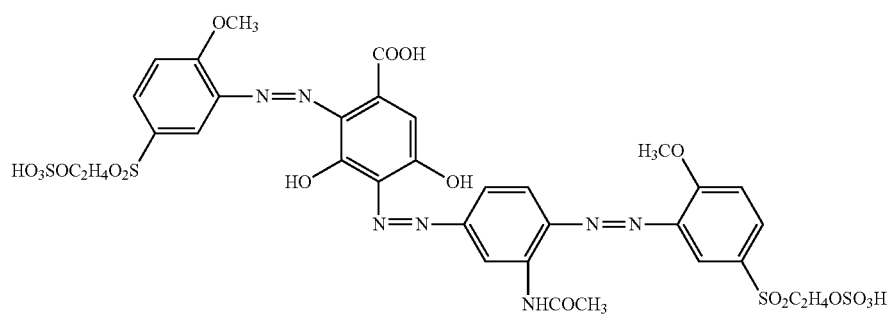
(I-43)

-continued
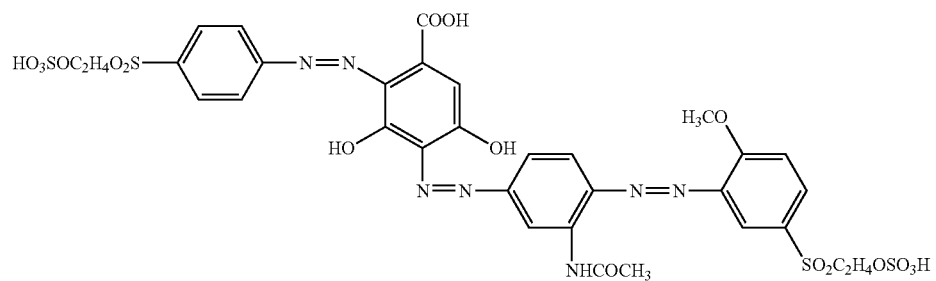
(I-44)
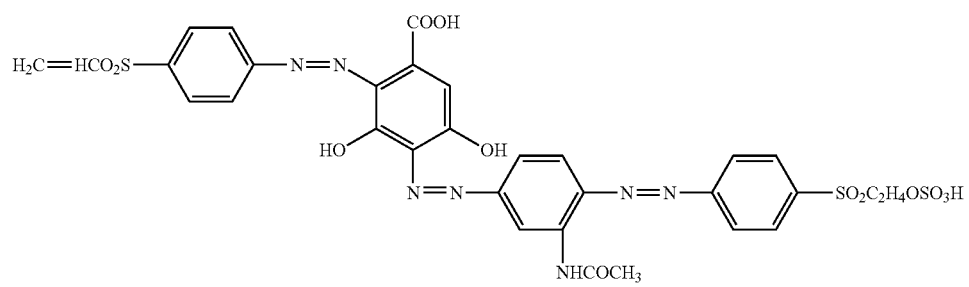
(I-45)
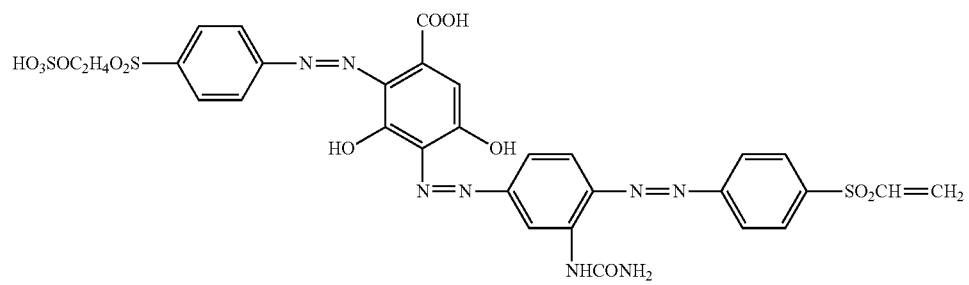
(I-46)
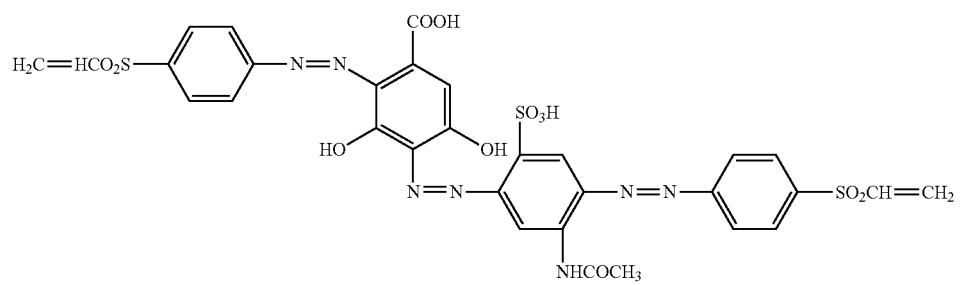
(I-47)
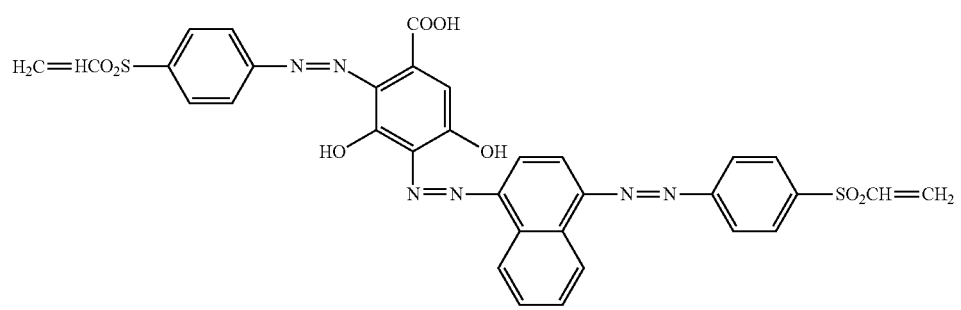
(I-48)

-continued
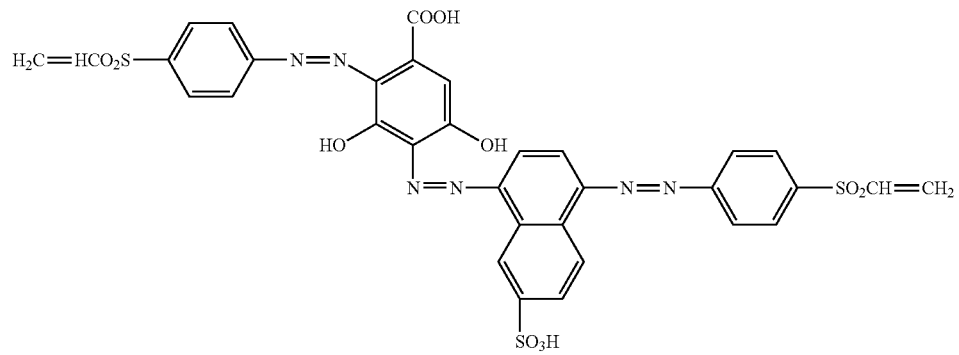
(I-49)
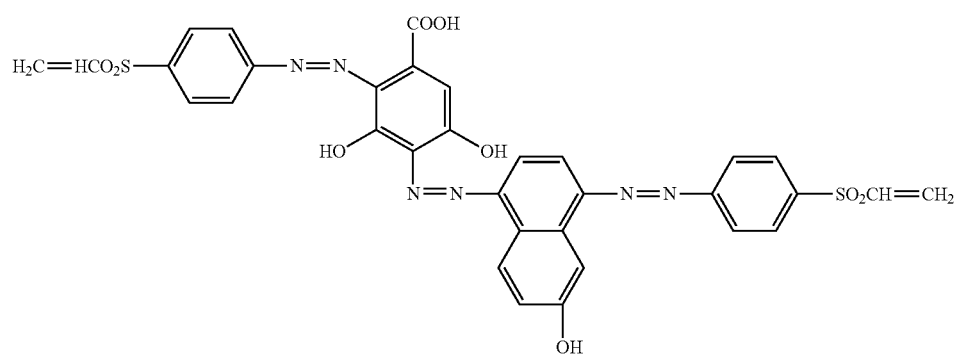
(I-50)
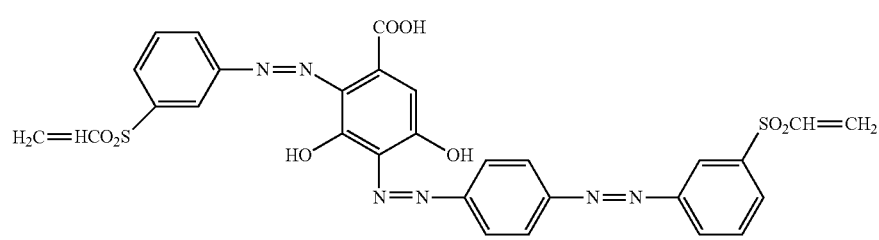
(I-51)
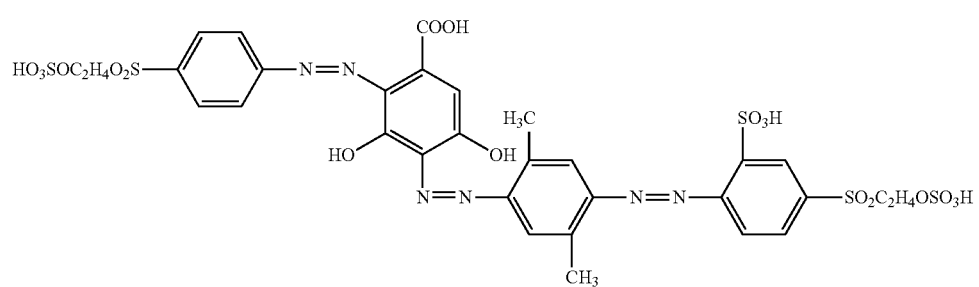
(I-52)
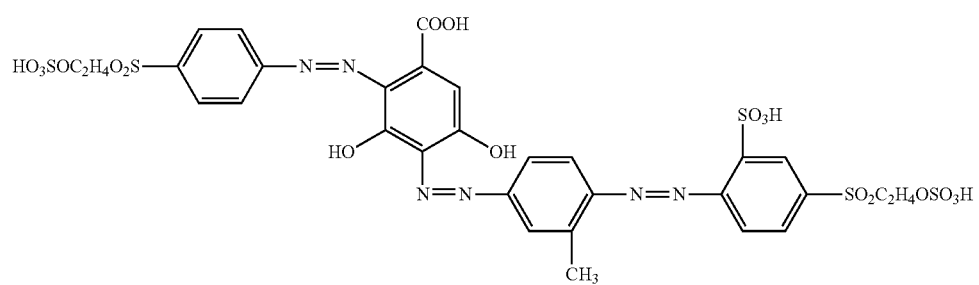
(I-53)

-continued

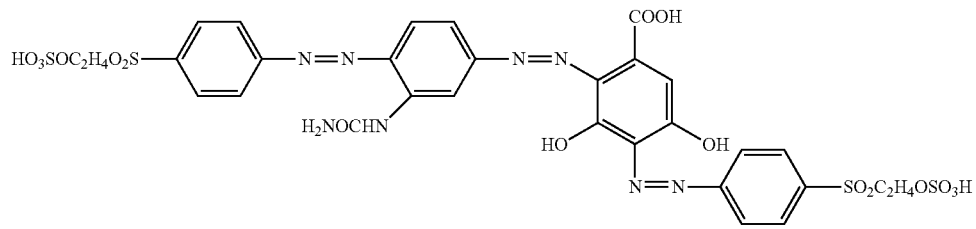

(I-54)

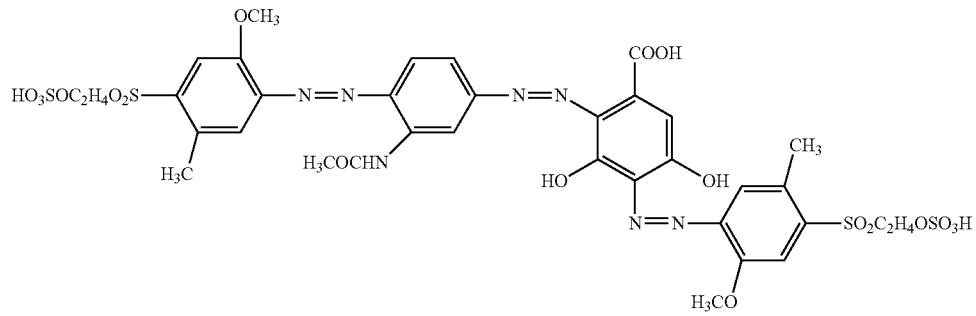

(I-55)

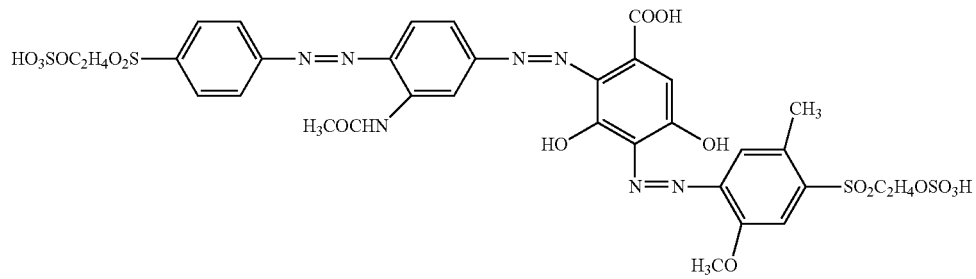

(I-56)

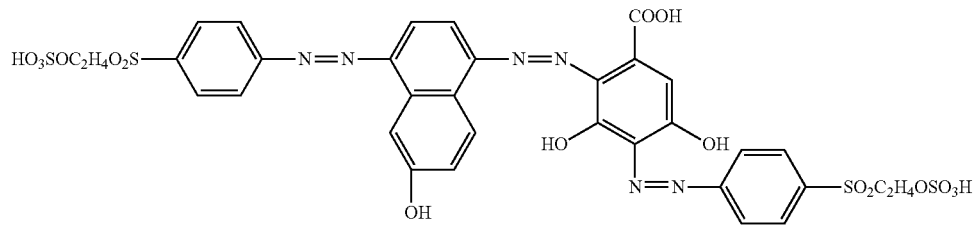

(I-57)

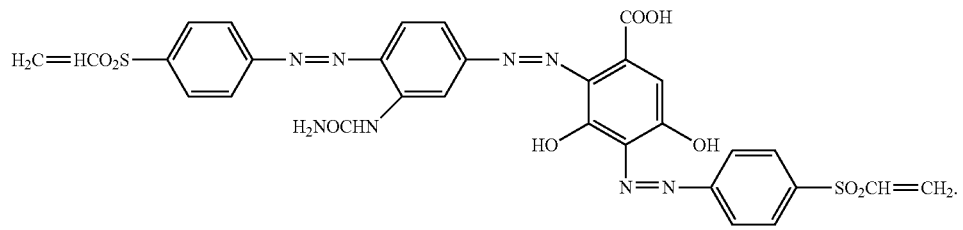

(I-58)

More preferably, the reactive dye compound is selected from the group consisting of the compounds of formulae (I-1)~(I-33), (I-52), and (I-53).

Even more preferably, the reactive dye compound is selected from the group consisting of the compounds of formulae (I-1), (I-7), (I-17), (I-18), (I-21), (I-22), (I-24) and (I-25).

It should be emphasized that in the reactive dye compound (I) of the present invention, the dye compounds coupled at the ortho-position of the phenolic hydroxyl, often exist in the form of quinohydrazone, that is, the dyes of the general formula (I) contain a quinohydrazone structure of the following formula (Ib) and/or formula (Ic) and/or (Id) and/or (Ie). In view of the writing habits of those skilled in the art, azo-form is also used as the written form in the summary of the invention and the examples, which does not affect the essence of the present invention:

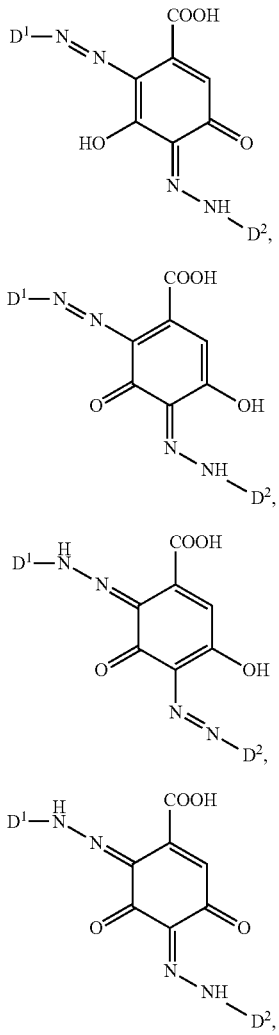

each substituent of formulae (Ib)~(Ie) has the same definition as that of formula (I).

The present invention provides a preparation method of the reactive dye compounds of formula (I), comprising:

(1) diazotization, which is carried out as the following steps A and B and/or C:

A, the arylamine compounds represented by formula (IIa), formula (IIb) and/or formula (IIc) are respectively diazotized as needed to obtain their own diazonium salts;

B, the diazonium salt of formula (IIb) is coupled with the aromatic amine of formula (IIIa) to obtain the compound of formula (IVa), which is subjected to diazotization, thereby obtaining a diazonium salt for use;

C, the diazonium salt of formula (IIc) is coupled with the aromatic amine of formula (IIIb) to obtain the compound of formula (IVb), which is subjected to diazotization, thereby obtaining a diazonium salt for use;

(2) coupling reaction as follows: 3,5-dihydroxybenzoic acid is beaten with water, the resulting solution is first-coupled with one of the diazonium salt of formula (IIa), the diazonium salt of the compound of formula (IVa) and the diazonium salt of the compound of formula (IVb) obtained in the step (1), then second-coupled with one of the diazonium salt of formula (IIa), the diazonium salt of the compound of formula (IVa) and the diazonium salt of the compound of formula (IVb), the diazonium salts used in the first-coupling and the second-coupling cannot both be the diazonium salt of formula (IIa), and thus the reactive dye compound (I) is obtained;

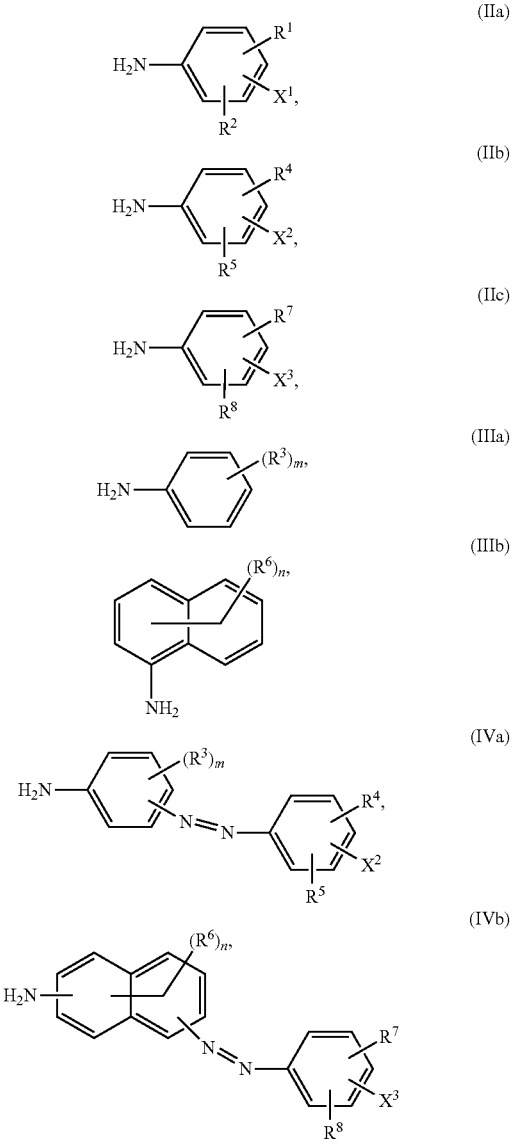

each substituent of the above formulae (IIa)~(IIc) (IIIa), (IIIb), (IVa) and (IVb) has the same definition as that of formula (I).

More preferably, the reactive dye compound (I) is synthesized as follows:

(1) diazotization:

A, the compounds represented by formula (IIa), formula (IIb) and/or formula (IIc) are respectively beaten with ice water for 1 hour to 2 hours as needed, after the beating, a certain amount of hydrochloric acid is added, and then sodium nitrite solution is added within 20-30 min, the diazotization reaction is carried out by controlling pH at between 0.5 and 3.0 (preferably between 0.5 and 2.0) and temperature T at 0° C. to 30° C. (preferably 0° C. to 20° C.), the end point is detected with an ethanol solution of 4-dimethylaminobenzaldehyde (i.e., no color change within 5 s); after the diazotization, the excess sodium nitrite is eliminated with sulfamic acid, and the diazo solution of formula (IIa), formula (IIb) or formula (IIc) is stored for use; wherein the molar ratio of each of the compounds of formula (IIa), formula (IIb) and formula (IIc) to hydrochloric acid, sodium nitrite is 1: (1-3): (1-1.1), preferably is 1: (1-1.8): (1-1.02);

B, the compound of formula (IIIa) is added to the diazo solution of formula (IIb) obtained in the above step, the coupling reaction is carried out by controlling pH at between 4.0 and 6.0 with liquid alkali and temperature T at 0° C. to 30° C. (preferably 0° C. to 20° C.), and then the diazo is tested with H-acid test solution, if the bleed circle is colorless, it means that the diazo has been reacted completely to the end point, and the compound of formula (IVa) is obtained, wherein the molar ratio of the compound of formula (IIIa) to the compound of formula (IIb) is 1:(0.95-1.2), preferably is 1:(0.98-1.08);

the compound of the above formula (IVa) is added with a certain amount of hydrochloric acid, and then sodium nitrite solution is added within 20-30 min, the diazotization reaction is carried out by controlling pH at between 0.5 and 3.0 (preferably between 0.5 and 2.0) and temperature T at 0° C. to 30° C. (preferably 0° C. to 20° C.), the end point is detected with an ethanol solution of 4-dimethylaminobenzaldehyde (i.e., no color change within 5 s); after the diazotization, the excess sodium nitrite is eliminated with sulfamic acid, and the diazo solution of formula (IVa) is stored for use;

C, the compound of formula (IIIb) is added to the diazo solution of formula (IIc) obtained above, the coupling reaction is carried out by controlling pH at between 4.0 and 6.0 with liquid alkali and temperature T at 0° C. to 30° C. (preferably 0*C to 20° C.), and then the diazo is tested with H-acid test solution, if the bleed circle is colorless, it means that the diazo has been reacted completely to the end point, and the compound of formula (IVb) is obtained, wherein the molar ratio of the compound of formula (IIIa) to the compound of formula (IIb) is 1:(0.95-1.2), preferably is 1:(0.98-1.08);

the compound of the above formula (IVb) is added with a certain amount of hydrochloric acid, and then sodium nitrite solution is added within 20-30 min, the diazotization reaction is carried out by controlling pH at between 0.5 and 3.0 (preferably between 0.5 and 2.0) and temperature T at 0° C. to 30° C. (preferably 0° C. to 20° C.), the end point is detected with an ethanol solution of 4-dimethylaminobenzaldehyde (i.e., no color change within 5 s); after the diazotization, the excess sodium nitrite is eliminated with sulfamic acid, and the diazo solution of formula (IVb) is stored for use;

(2) coupling reaction: 3,5-dihydroxybenzoic acid is dissolved in water by controlling pH at between 8.0 and 12.0 and temperature at 15° C. to 25° C., the resulting 3,5-dihydroxybenzoic acid solution is added to the diazo solution of formula (IIa), the diazo solution of the compound of formula (IVa) or the diazo solution of the compound of formula (IVb) obtained in the above step (1), the coupling reaction is carried out by controlling pH at between 3.5 and 4.5 with liquid alkali or sodium bicarbonate and temperature at 0 to 30° C. (preferably 0 to 20° C.), the diazo is tested with H-acid test solution, if the bleed circle is colorless, it means that the diazo has been reacted completely to the end point, and the coupling product 1 is obtained;

then, the diazo solution of formula (IIa), the diazo solution of the compound of formula (IVa) or the diazo solution of the compound of formula (IVb) obtained in the step (1) is added to the coupling product 1, the coupling reaction is carried out by controlling pH at between 5.0 and 8.0 with liquid alkali or sodium bicarbonate and temperature at 0 to 30° C. (preferably 0 to 20° C.), and the diazo is tested with H-acid test solution, if the bleed circle is colorless, it means that the diazo has been reacted completely to the end point, and the reactive dye compound of formula (I) of the present invention is thus obtained;

the diazo solutions used in the above two coupling reactions cannot both be the diazo solution of formula (IIa); wherein, the molar ratio of the diazo solution of formula (IIa), formula (IVa) or formula (IVb) to 3,5-dihydroxybenzoic acid is (0.95-1.2):1, preferably is (0.98-1.08):1.

It is well known in the art that where $Y^1 \sim Y^3$ in the reactive dye compound of formula (I) of the present invention are $—C_2H_4OSO_3H$ or $—CH_2CH_2Cl$, in the common dyeing application of reactive dyes, β-hydroxyethylsulfonyl sulfate ($—SO_2C_2H_4OSO_3H$) or β-chloroethyl sulfone ($—SO_2C_2H_4Cl$) is subjected to elimination reaction to generate a vinyl sulfone group ($—SO_2CH=CH_2$) in an alkaline medium, then subjected to nucleophilic addition reaction with a cellulose fiber to form a covalent bond.

The reactive dye compound (I) of the present invention, in the preparation process, also allows the co-existence of by-products in an amount of not more than 30%, which may be used in the processing of commercial dyes without isolation, and the by-products include but are not limited to the compounds of the following formulae or mixtures thereof:

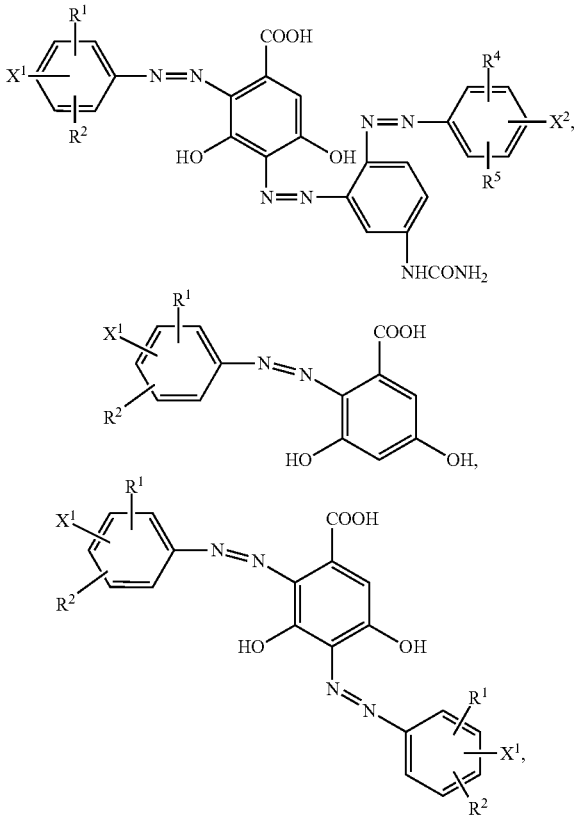

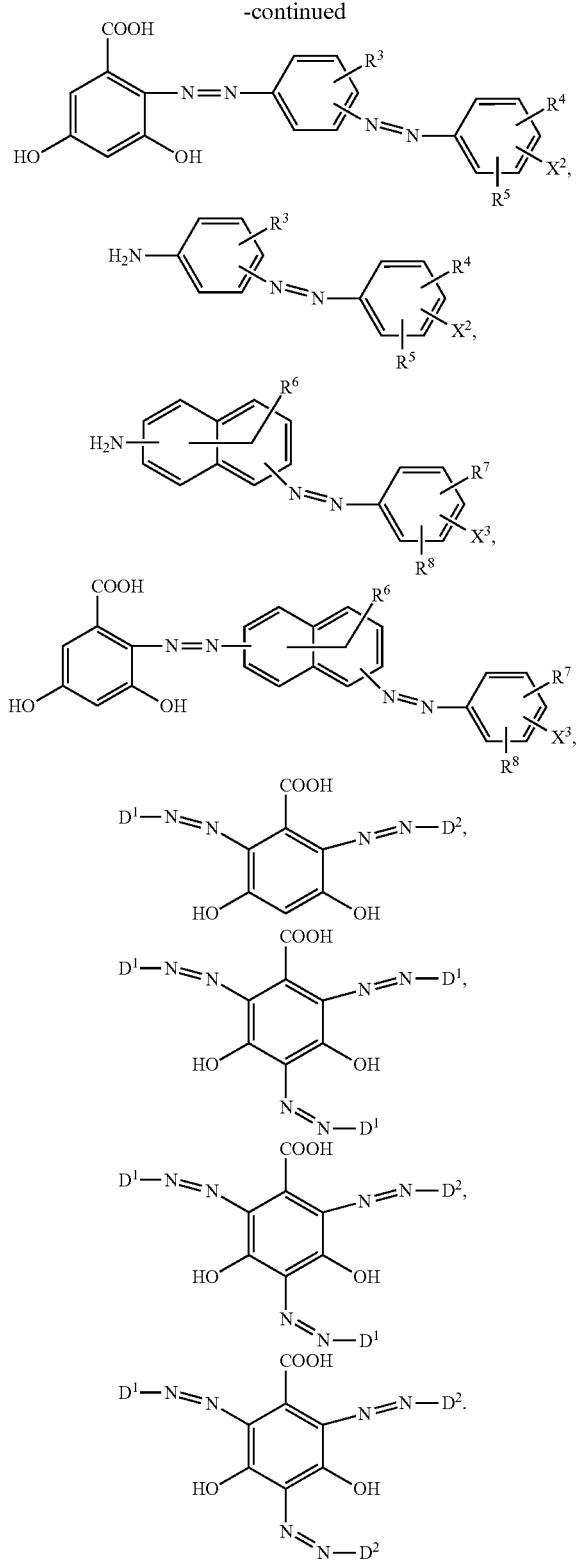

-continued

Each substituent of the above by-products has the same definition as that of the above formula (I).

The reactive dye compound (I) of the present invention is embodied in the form of free acid, however, in the actual synthesis process they are usually prepared and isolated in the form of alkali metal salt (such as a sodium salt or a potassium salt), and also used in the form of its salts for dyeing, which is well known to those skilled in the art, that is, the carboxyl and the sulfo groups of formula (I), may exist in the form of sodium carboxylate and sodium sulfonate.

The reactive dye compound (I) of the present invention may exist in the form of powder, granule, aqueous solution or synthetic solution, separation of the dye compound of the present invention from the synthetic solution can be carried out by a generally known method, for example, the dye is salted out and filtered from a reaction medium with the electrolyte (such as sodium chloride or potassium chloride), or the solution is evaporated and spray dried. Hence, the dye compounds generally contain the conventional electrolyte salts (such as sodium chloride, sodium sulfate, etc.) in the reactive dye.

When the reactive dye compound (I) of the present invention is sold as a commodity, it can be without an auxiliary, and can also be added with a conventional auxiliary of commercial dyes, such as a cosolvent, a dispersant, an alkali-resistant auxiliary, a dustproof agent, a surfactant, a buffer, an accelerant, and the like. Therefore, the present invention also provides a reactive dye product containing the reactive dye compound (I). Preferably, the reactive dye product contains the reactive dye compound (I) and an auxiliary. The weight of the auxiliary does not exceed 45%, preferably 40% of the weight of the reactive dye compound. The auxiliary is preferably selected from one or more of the following auxiliaries: a naphthalene sulfonic acid formaldehyde condensate (NNO), a methylnaphthalenesulfonic acid formaldehyde condensate (dispersant MF), a diffusing agent CNF (benzylnaphthalenesulfonate formaldehyde condensate), Yuanming powder (industrial sodium sulfate), lignosulfonate, sodium acetate, sodium hydrogencarbonate, sodium citrate, sodium dihydrogen phosphate, disodium hydrogen phosphate, thickener, and the like. All the auxiliaries are commercially available conventional auxiliaries.

The reactive dye compounds (I) and the reactive dye products of the present invention are suitable for printing and dyeing of cellulosic fibers, polyamide fibers and fabrics thereof, wherein the cellulosic fibers are preferably cotton fibers or recycled fibers, and of course may include other vegetable fibers such as hemp fibers or fabrics, and the polyamide fibers preferably include animal fiber materials including skin, wool or silk, and synthetic fiber materials such as nylon 6 and nylon 66. When the above-mentioned fiber materials are dyed and printed by using the reactive dye compound or the reactive dye product of the present invention, it can be carried out according to known dyeing and printing methods for reactive dyes, such as a commonly used reactive dye dip dyeing method and pad dyeing method, and the dip dyeing method is a method of immersing a fabric in a dyeing solution to gradually dye the dye onto the fabric, which usually requires a process of dyeing-fixing-washing-soaping-washing-dehydration-drying and so on.

The pad dyeing method is a method of firstly immersing a fabric in a dyeing solution, then passing the fabric through a roll, uniformly rolling the dye solution into the interior of the fabric, and then treating the fabric by steaming, hot-melting or other treatments, which usually requires a process of padding with a dye solution-drying-(padding with a fixing solution)-steaming or curing-washing-soaping-washing-drying and so on.

Generally, due to different requirements for the shade of the fabrics, the usage amount of dyes is different. When dyeing by dip dyeing, the dyeing depth (owf) is generally between 0.1% and 10% (which means the dye accounts for 0.1%-10% of the fabric weight), the bath ratio is 1:2 to 1:60 (weight ratio of fabric to the dyeing solution, preferably from 1:10 to 1:30), the initial dyeing temperature is controlled at 30° C. to 60° C., the dyeing time is 10 minutes to 30 minutes, the soaping temperature is 85° C. to 95° C., the soaping time is 10 minutes to 15 minutes, the fixing temperature is 60° C. to 100° C., the fixing time is 10 minutes to 50 minutes, and the fixing pH is 9 to 11. When dyeing by the pad dyeing method, the pickup of cellulose fiber is generally 60% to 80%, the steaming temperature is 100° C. to 103° C., and the steaming time is 1 minute to 3 minutes. Among padding methods, cold pad-batch dyeing method is widely used, in which a dye and an alkaline substance are introduced into a pad dyeing machine, batched onto a roll and the roll which is covered is turned slowly for 2 hours to 30 hours at room temperature for fixation, and then thoroughly rinsed.

The advantages of the present invention are embodied in that the reactive dye compound (I) has a novel structure, high degree of fixation, good washing fastness and rubbing fastness, good build-up, and good fiber-bonding stability, and can meet the requirements of dyeing and printing of fibers such as cotton, rayon, silk, viscose, and wool.

SPECIFIC EMBODIMENTS

Figure 1:
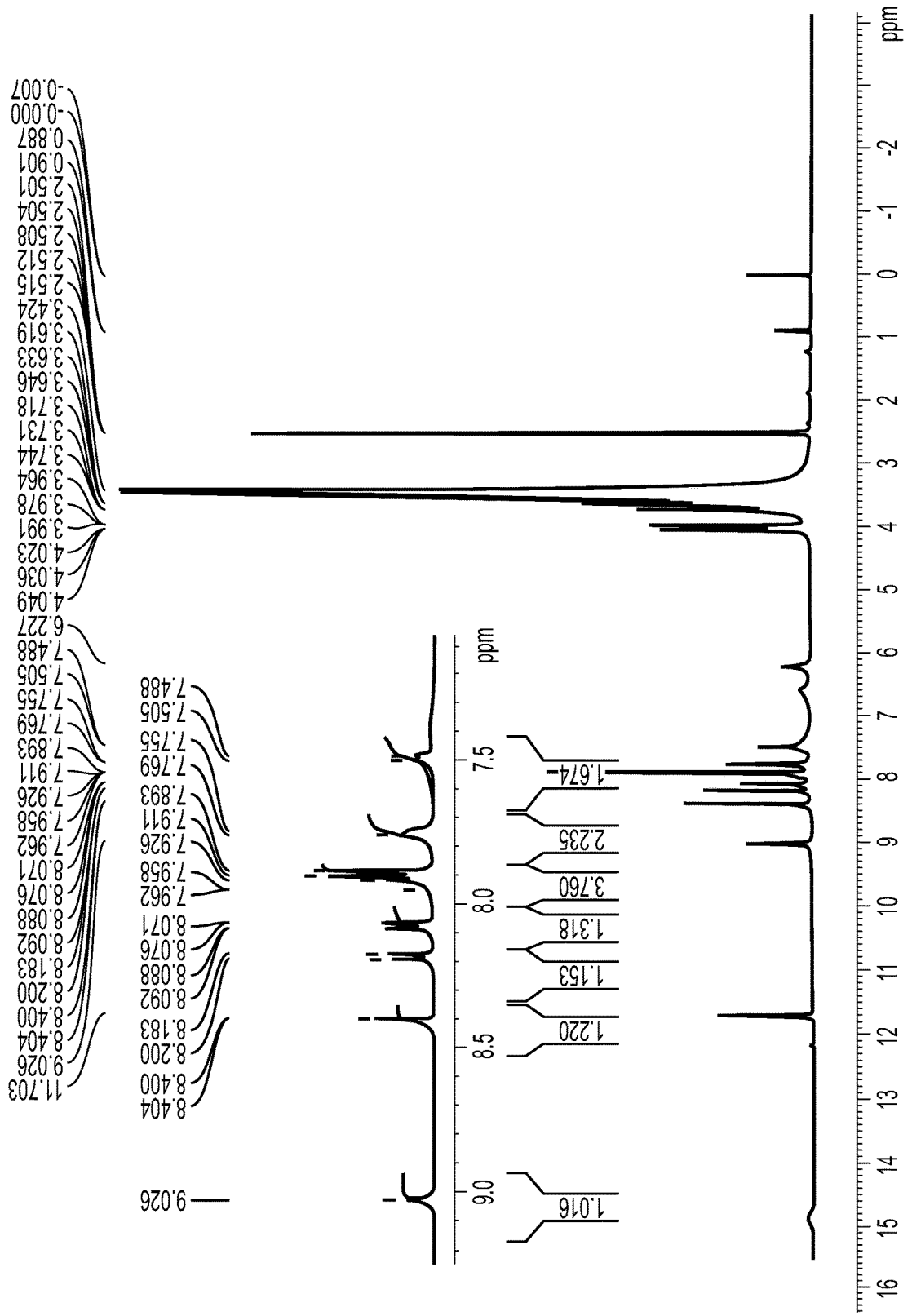
FIG. 1 is the 1HNMR spectrum of the compound (I-1) obtained in example 1.

The present invention will be further described in conjunction with the specific examples, but the scope of the present invention is not limited thereto:

For convenience of writing, all the chemical formulae in the examples are embodied by the form of free acid, and their substantial dyeing properties are equivalent to the form of alkali metal salts (such as sodium salts, potassium salts, etc.).

Example 1

1) Diazotization:

28.1 g (0.1 mol) of para-ester (p-β-hydroxyethyl sulfone sulfate aniline) were added into 100 g of water and 100 g of ice, the mixture was beaten for about 1 h, added with 20 g of 31% hydrochloric acid (containing 0.17 mol of HCl), and then added with 24 g of a 30% sodium nitrite solution (containing 0.104 mol of sodium nitrite) within 20-30 min. The diazotization reaction was carried out for 1 hour to 2 hours by controlling pH at between 0.5 and 2.0 and temperature T at 0° C. to 20° C., and the end point was detected with an ethanol solution of 4-dimethylaminobenzaldehyde (i.e., no color change within 5 s). After the diazotization, the excess sodium nitrite was eliminated with sulfamic acid, and the obtained diazo solution of para-ester was stored for use.

36.1 g (0.1 mol) of sulfonated para-ester (2-sulfonic acid-4-β-hydroxyethylsulfone sulfate aniline) were added into 100 g of water and 100 g of ice, the mixture was beaten for about 1 h, added with 20 g of 31% hydrochloric acid (containing 0.17 mol of HCl), and then added with 24 g of a 30% sodium nitrite solution (containing 0.104 mol of sodium nitrite) within 20-30 min. The diazotization reaction was carried out for 1 hour to 2 hours by controlling pH at between 0.5 and 2.0 and temperature T at 0° C. to 20° C., and the end point was detected with an ethanol solution of 4-dimethylaminobenzaldehyde (i.e., no color change within 5 s). After the diazotization, the excess sodium nitrite was eliminated with sulfamic acid, and the obtained diazo solution of sulfonated para-ester was stored for use.

The above diazo solution of 0.1 mol of sulfonated para-ester was added to 15.1 g (0.1 mol) of 3-aminophenylurea, the coupling reaction was carried out for 0.5 h to 2 h by controlling pH at between 4.0 and 6.0 with 30% liquid alkali and temperature T at 0° C. to 20° C. The diazo was tested with H-acid test solution, if the bleed circle was colorless, it meant that the diazo had been reacted completely to the end point (if not, the reaction continued to the end point), thereby obtaining chromophore 1. Chromophore 1 was added with 20 g of 31% hydrochloric acid (containing 0.17 mol of HCl), and then added with 24 g of a 30% sodium nitrite solution (containing 0.104 mol of sodium nitrite) within 20-30 min. The diazotization reaction was carried out for 1 hour to 2 hours by controlling pH at between 0.5 and 2.0 and temperature T at 0° C. to 20° C., and the end point was detected with an ethanol solution of 4-dimethylaminobenzaldehyde (i.e., no color change within 5 s). After the diazotization, the excess sodium nitrite was eliminated with sulfamic acid, and the obtained diazo solution of chromophore 1 was stored for use.

Figure 3:
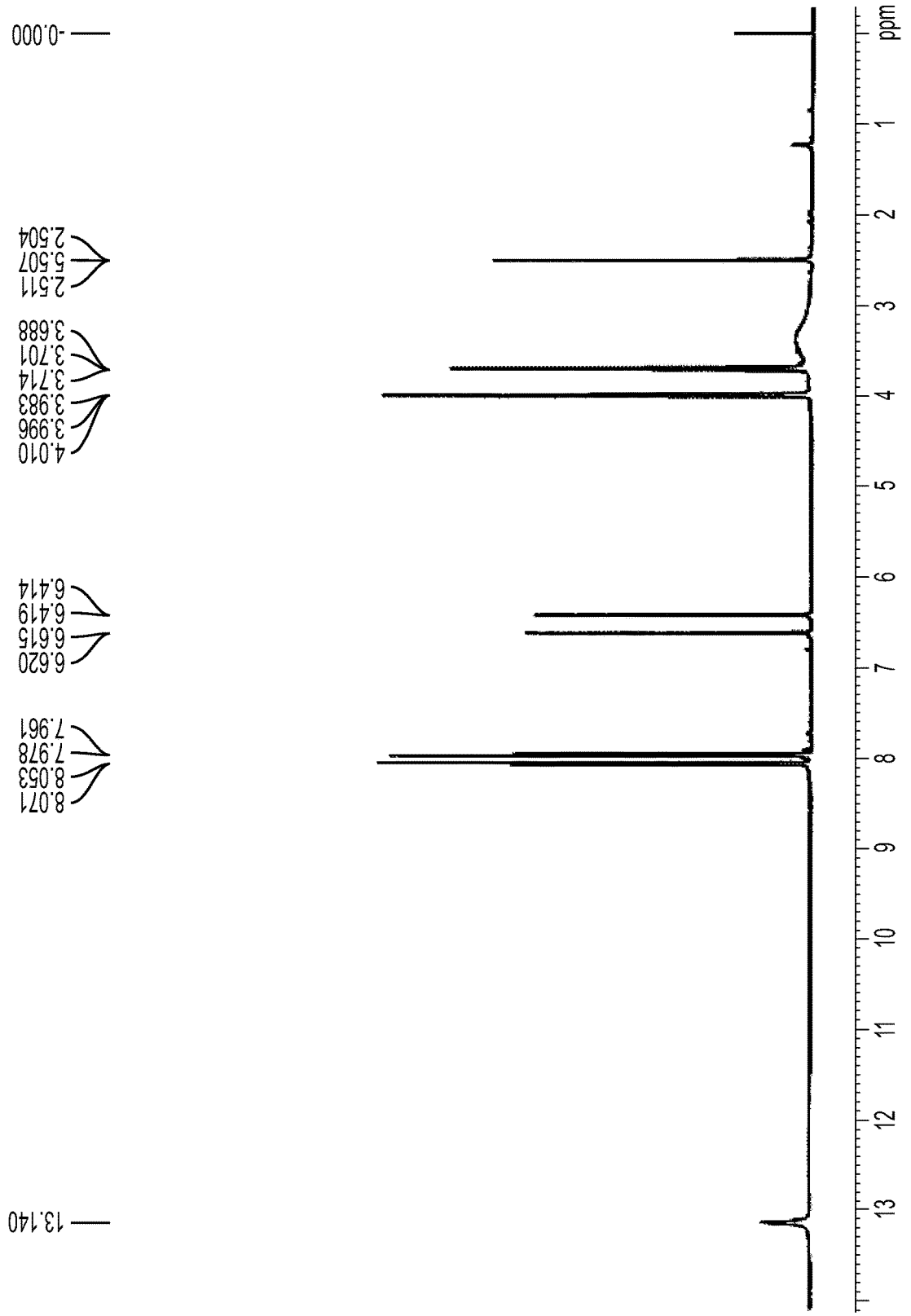
FIG. 3 is the 1H NMR spectrum of the chromophore 2 obtained in example 1.
Figure 4:
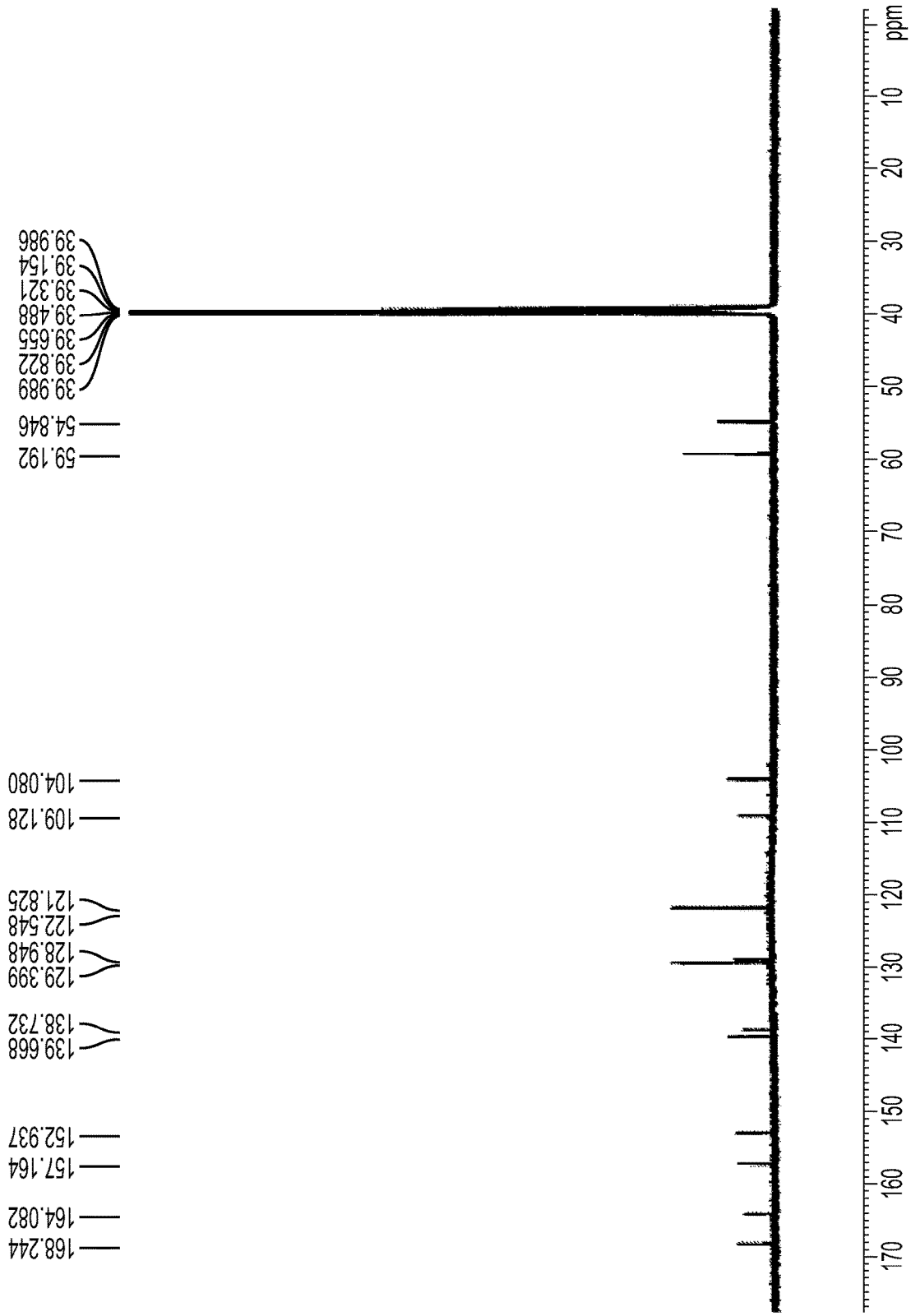
FIG. 4 is the 13C NMR spectrum of the chromophore 2 obtained in example 1.

2) Coupling:

Firstly, 154 g (0.1 mol) of 3,5-dihydroxybenzoic acid were added to 200 g of water for beating, the pH was adjusted to 8.0-9.0 with soda ash, the temperature was controlled at 20° C. to 25° C., and the beaten 3,5-dihydroxybenzoic acid solution was added to the diazo solution of 0.1 mol para-ester obtained in step 1), the reaction was carried out for 0.5 hour to 2.5 hours by controlling pH at 4.0 with 30% liquid alkali and temperature at 0° C. to 20° C., when the content of the free 3,5-dihydroxybenzoic acid was detected to be below 3% by HPLC the reaction was ended, and chromophore 2 represented by the following formula (A) was obtained and characterized by H1-NHR spectra [$^1$HNMR (DMSO-d6) [3.68-3.71 ppm 2H(t), 3.98-4.01 ppm 2H(t), 6.42 ppm 1H(s), 6.62 ppm 1H(s), 7.96-7.97 ppm 2H (d), 8.05-8.07 ppm 2H (d)]. The spectra of chromophore 2 were shown as FIGS. 3 and 4.

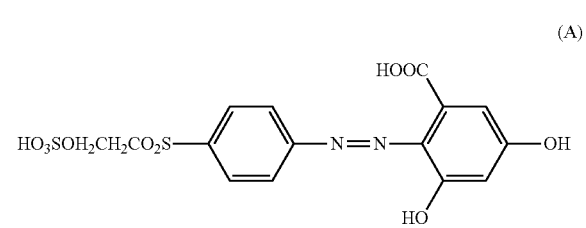

(A)

Figure 2:
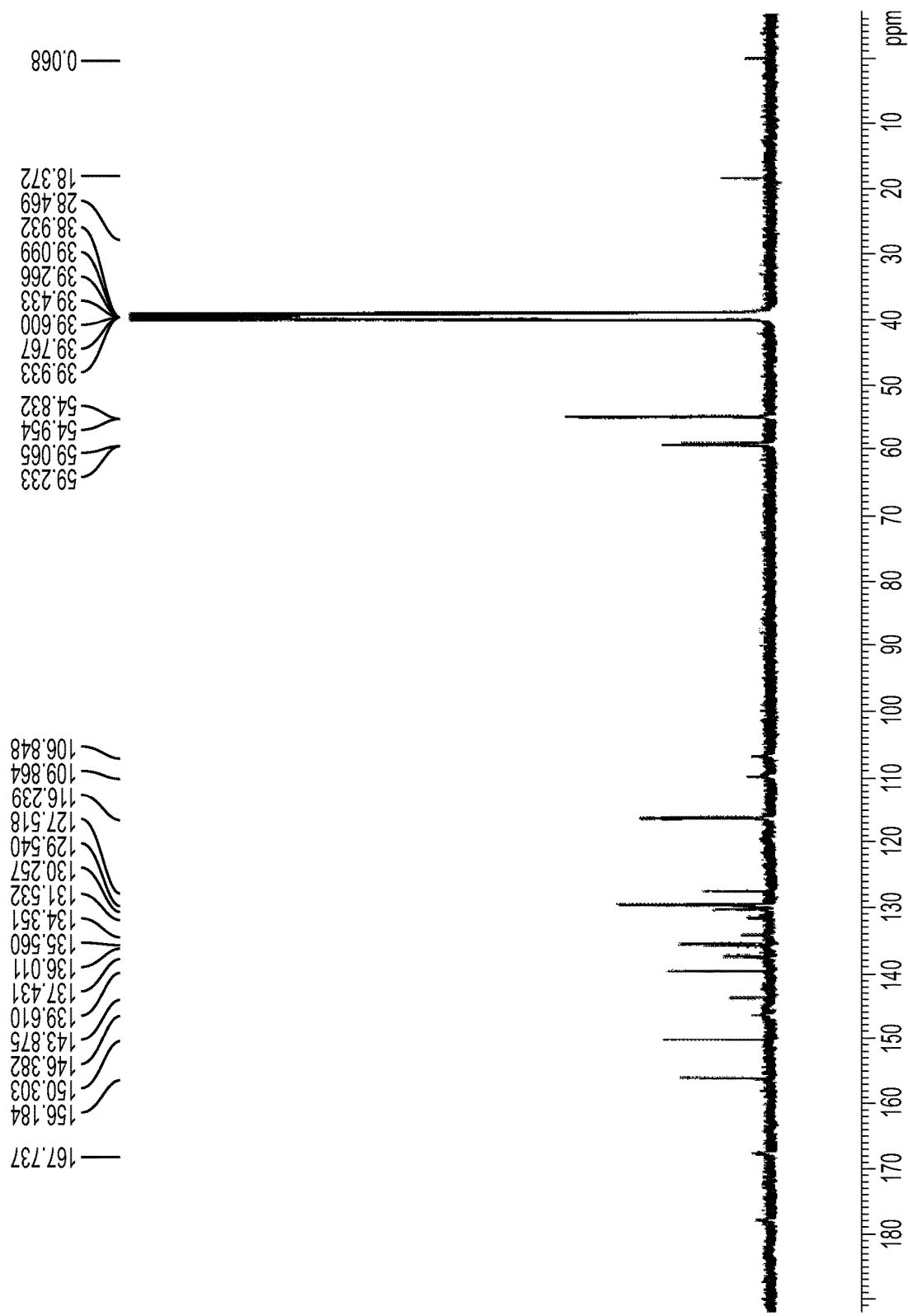
FIG. 2 is the 13C NMR spectrum of the compound (I-1) obtained in example 1.

The diazo solution of chromophore 1 obtained in step (1) was added to the chromophore 2, the coupling reaction was further carried out for 0.5 h to 10 h by controlling pH at between 5.0 and 8.0 with 30% liquid alkali and temperature at 0° C. to 20° C. The diazo was tested with H-acid test solution, if the bleed circle was colorless, it meant that the diazo had been reacted completely to the end point, thereby obtaining the orange reactive dye compound (I-1). In aqueous solution its λmax=485 nm, the mass spectrum (ESI-MS)

m/z (−): 325.84 ([M−3H]$^{3-}$/3), 488.96 ([M−2H]$^{2-}$/2), 978.89 ([M−H]$^{-1}$). The dye (in terms of free sulfonic acid) had the molecular weight M of 980.0, and was characterized by H1-NHR spectra [$^1$HNMR (DMSO-d6) [3.61-3.74 ppm 4H(m), 3.96-4.04 ppm 4H(m), 6.22 ppm 1H(s), 7.48-8.20 ppm 8H(m), 8.40 ppm 1H(s), 9.02 ppm 1H (s), 11.1 ppm 1H (s)]. The spectra of the compound (I-1) were shown as FIGS. 1 and 2.

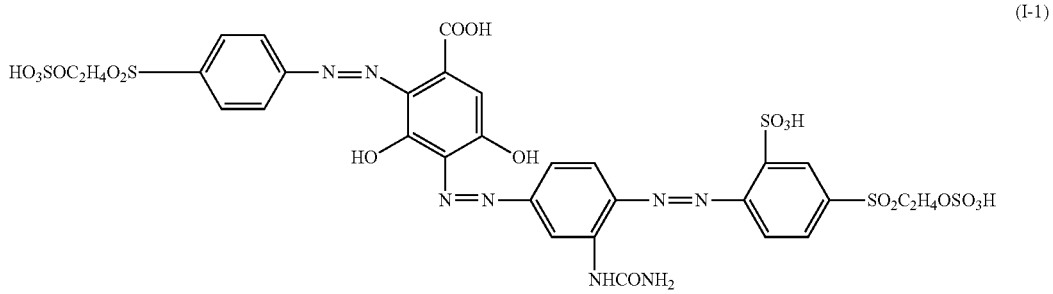

(I-1)

Examples 2~58

Referring to the preparation method of the azo dye described in example 1, using intermediate materials well known in the art, the dye compounds of the formulae shown in the following tables 1 were respectively prepared by stepwise diazotization and coupling reaction.

TABLE 1

| Examples | Reactive dye compounds | λmax (nm) |
|---|---|---|
| 2 | (I-2) | 480 |
| 3 | (I-3) | 485 |
| 4 | (I-4) | 490 |

TABLE 1-continued

| Examples | Reactive dye compounds | λmax (nm) |
|---|---|---|
| 5 | (I-5) | 495 |
| 6 | (I-6) | 490 |
| 7 | (I-7) | 465 |
| 8 | (I-8) | 470 |
| 9 | (I-9) | 465 |

TABLE 1-continued
| Examples | Reactive dye compounds | λmax (nm) |
|---|---|---|
| 10 | 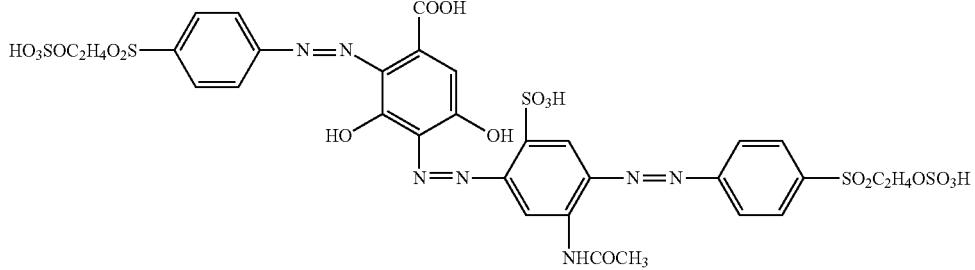 (I-10) | 465 |
| 11 | 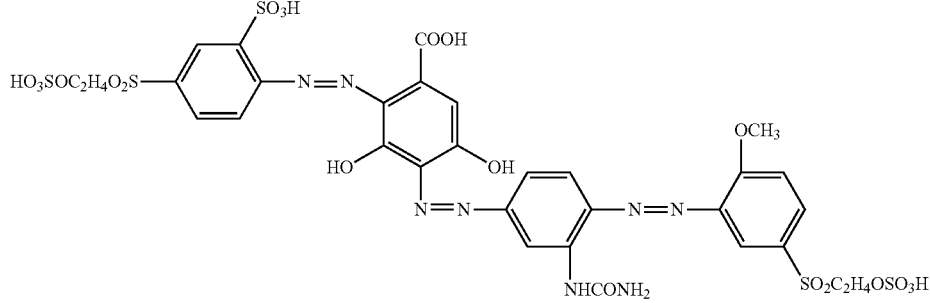 (I-11) | 480 |
| 12 | 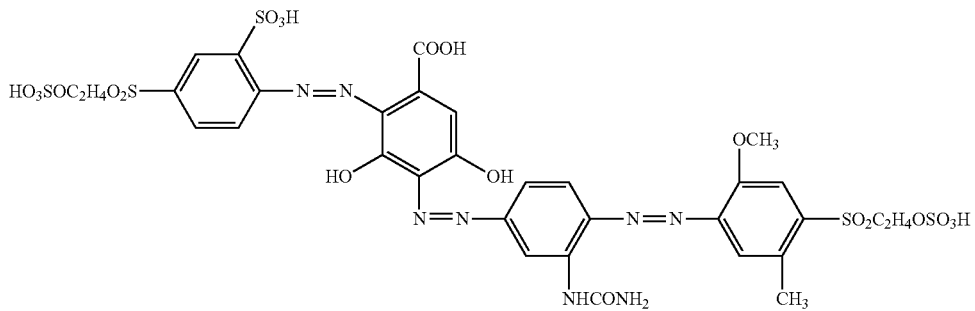 (I-12) | 480 |
| 13 | 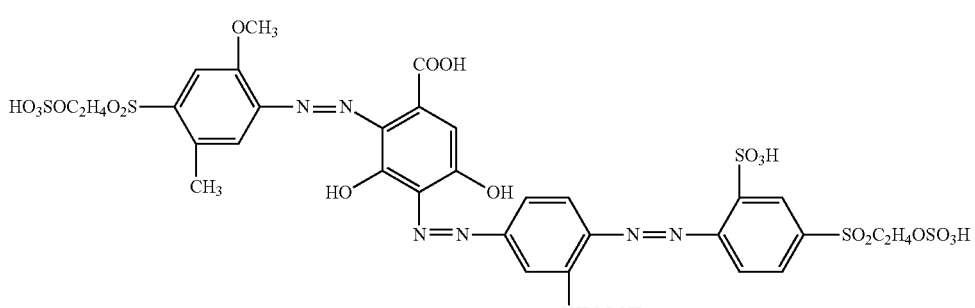 (I-13) | 475 |

TABLE 1-continued
| Examples | Reactive dye compounds | λmax (nm) |
|---|---|---|
| 14 | 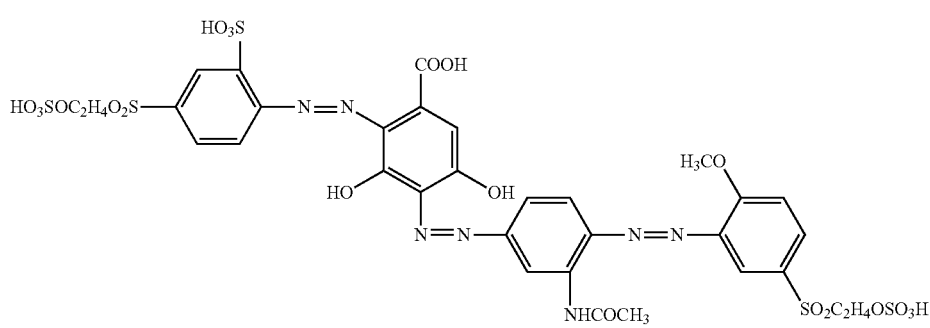 (I-14) | 470 |
| 15 | 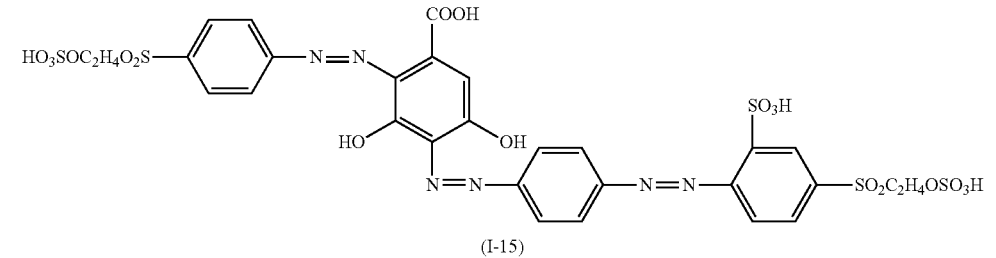 (I-15) | 470 |
| 16 | 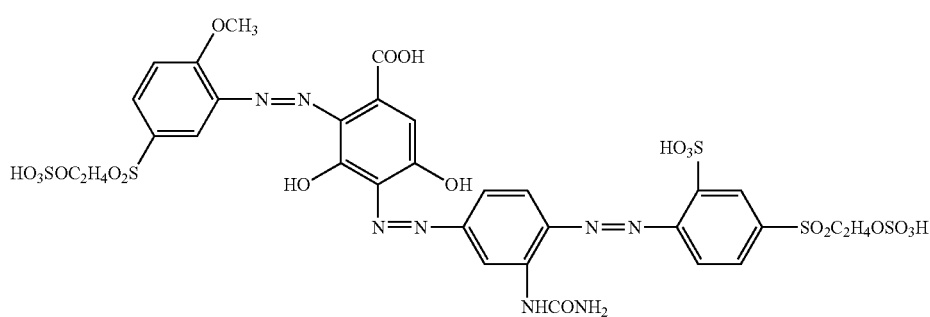 (I-16) | 485 |
| 17 | 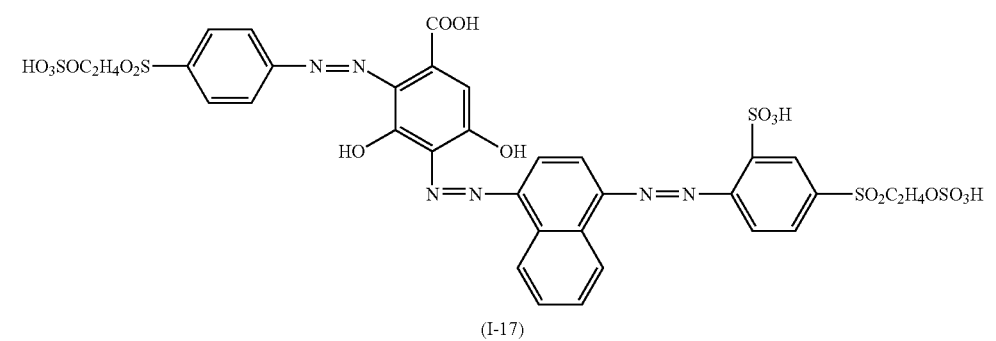 (I-17) | 520 |

TABLE 1-continued
| Examples | Reactive dye compounds | λmax (nm) |
|---|---|---|
| 18 | 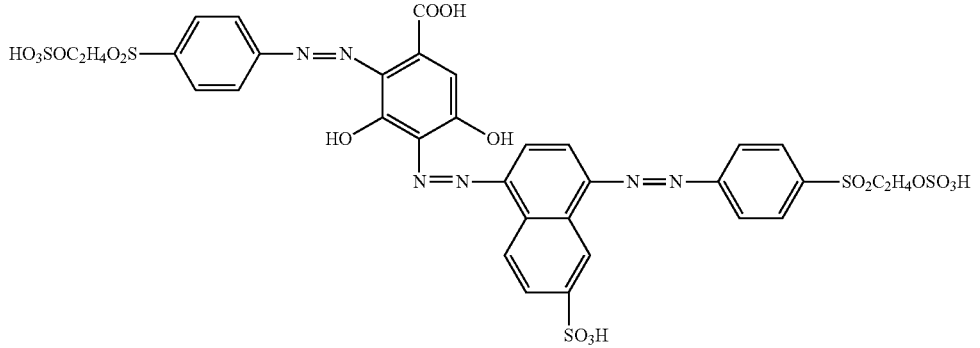 (I-18) | 510 |
| 19 | 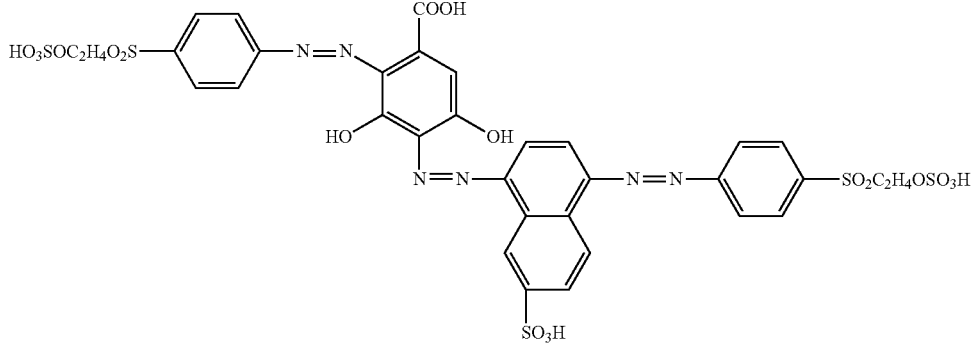 (I-19) | 510 |
| 20 | 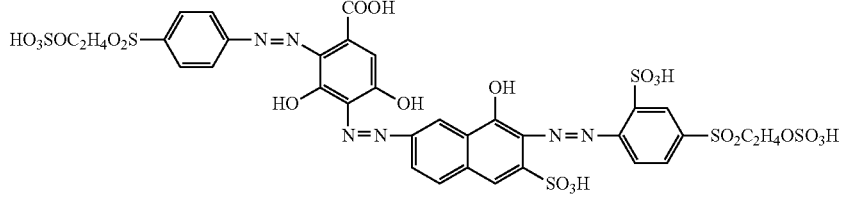 (I-20) | 525 |
| 21 | 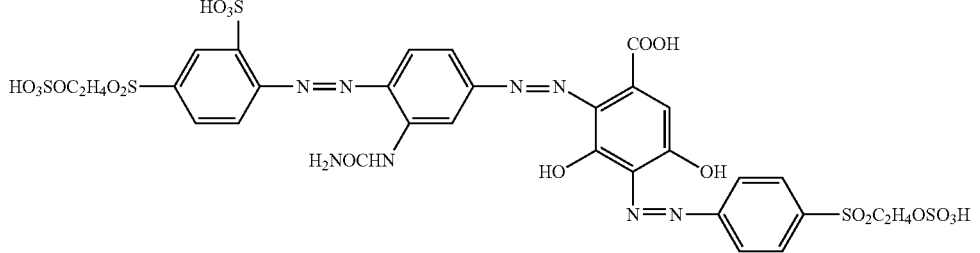 (1A-21) | 500 |

TABLE 1-continued

| Examples | Reactive dye compounds | λmax (nm) |
|---|---|---|
| 22 | (I-22) | 510 |
| 23 | (I-23) | 470 |
| 24 | (I-24) | 510 |
| 25 | (I-25) | 520 |
| 26 | (I-26) | 510 |

TABLE 1-continued

| Examples | Reactive dye compounds | λmax (nm) |
|---|---|---|
| 27 | (I-27) | 500 |
| 28 | (I-28) | 510 |
| 29 | (I-29) | 535 |
| 30 | (I-30) | 535 |
| 31 | (I-31) | 485 |

TABLE 1-continued

| Examples | Reactive dye compounds | λmax (nm) |
|---|---|---|
| 32 | (I-32) | 485 |
| 33 | (I-33) | 485 |
| 34 | (I-33) | 500 |
| 35 | (I-35) | 510 |

TABLE 1-continued
| Examples | Reactive dye compounds | λmax (nm) |
|---|---|---|
| 36 | 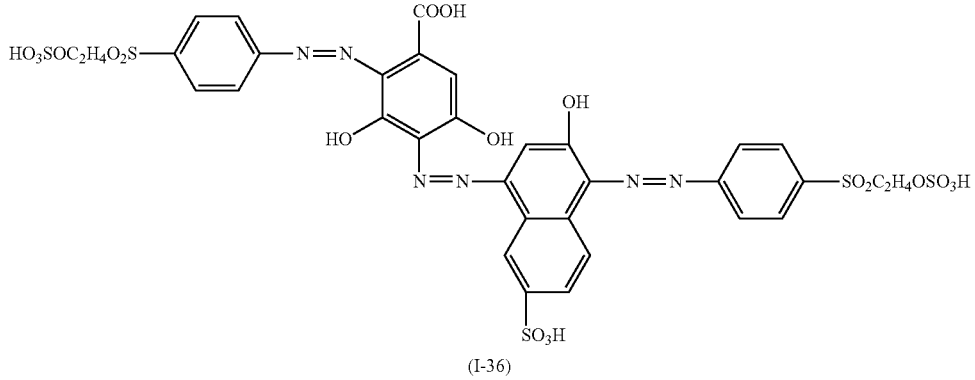 (I-36) | 515 |
| 37 | 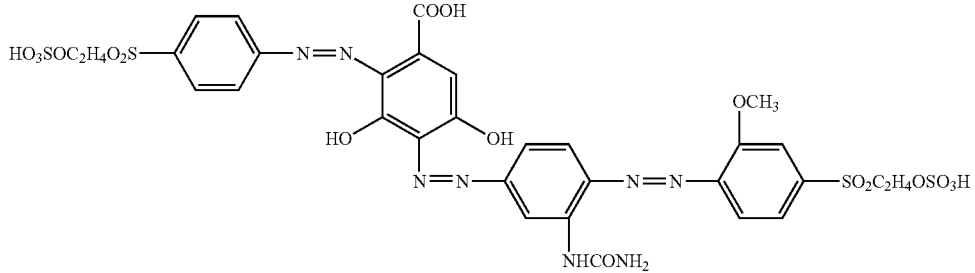 (I-37) | 475 |
| 38 | 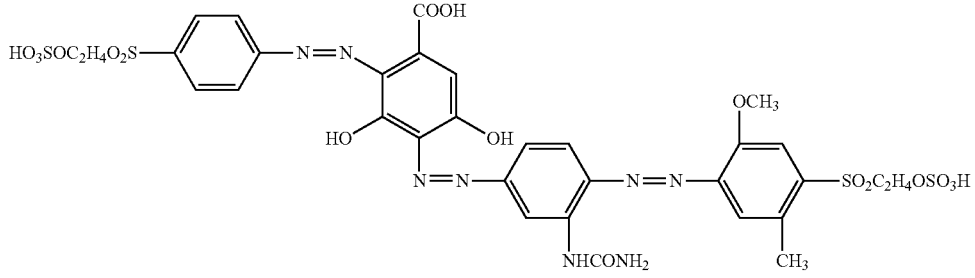 (I-38) | 480 |
| 39 | 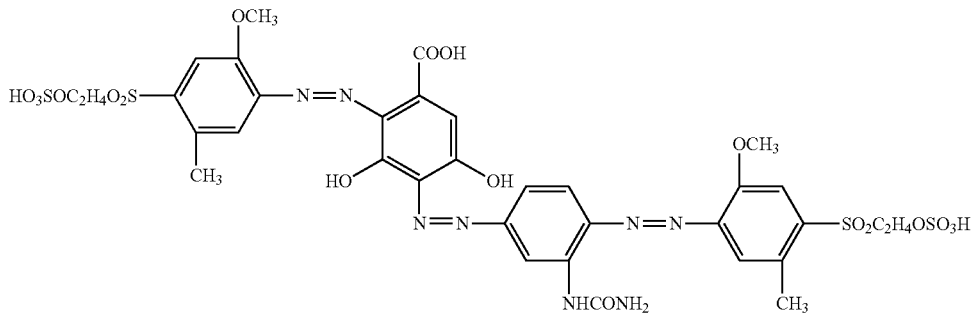 (I-39) | 485 |

TABLE 1-continued
| Examples | Reactive dye compounds | λmax (nm) |
|---|---|---|
| 40 | 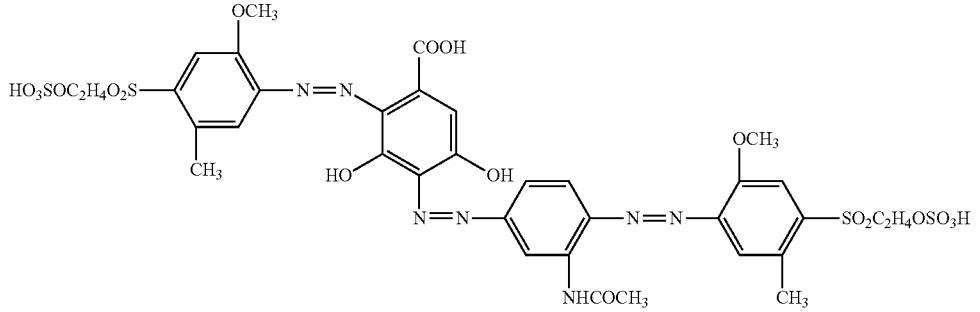 (I-40) | 485 |
| 41 | 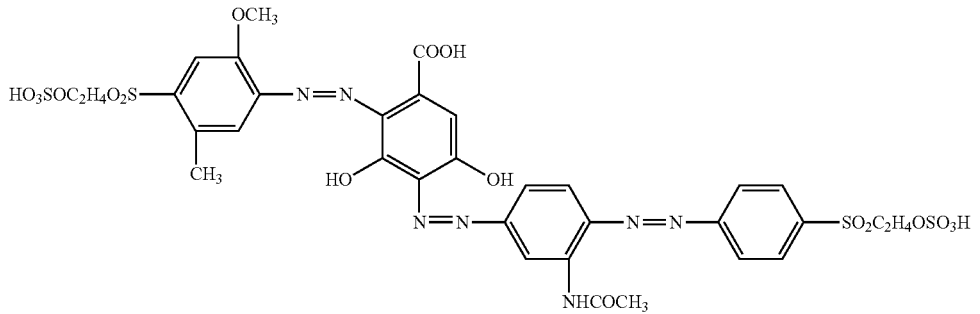 (I-41) | 480 |
| 42 | 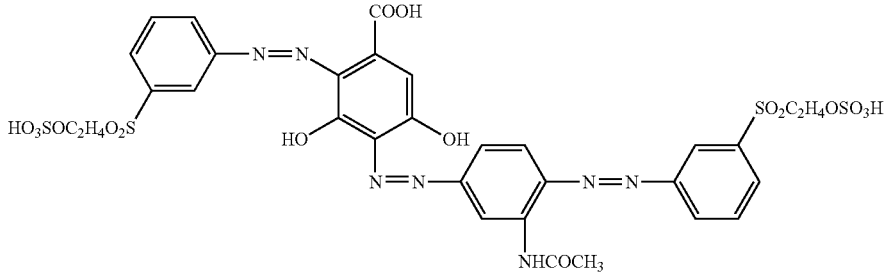 (I-42) | 480 |
| 43 | 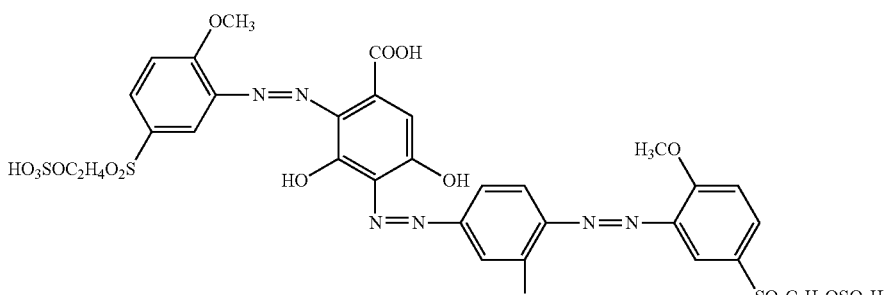 (I-43) | 490 |

TABLE 1-continued
| Examples | Reactive dye compounds | λmax (nm) |
|---|---|---|
| 44 | 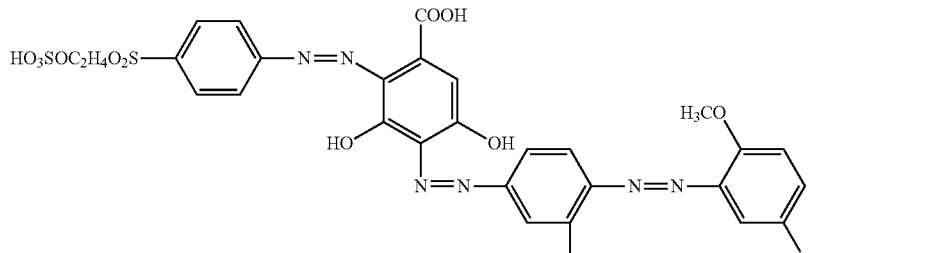<br>(I-44) | 485 |
| 45 | 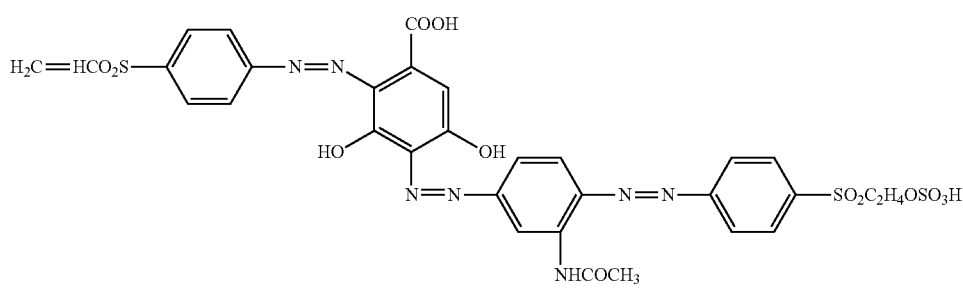<br>(I-45) | 480 |
| 46 | 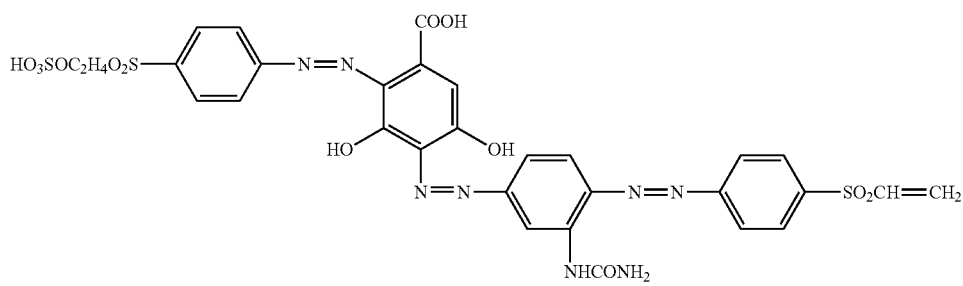<br>(I-46) | 480 |
| 47 | 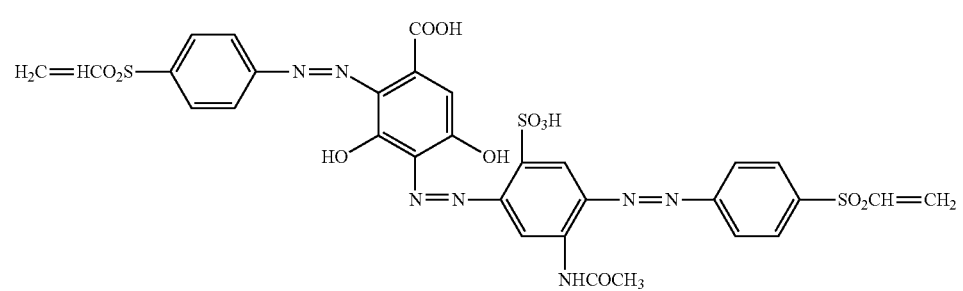<br>(I-47) | 475 |

TABLE 1-continued
| Examples | Reactive dye compounds | λmax (nm) |
|---|---|---|
| 48 | 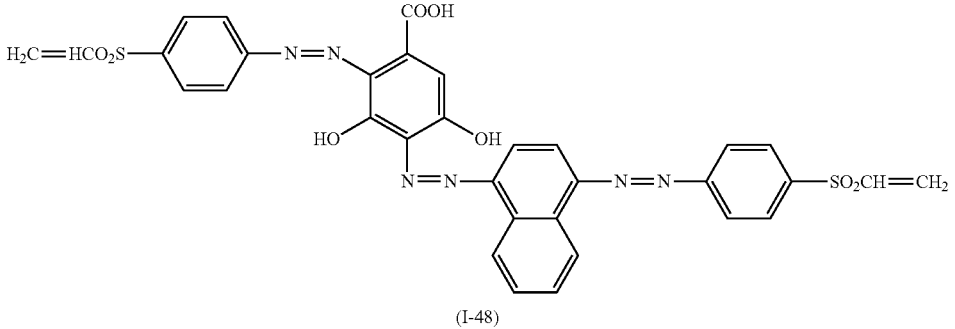 (I-48) | 500 |
| 49 | 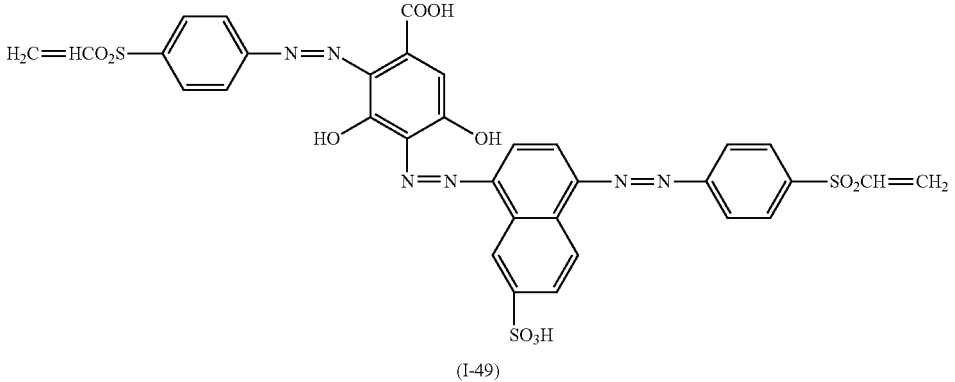 (I-49) | 505 |
| 50 | 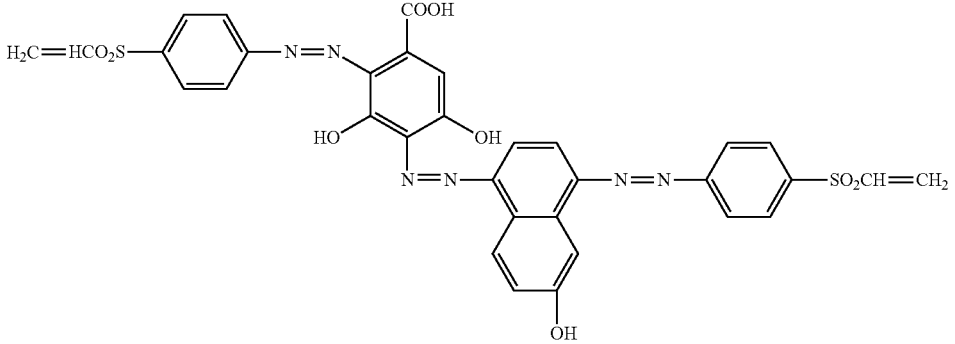 (I-50) | 510 |
| 51 | 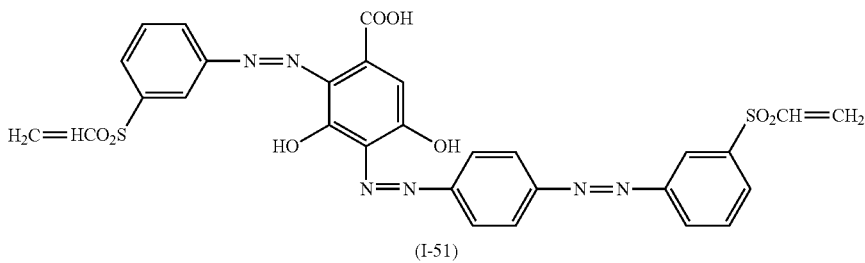 (I-51) | 470 |

TABLE 1-continued

| Examples | Reactive dye compounds | λmax (nm) |
|---|---|---|
| 52 | (I-52) | 485 |
| 53 | (I-53) | 475 |
| 54 | (I-54) | 480 |
| 55 | (I-55) | 495 |
| 56 | (I-56) | 490 |

TABLE 1-continued
| Examples | Reactive dye compounds | λmax (nm) |
|---|---|---|
| 57 | 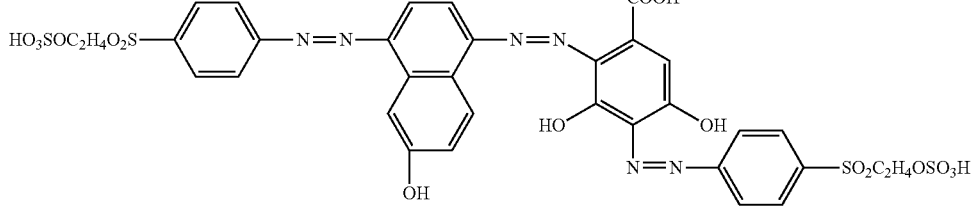<br>(I-57) | 500 |
| 58 | 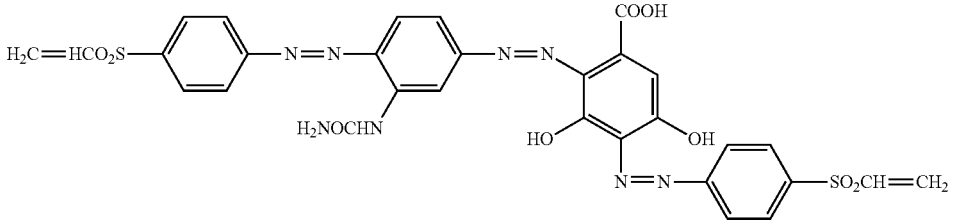<br>(I-58) | 470 |
Comparative Example 1
According to example 38 in patent CN1266869, the reactive dye compound represented by the following formula was prepared:
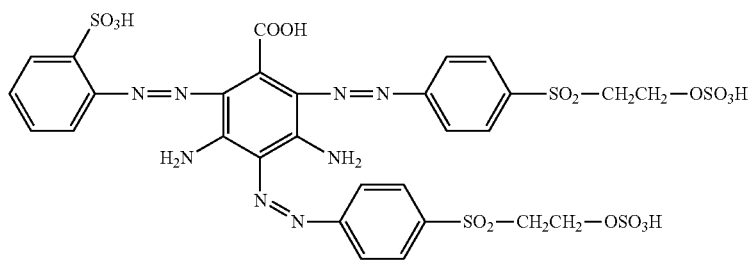
Comparative Example 2
According to example 9 in patent CN1283054, the reactive dye compound represented by the following formula was prepared:
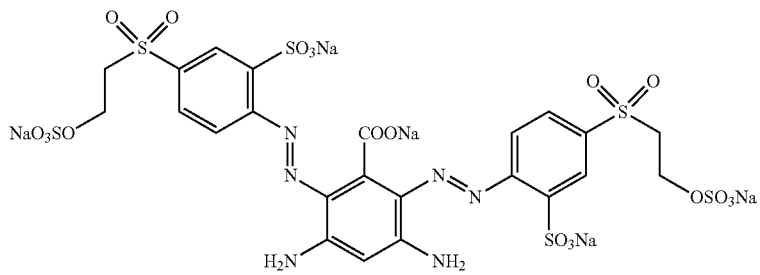

Comparative Example 3

According to example 11 in patent CN101283054, the reactive dye compound represented by the following formula was prepared:

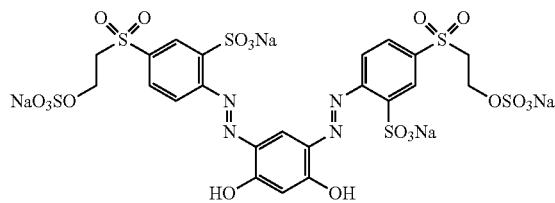

Application Example 1

The reactive dyes obtained in examples 1~58 and comparative examples 1~3 were respectively dissolved in water, and Yuanming powder was added to prepare dyeing solutions with a final concentration of 50 g/L. The dyeing concentration (dye to cloth weight) was set at 4% and the bath ratio (gram weight of cloth to milliliter volume of dyeing solution) was set at 1:20, cotton was placed in the bath for adsorption at 60° C. for 30 minutes, alkali (sodium carbonate 20 g/L) was added for dye fixation for 45 minutes, the dyed fabrics were washed with water, soaped, and dried to obtain a orange to reddish brown dyed fabric. The staining fastness to washing test and rubbing fastness test were carried out according to the methods of ISO 105 C10-2006 and ISO 105×12, respectively. The results were shown in table 2:

TABLE 2

| | Staining fastness to washing (ISO 105 C10-2006), grade 95° C. × 30 min | | | | | | Rubbing fastness, grade | |
|---|---|---|---|---|---|---|---|---|
| Examples | Acetate fiber | Cotton | Nylon | Polyester | Acrylon | Wool | Dry-rubbing | Wet-rubbing |
| 1 | 4-5 | 4-5 | 4~5 | 5 | 4~5 | 4 | 4~5 | 3-4 |
| 2 | 4-5 | 4-5 | 4-5 | 5 | 4~5 | 4 | 4~5 | 3-4 |
| 3 | 4-5 | 4-5 | 4 | 5 | 5 | 4-5 | 5 | 3-4 |
| 4 | 4-5 | 4-5 | 4-5 | 5 | 5 | 4-5 | 5 | 3-4 |
| 5 | 4-5 | 4-5 | 4-5 | 5 | 5 | 4-5 | 5 | 3-4 |
| 6 | 4-5 | 4-5 | 4-5 | 5 | 5 | 4-5 | 5 | 3-4 |
| 7 | 4-5 | 4-5 | 5 | 5 | 4~5 | 4 | 4~5 | 3 |
| 8 | 4-5 | 4-5 | 4~5 | 5 | 4~5 | 4 | 4~5 | 3-4 |
| 9 | 4-5 | 4-5 | 4~5 | 5 | 4~5 | 4 | 4~5 | 3-4 |
| 10 | 4-5 | 4-5 | 5 | 5 | 4~5 | 4 | 4~5 | 3 |
| 11 | 4-5 | 4-5 | 4 | 5 | 5 | 4-5 | 5 | 3-4 |
| 12 | 4-5 | 4-5 | 4 | 5 | 5 | 4-5 | 5 | 3-4 |
| 13 | 4-5 | 4-5 | 4 | 5 | 5 | 4-5 | 5 | 3-4 |
| 14 | 4-5 | 4-5 | 4 | 5 | 5 | 4-5 | 5 | 3-4 |
| 15 | 4-5 | 4-5 | 4~5 | 5 | 5 | 4-5 | 5 | 3 |
| 16 | 4-5 | 4-5 | 4 | 5 | 5 | 4-5 | 5 | 3 |
| 17 | 4-5 | 4-5 | 4 | 5 | 5 | 4-5 | 5 | 3-4 |
| 18 | 4-5 | 4-5 | 5 | 5 | 4~5 | 4 | 4~5 | 3-4 |
| 19 | 4-5 | 4-5 | 5 | 5 | 4~5 | 4 | 4~5 | 3-4 |
| 20 | 4-5 | 4-5 | 4 | 5 | 5 | 4-5 | 5 | 3-4 |
| 21 | 4-5 | 4-5 | 4 | 5 | 5 | 4-5 | 5 | 3-4 |
| 22 | 4-5 | 4-5 | 4 | 5 | 5 | 4-5 | 5 | 3-4 |
| 23 | 4-5 | 4-5 | 4 | 5 | 5 | 4-5 | 5 | 3-4 |
| 24 | 4-5 | 4-5 | 4~5 | 5 | 4~5 | 4 | 4~5 | 3 |
| 25 | 4-5 | 4-5 | 4~5 | 5 | 5 | 4-5 | 5 | 3 |
| 26 | 4-5 | 4-5 | 4~5 | 5 | 4~5 | 4 | 4~5 | 3-4 |
| 27 | 4-5 | 4-5 | 4~5 | 5 | 4~5 | 4 | 4~5 | 3-4 |
| 28 | 4-5 | 4-5 | 4~5 | 5 | 4~5 | 4 | 4~5 | 3-4 |
| 29 | 4-5 | 4-5 | 4~5 | 5 | 4~5 | 4 | 4~5 | 3-4 |
| 30 | 4-5 | 4-5 | 4~5 | 5 | 4~5 | 4 | 4~5 | 3-4 |
| 31 | 4-5 | 4-5 | 4 | 5 | 5 | 4-5 | 5 | 3-4 |
| 32 | 4-5 | 4-5 | 4 | 5 | 5 | 4-5 | 5 | 3-4 |
| 33 | 4-5 | 4-5 | 4~5 | 5 | 4~5 | 4 | 4~5 | 3-4 |
| 34 | 4~5 | 4~5 | 4~5 | 5 | 4~5 | 4 | 4~5 | 3-4 |
| 35 | 4~5 | 4~5 | 5 | 5 | 4~5 | 4 | 4~5 | 3-4 |
| 36 | 4~5 | 4~5 | 4~5 | 5 | 4~5 | 4 | 4~5 | 3-4 |
| 37 | 4~5 | 4~5 | 4~5 | 5 | 4~5 | 4 | 4~5 | 3-4 |
| 38 | 4~5 | 4~5 | 4~5 | 5 | 4~5 | 4 | 4~5 | 3-4 |
| 39 | 4~5 | 4~5 | 4~5 | 5 | 4~5 | 4 | 4~5 | 3-4 |
| 40 | 4~5 | 4~5 | 4~5 | 5 | 4~5 | 4 | 4~5 | 3-4 |
| 41 | 4~5 | 4~5 | 4~5 | 5 | 4~5 | 4 | 4~5 | 3-4 |
| 42 | 4~5 | 4~5 | 4~5 | 5 | 4~5 | 4 | 4~5 | 3-4 |
| 43 | 4~5 | 4~5 | 4~5 | 5 | 4~5 | 4 | 4~5 | 3-4 |
| 44 | 4~5 | 4~5 | 4~5 | 5 | 4~5 | 4 | 4~5 | 3-4 |
| 45 | 4~5 | 4~5 | 4~5 | 5 | 4~5 | 4 | 4~5 | 3-4 |
| 46 | 4~5 | 4~5 | 4~5 | 5 | 4~5 | 4 | 4~5 | 3-4 |
| 47 | 4~5 | 4~5 | 4~5 | 5 | 4~5 | 4 | 4~5 | 3-4 |
| 48 | 4~5 | 4~5 | 4~5 | 5 | 4~5 | 4 | 4~5 | 3-4 |
| 49 | 4~5 | 4~5 | 4~5 | 5 | 4~5 | 4 | 4~5 | 3-4 |
| 50 | 4~5 | 4~5 | 4~5 | 5 | 4~5 | 4 | 4~5 | 3-4 |
| 51 | 4~5 | 4~5 | 4~5 | 5 | 4~5 | 4 | 4~5 | 3-4 |
| 52 | 4-5 | 4-5 | 4 | 5 | 5 | 4-5 | 5 | 3-4 |
| 53 | 4-5 | 4-5 | 4 | 5 | 5 | 4-5 | 5 | 3-4 |

TABLE 2-continued

| Examples | Staining fastness to washing (ISO 105 C10-2006), grade 95° C. × 30 min | | | | | | Rubbing fastness, grade | |
|---|---|---|---|---|---|---|---|---|
| | Acetate fiber | Cotton | Nylon | Polyester | Acrylon | Wool | Dry-rubbing | Wet-rubbing |
| 54 | 4~5 | 4~5 | 4~5 | 5 | 4~5 | 4 | 4~5 | 3-4 |
| 55 | 4~5 | 4~5 | 4~5 | 5 | 4~5 | 4 | 4~5 | 3-4 |
| 56 | 4~5 | 4~5 | 4~5 | 5 | 4~5 | 4 | 4~5 | 3-4 |
| 57 | 4~5 | 4~5 | 4~5 | 5 | 4~5 | 4 | 4~5 | 3-4 |
| 58 | 4~5 | 4~5 | 4~5 | 5 | 4~5 | 4 | 4~5 | 3-4 |
| Comparative example 1 | 4 | 3~4 | 3~4 | 4 | 4 | 3 | 4-5 | 3 |
| Comparative example 2 | 4 | 3~4 | 3~4 | 4 | 3~4 | 3 | 4-5 | 2-3 |
| Comparative example 3 | 4 | 3~4 | 3 | 4 | 4 | 3 | 4-5 | 2-3 |

As can be seen from table 2, the reactive dye compounds of the present invention were more prominent in the overall performance of washing fastness and rubbing fastness than the existing dyes.

Application Example 2

The degree of fixation of the compounds in the examples of the present invention and the reactive dyes in comparative examples 1~3 were tested according to the method of GB/T2391-2014 standard. The results were shown in table 3:

TABLE 3

| | Compounds | | | | | |
|---|---|---|---|---|---|---|
| Properties | I-1 | I-2 | I-7 | Comparative example 1 | Comparative example 2 | Comparative example 3 |
| Degree of fixation | 78.2% | 79.1% | 77.8% | 70.9% | 69.2% | 70.4% |

As can be seen from table 3, compared with the existing dyes, the reactive dye compounds of the present invention had significant improvement in staining fastness to washing and degree of fixation, and could be more widely used for printing and dyeing of cotton and blended fabrics thereof because of their good staining fastness. And the compounds had high degree of fixation, clear remanent dyeing liquor, and reduced residue of organics, and were more ecological and environmentally friendly.

Application Example 3

The build-up property of the reactive dyes of examples 1, 52, 17, 21, 22 and 25 of the present invention and comparative examples 1~3, was tested according to the method of GB/T 21875-2016 standard. The results were shown in FIG. 5, wherein S1~S6 represented the build-up curve of examples 1, 52, 17, 21, 22 and 25 respectively, and D1~D3 represented the build-up curve of comparative examples 1~3 respectively.

Figure 5:
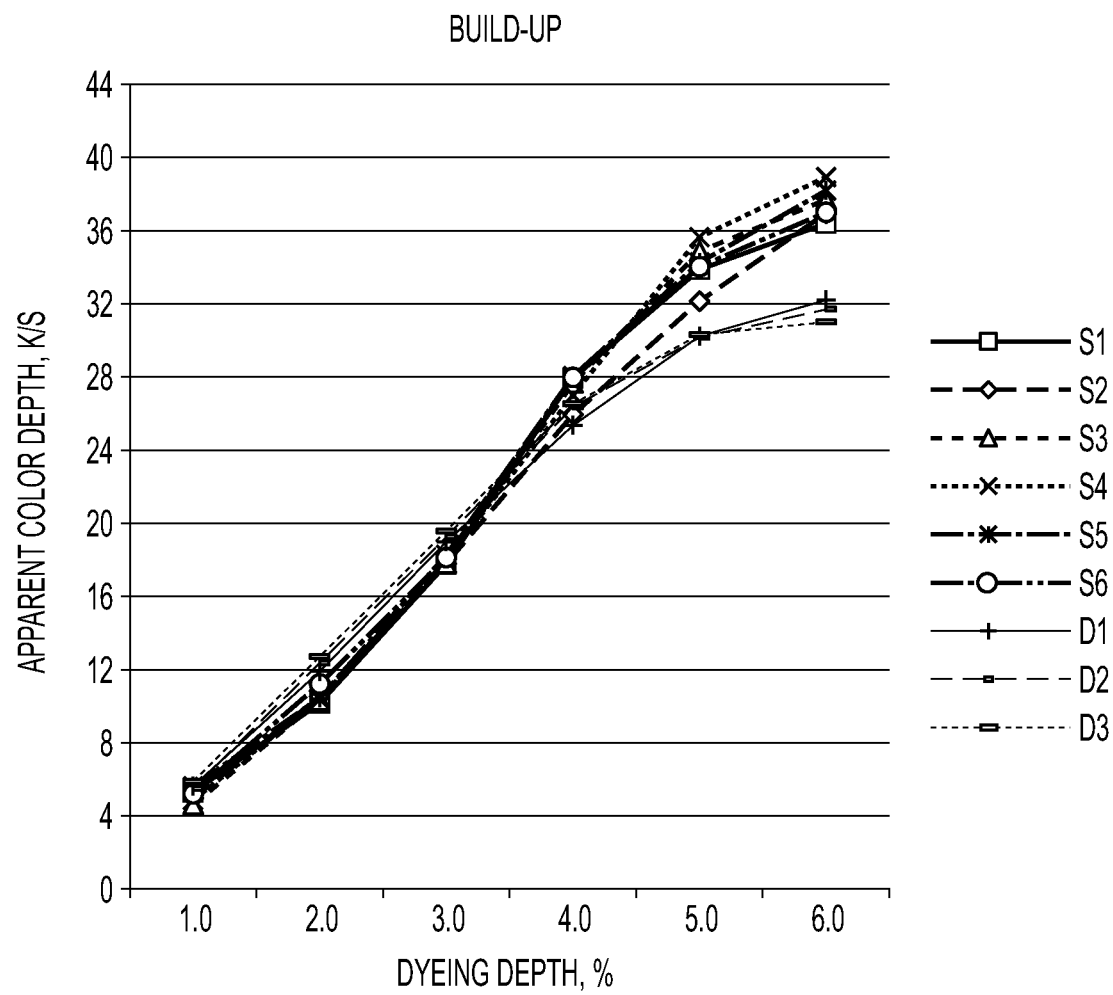
FIG. 5 is the build-up curve.

As can be seen from FIG. 5, compared with the existing dyes, the reactive dye compounds of the present invention had a remarkable increase in the apparent color depth on the cloth surface as the dyeing depth was increased, while the dyes of the comparative examples 1~3 in the late period had an almost saturated color depth as the dyeing concentration was increased.

The invention claimed is:

1. A reactive dye compound of the following formula (I) or a quinohydrazone tautomer thereof:

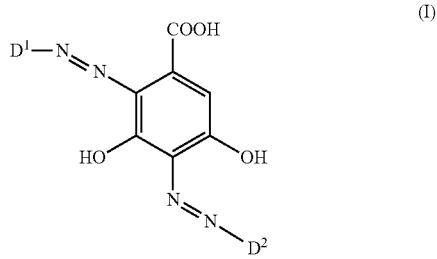

in formula (I)

$D^1$ and $D^2$ are each independently a group of the following formula (a) or (b) or (c), where $D^1$ and $D^2$ are not simultaneously selected from the following formula (a):

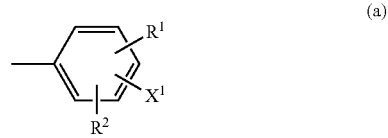

-continued

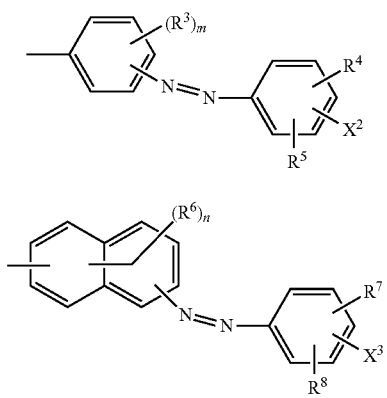

in the above formulae (a)~(c): $R^1$, $R^2$, $R^4$, $R^5$, $R^7$ and $R^8$ are each independently H, linear or branched $C_1$~$C_4$ alkyl, $C_1$~$C_4$ alkoxy or sulfo; m=0-3, each $R^3$ is independently selected from amino, sulfo, ureido, $C_1$~$C_4$ alkyl, $C_1$~$C_4$ alkanoylamino and $C_1$~$C_4$ alkoxy; n=0-3, each $R^6$ is independently selected from hydroxyl, amino and sulfo; and $X^1$, $X^2$ and $X^3$ are each independently H, linear or branched $C_1$~$C_4$ alkyl, $C_1$~$C_4$ alkoxy, —$SO_2Y^1$, —$NHCO(CH_2)_pSO_2Y_2$ or —$CONH(CH_2)_qSO_2Y^3$, and at least one of $D^1$ and $D^2$ contains a fiber-reactive group which is —$SO_2Y^1$, —$NHCO(CH_2)_pSO_2Y^2$ or —$CONH(CH_2)_qSO_2Y^3$, wherein $Y^1$~$Y^3$ are each independently —CH=$CH_2$, —$C_2H_4OSO_3H$ or —$CH_2CH_2Cl$, p=1-3, and q=1-3, or an alkali metal salt thereof.

2. The reactive dye compound as claimed in claim 1, wherein the reactive dye compound has the structure shown as the following formula (I):

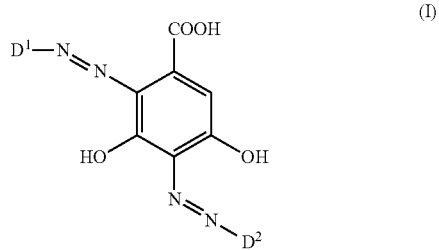

in formula (I):

$D^1$ and $D^2$ are each independently a group of the following formula (a) or (b) or (c), where $D^1$ and $D^2$ are not simultaneously selected from the following formula (a):

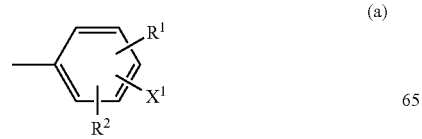

-continued

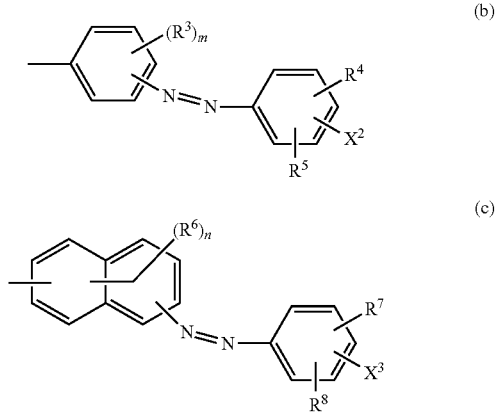

in the above formulae (a), (b) and (c): $R^1$, $R^2$, $R^4$, $R^5$, $R^7$ and $R^8$ are each independently H, linear or branched $C_1$~$C_4$ alkyl, $C_1$~$C_4$ alkoxy or sulfo; m=0-3, each $R^3$ is independently selected from sulfo, ureido, and $C_1$~$C_4$ alkanoylamino; n=0-3, each $R^6$ is independently selected from hydroxyl and sulfo; and $X^1$, $X^2$ and $X^3$ are each independently —$SO_2Y^1$, —$NHCO(CH_2)_pSO_2Y^2$ or —$CONH(CH_2)_qSO_2Y^3$, wherein $Y^1$~$Y^3$ are each independently —CH=$CH_2$, —$C_2H_4OSO_3H$ or —$CH_2CH_2Cl$, p=1-3, and q=1-3.

3. The reactive dye compound as claimed in claim 1, wherein $D^1$ is a group of formula (a), and $D^2$ is a group of formula (b) or formula (c).

4. The reactive dye compound as claimed in claim 1, wherein $R^1$, $R^2$, $R^4$, $R^5$, $R^7$ and $R^8$ are each independently selected from H, methyl, methoxy and sulfo; in the group represented by formula (b), m is 1 or 2, and each $R^3$ is independently selected from sulfo, ureido, acetylamino and methyl.

5. The reactive dye compound as claimed claim 1, wherein $D^1$ is selected from the group consisting of the following groups:

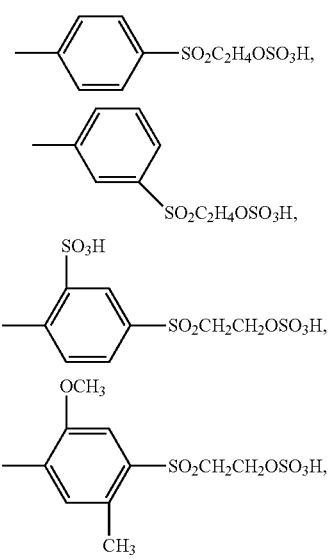

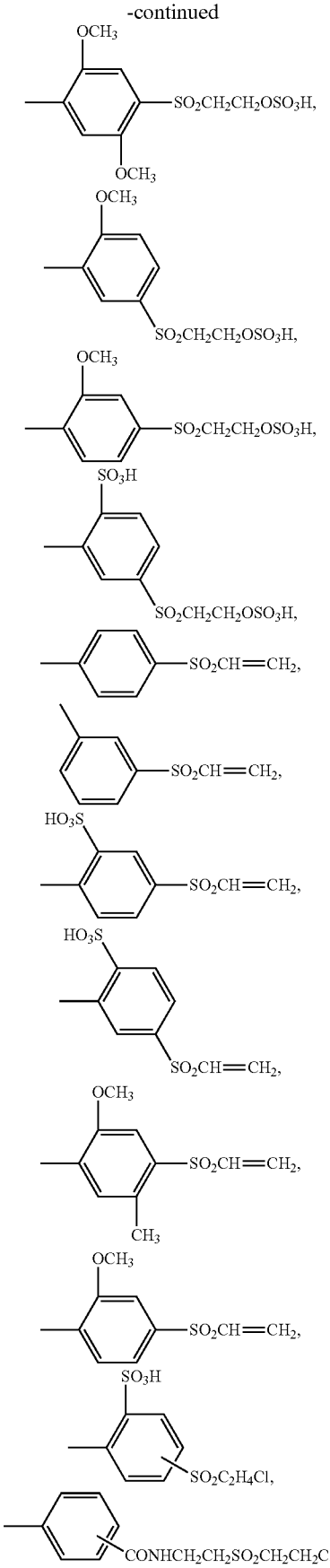
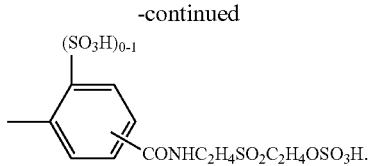
6. The reactive dye compound as claimed in claim 1, wherein $D^2$ is selected from the group consisting of the following groups:
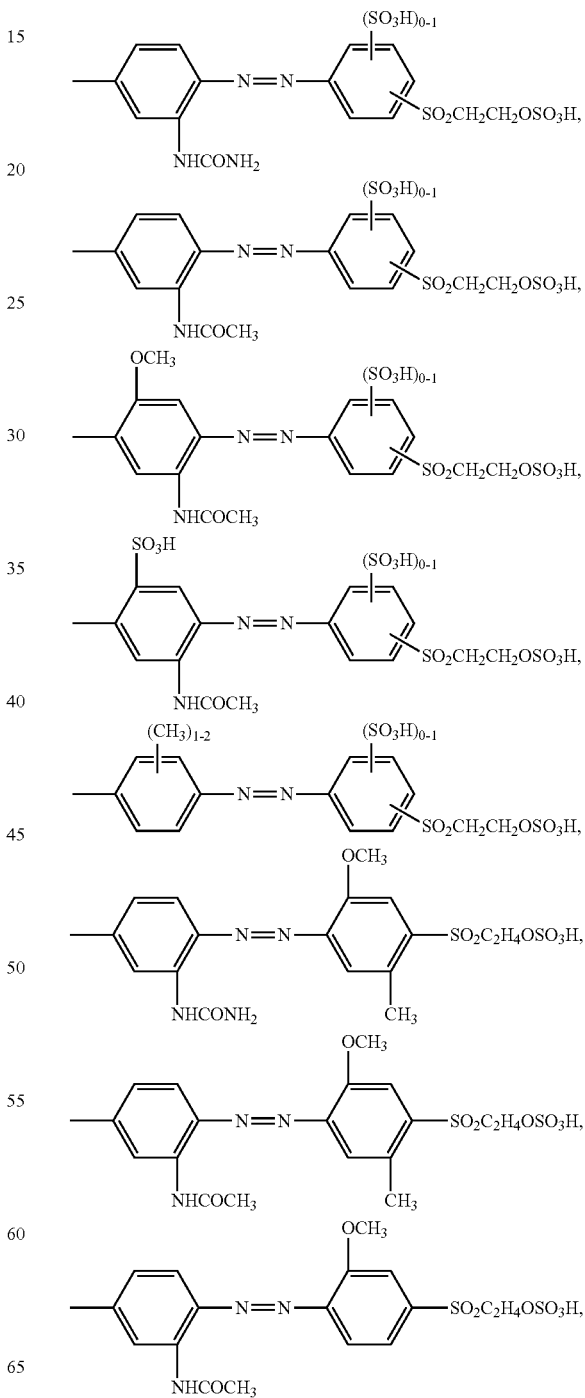

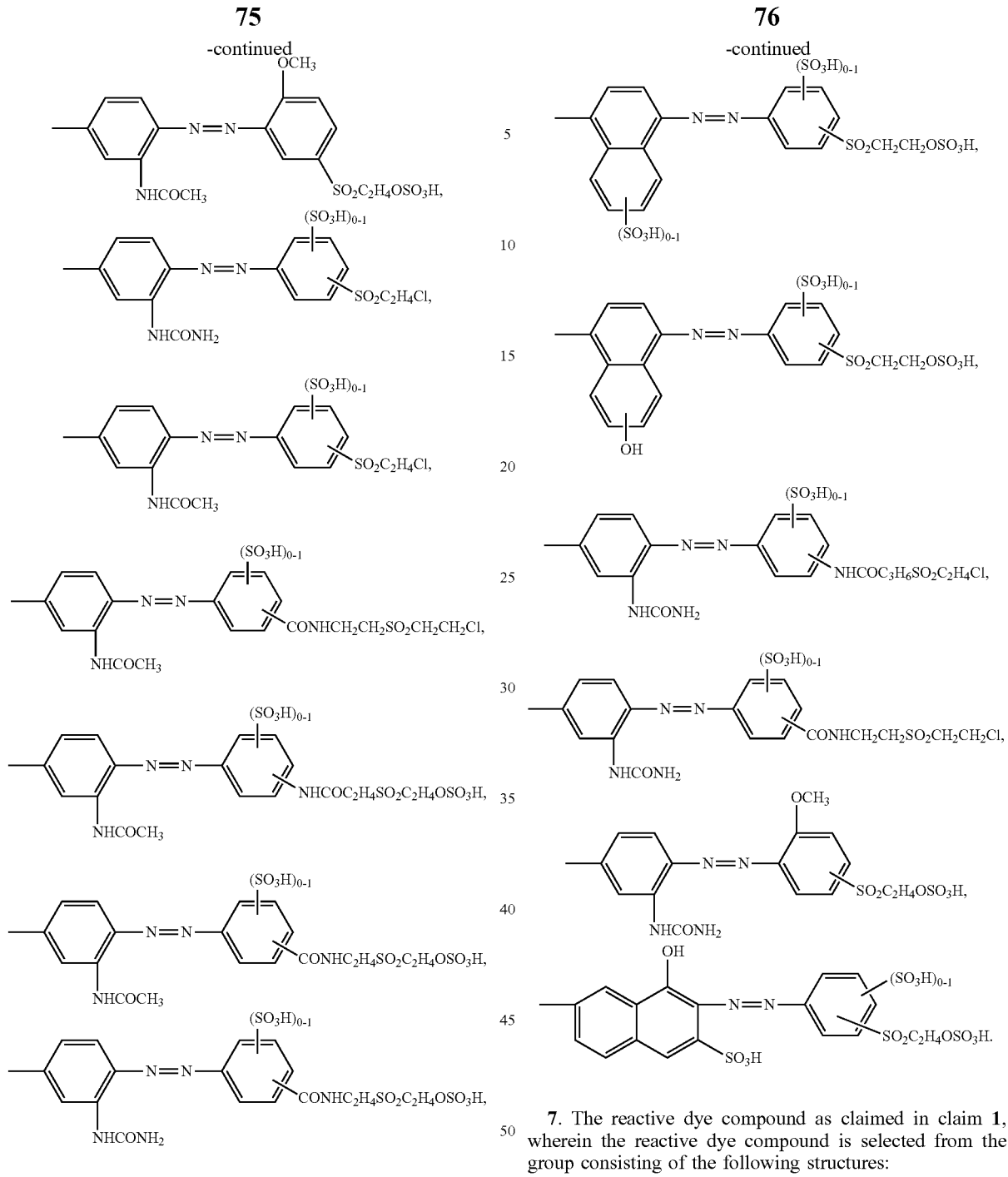
7. The reactive dye compound as claimed in claim 1, wherein the reactive dye compound is selected from the group consisting of the following structures:
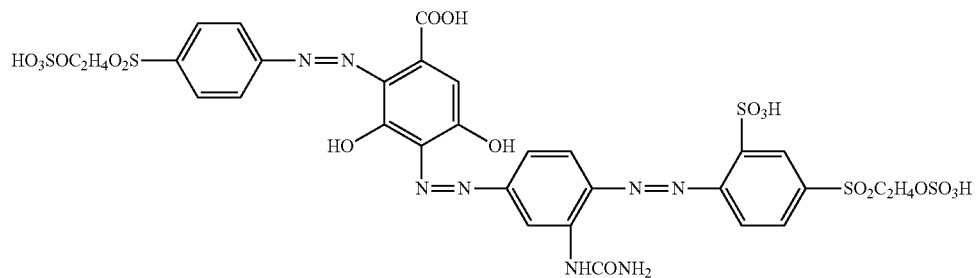

-continued
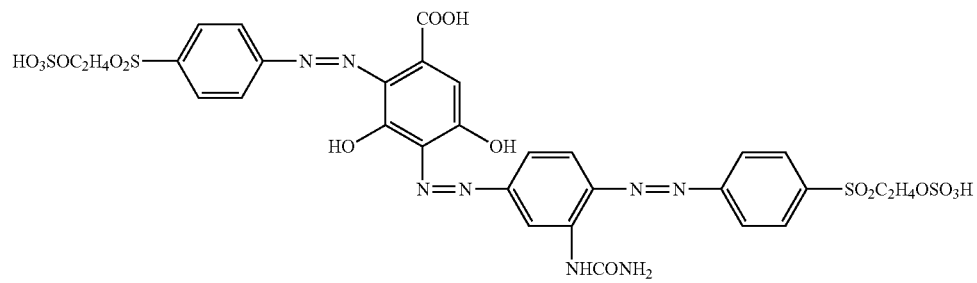
(I-2)
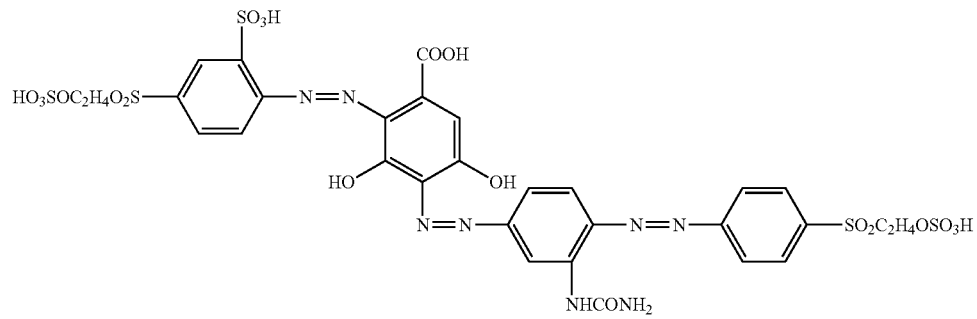
(I-3)
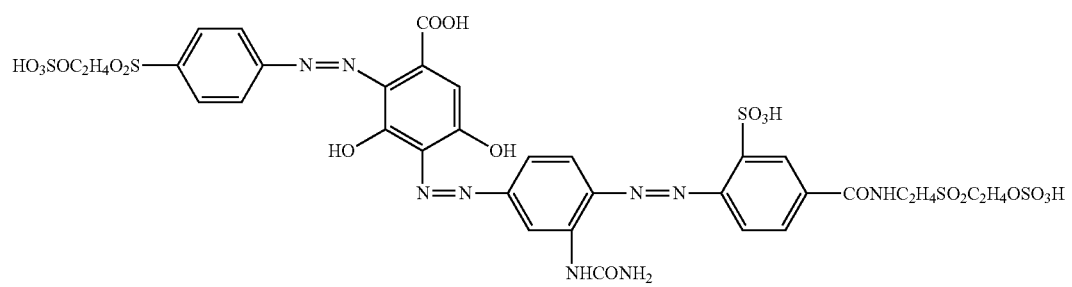
(I-4)
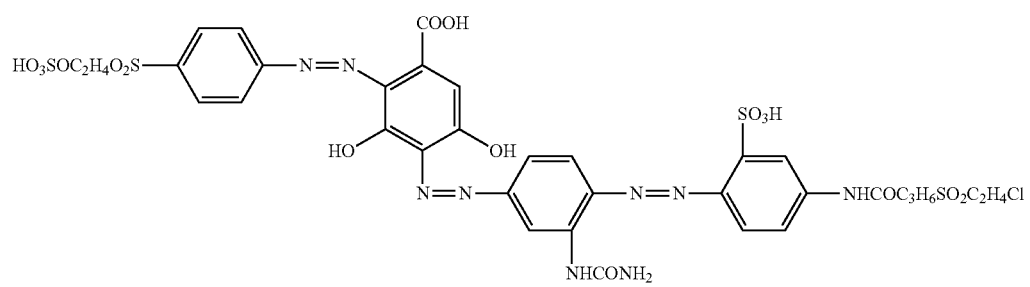
(I-5)
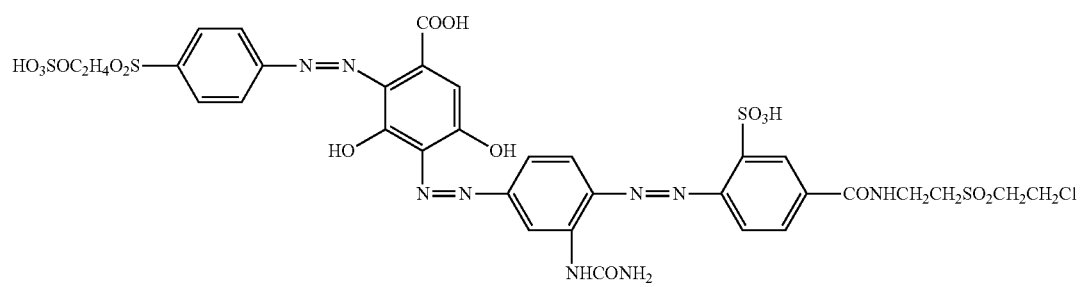
(I-6)

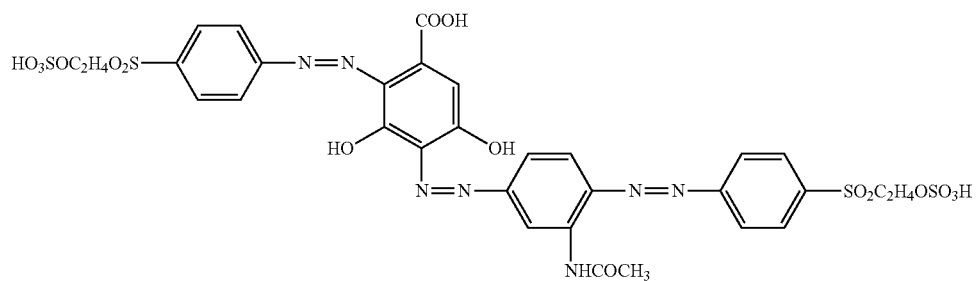
(I-7)
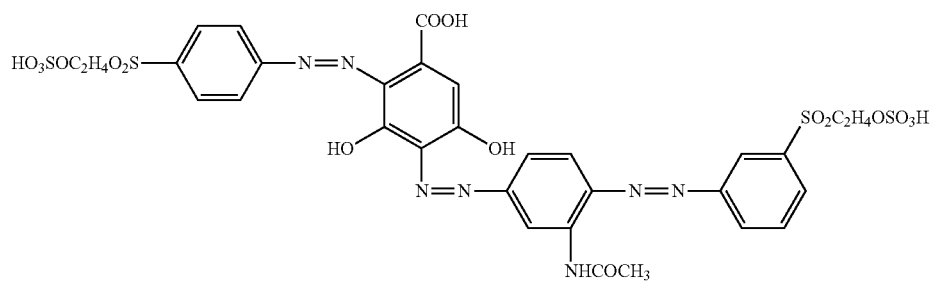
(I-8)
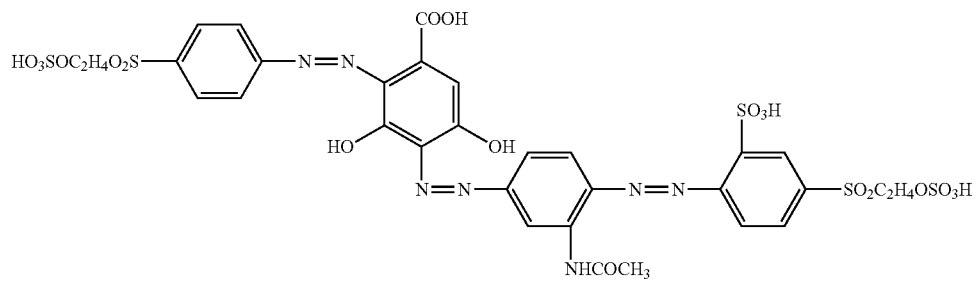
(I-9)
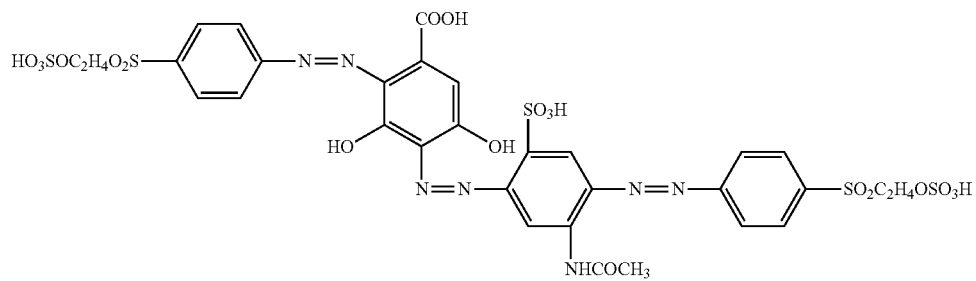
(I-10)
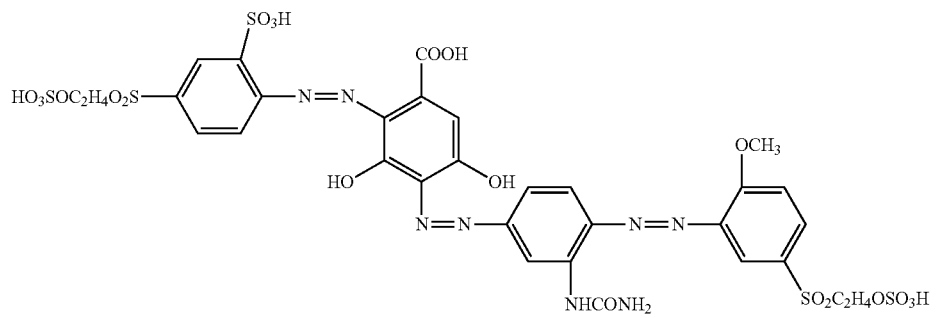
(I-11)

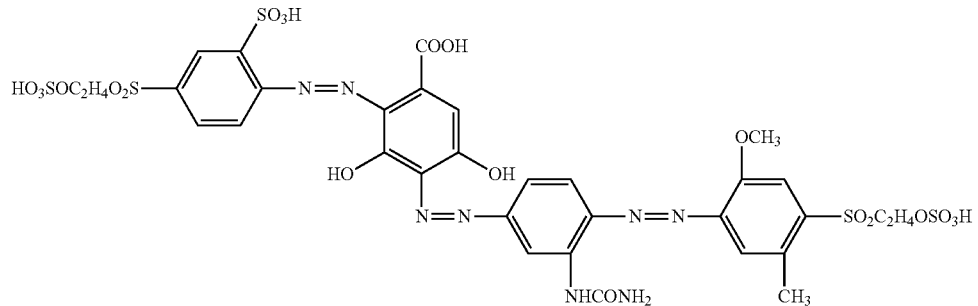
(I-12)
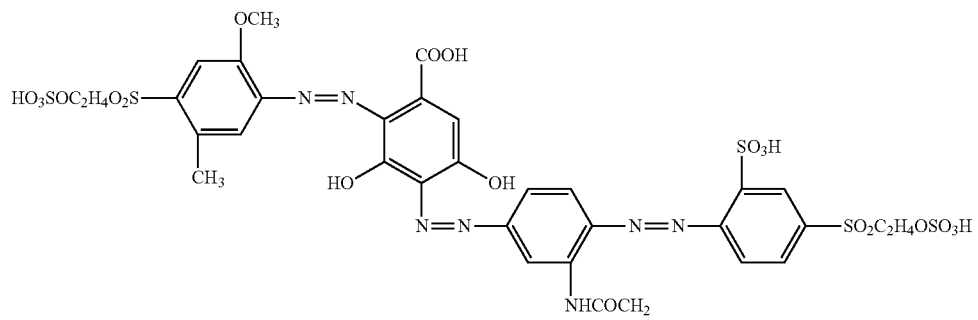
(I-13)
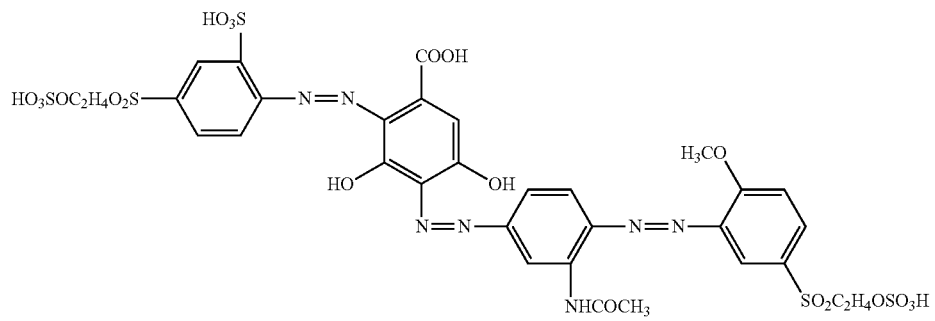
(I-14)
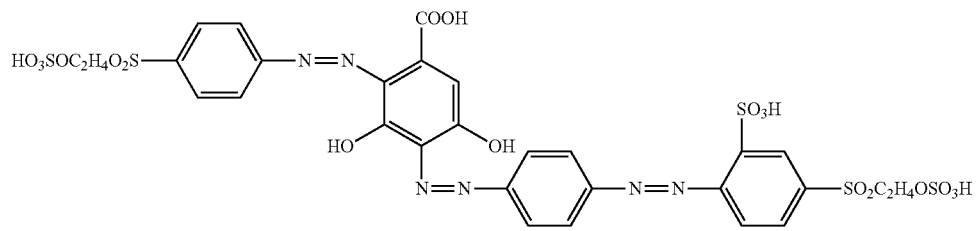
(I-15)
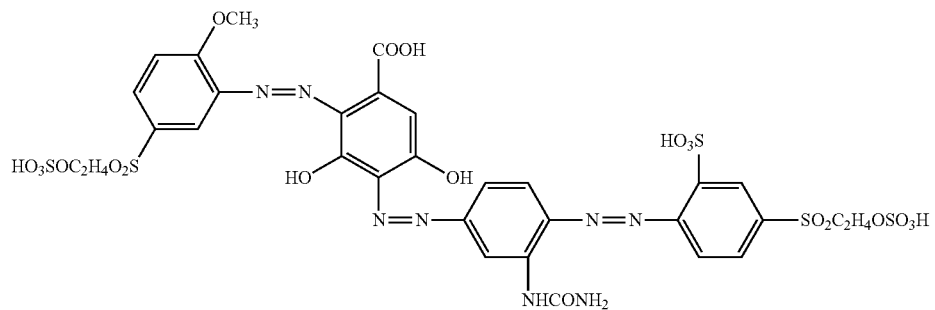
(I-16)

-continued
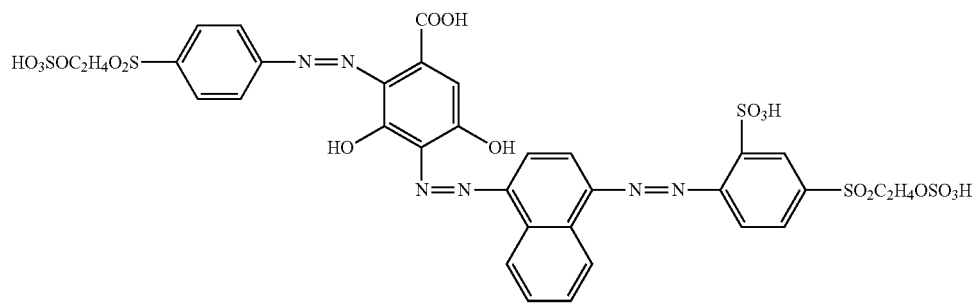
(I-17)
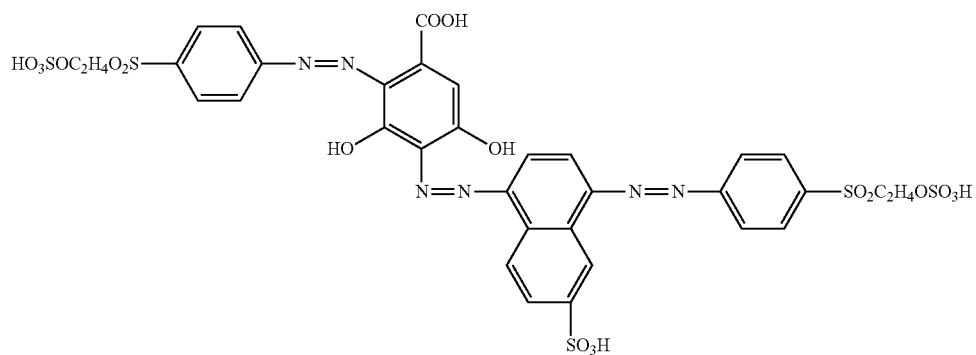
(I-18)
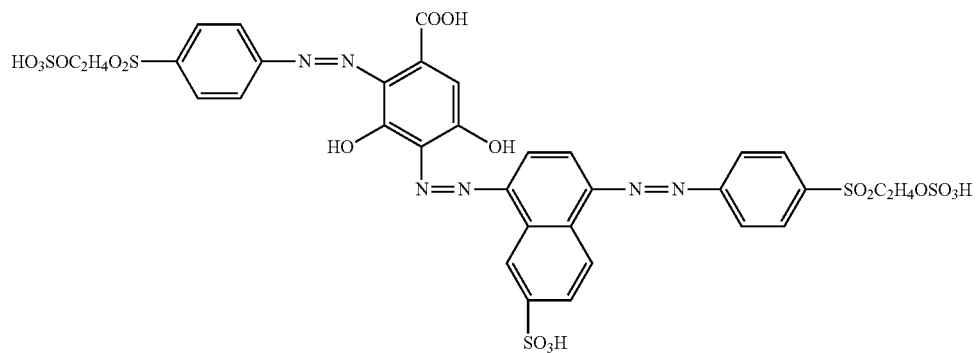
(I-19)
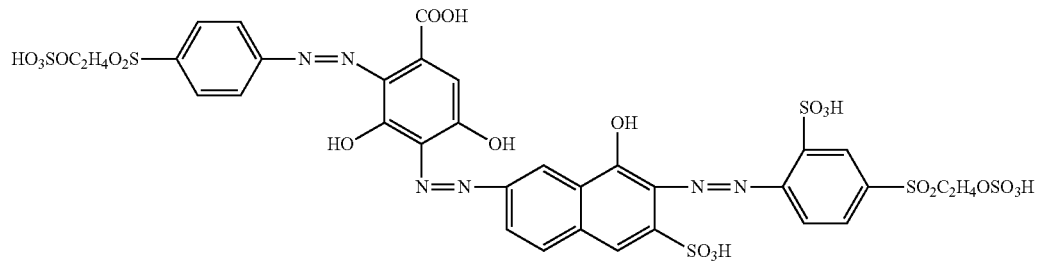
(I-20)
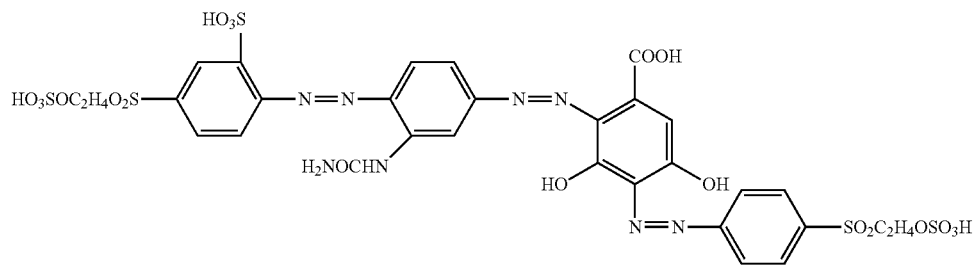
(I-21)

-continued
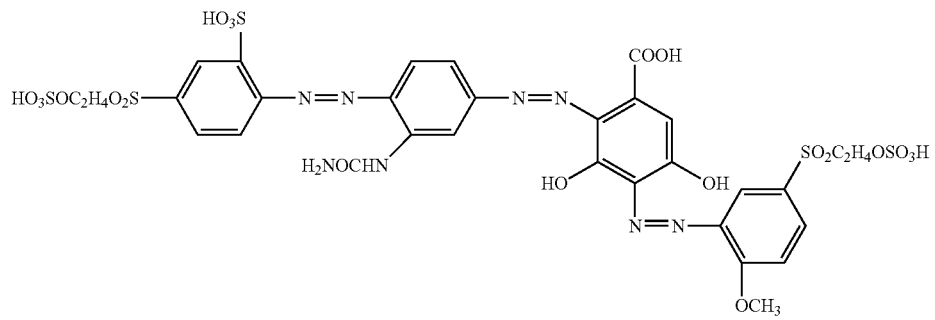
(I-22)
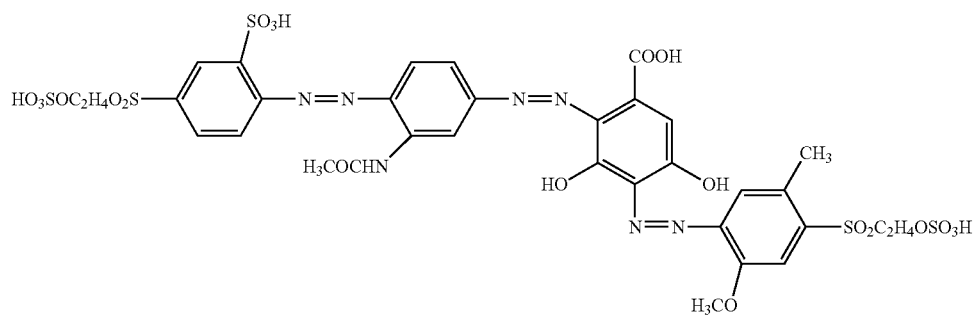
(I-23)
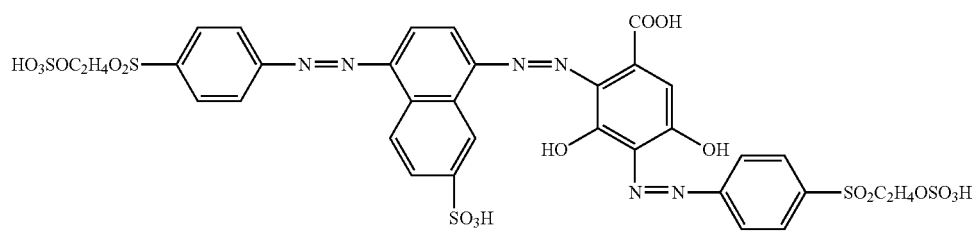
(I-24)
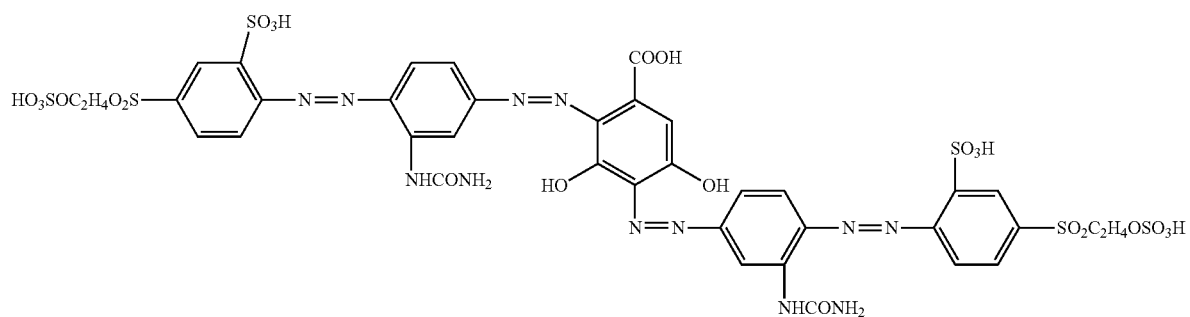
(I-25)
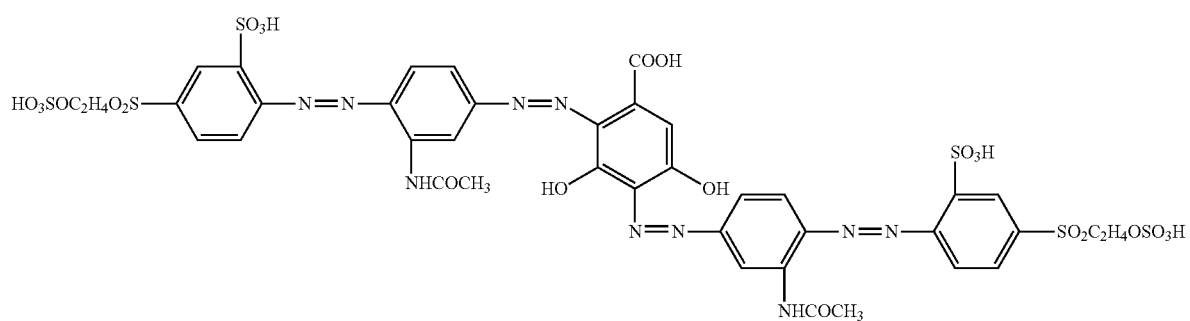
(I-26)

-continued
(I-27)
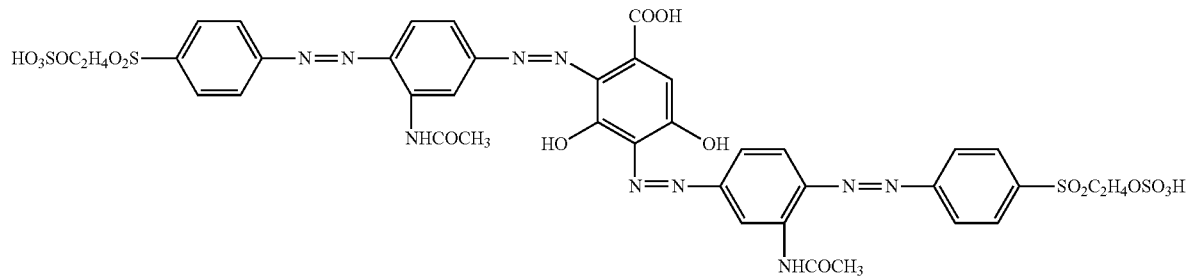
(I-28)
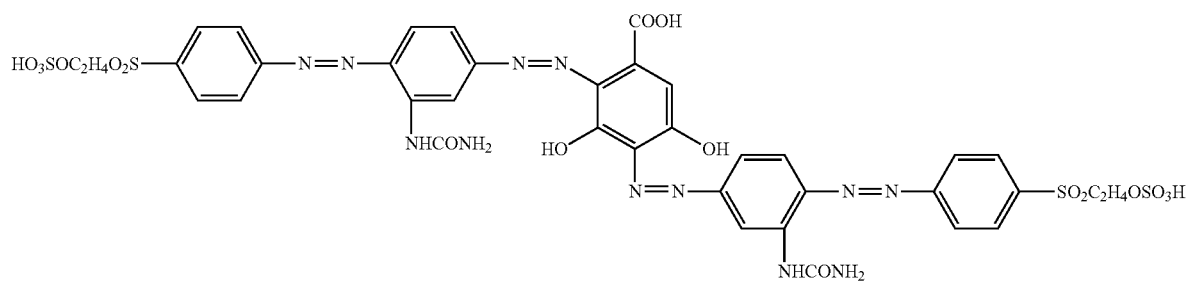
(I-29)
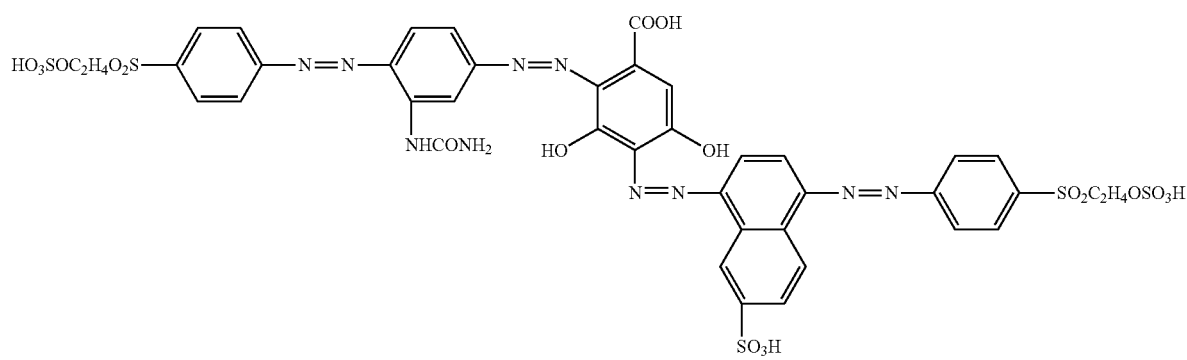
(I-30)
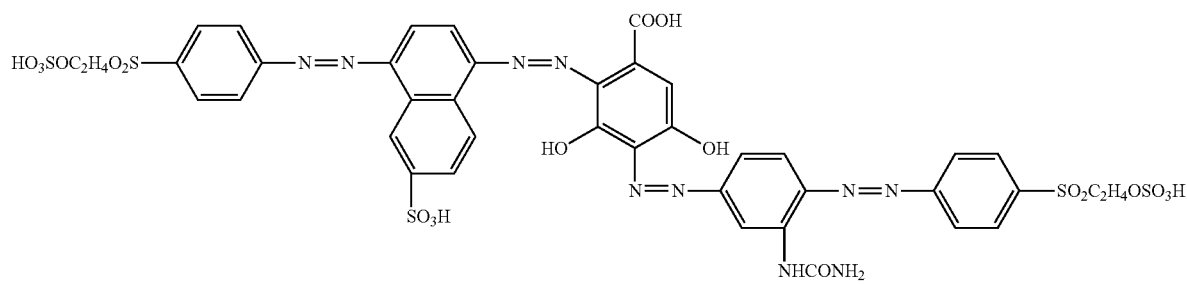
(I-31)
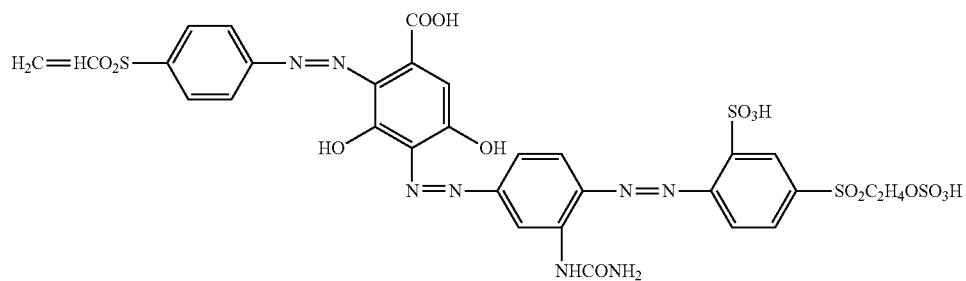

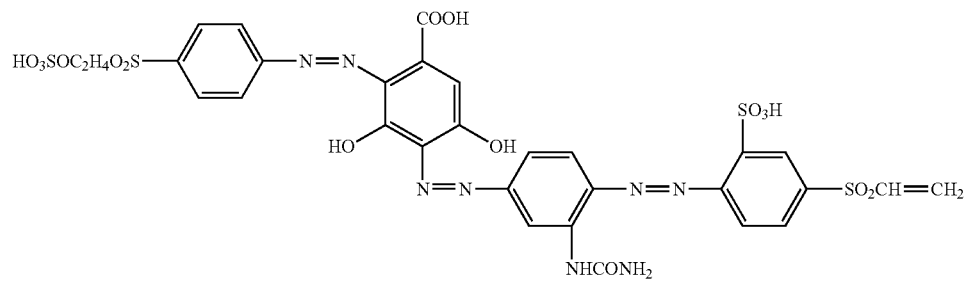
(I-32)
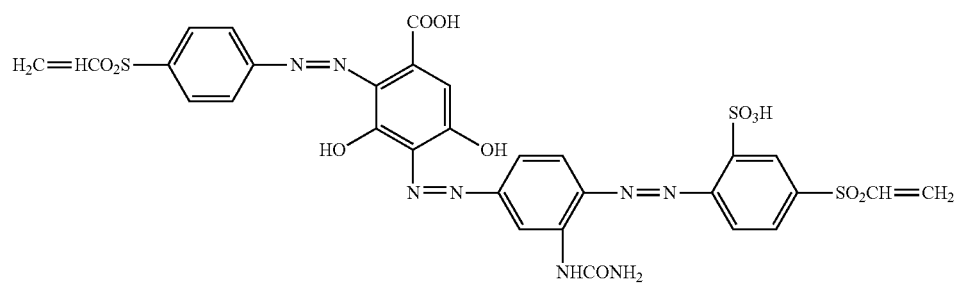
(I-33)
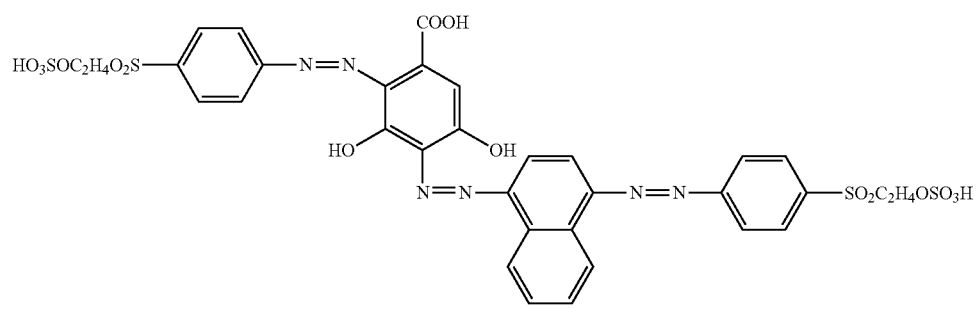
(I-34)
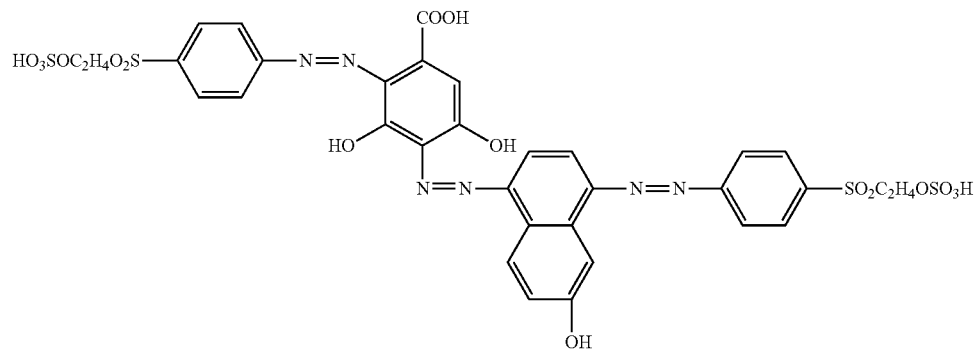
(I-35)
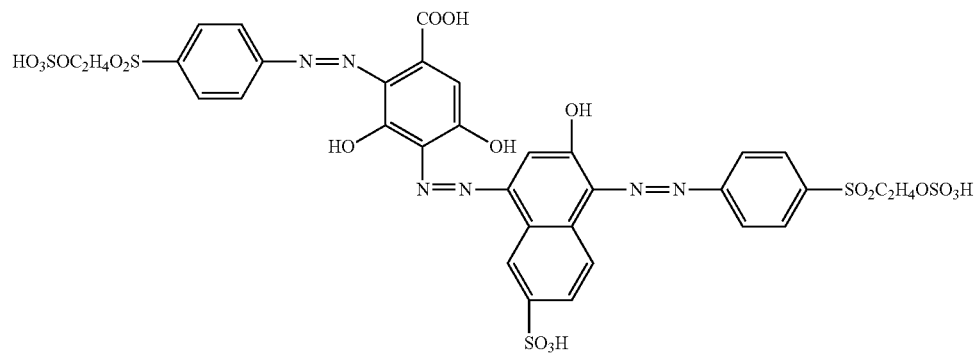
(I-36)

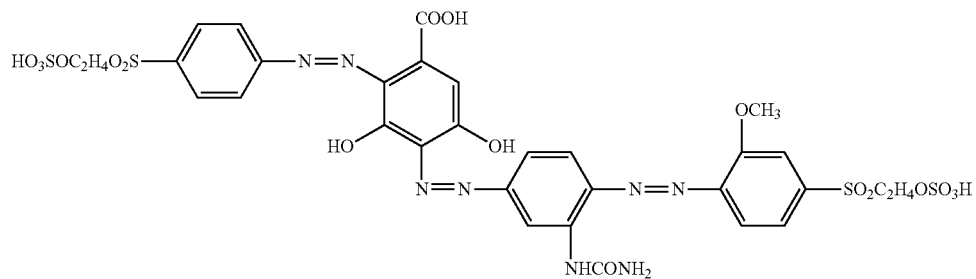
(I-37)
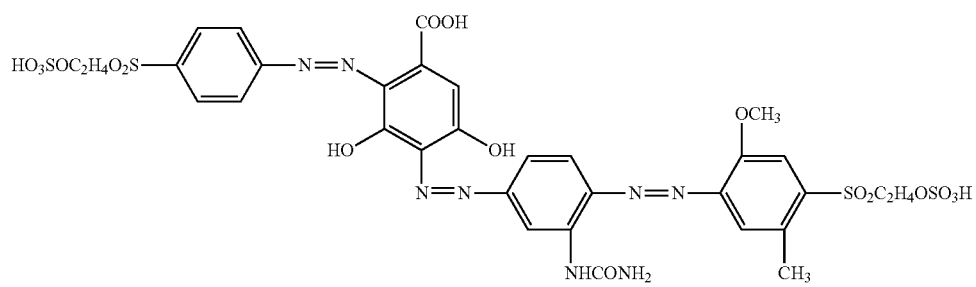
(I-38)
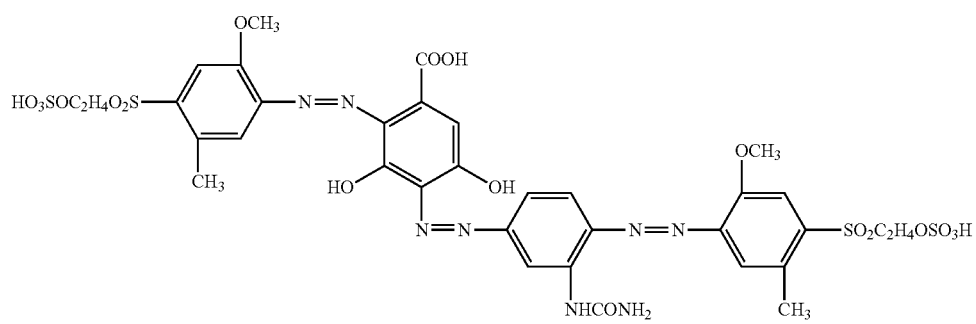
(I-39)
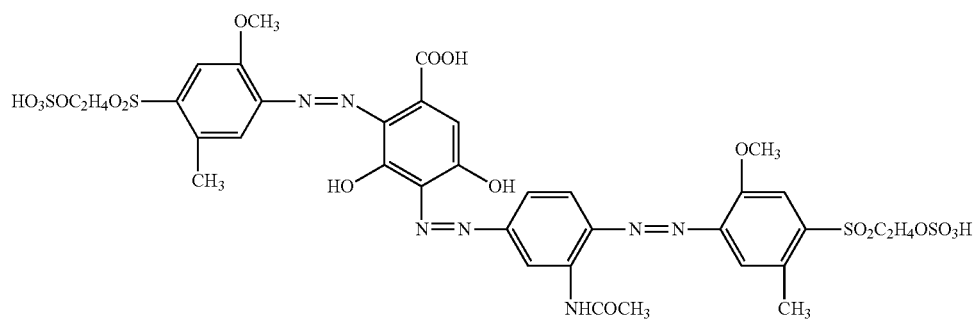
(I-40)
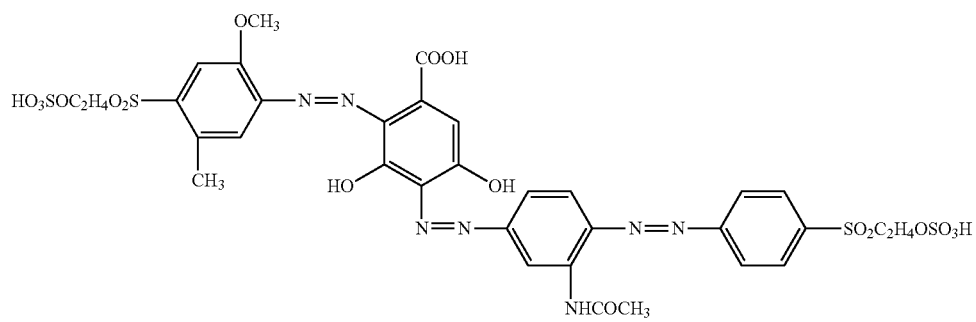
(I-41)

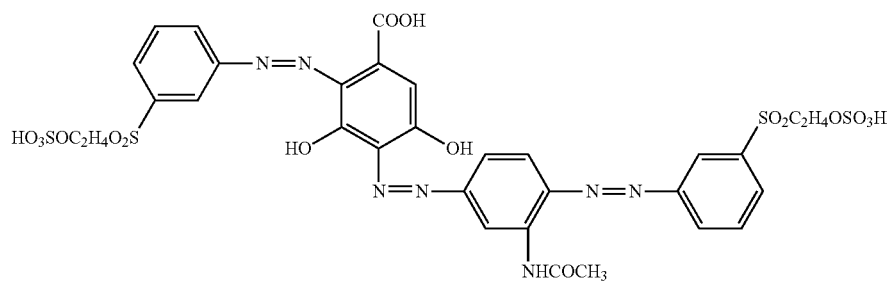
(I-42)
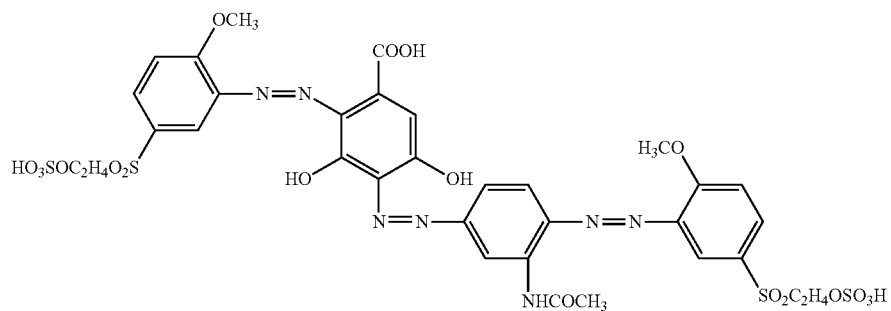
(I-43)
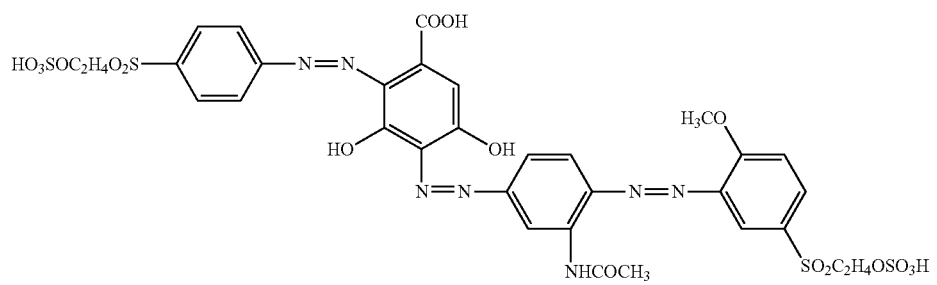
(I-44)
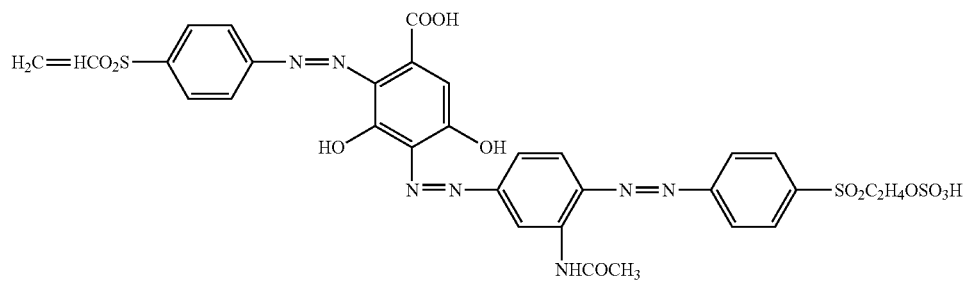
(I-45)
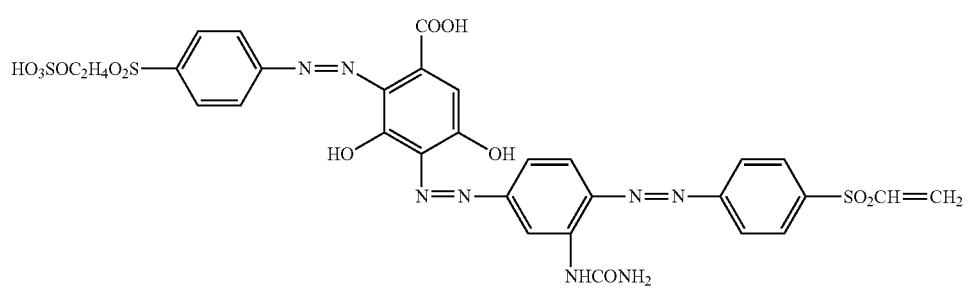
(I-46)

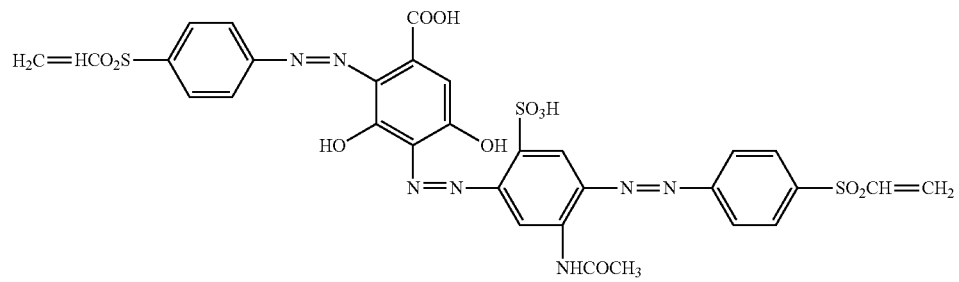
(I-47)
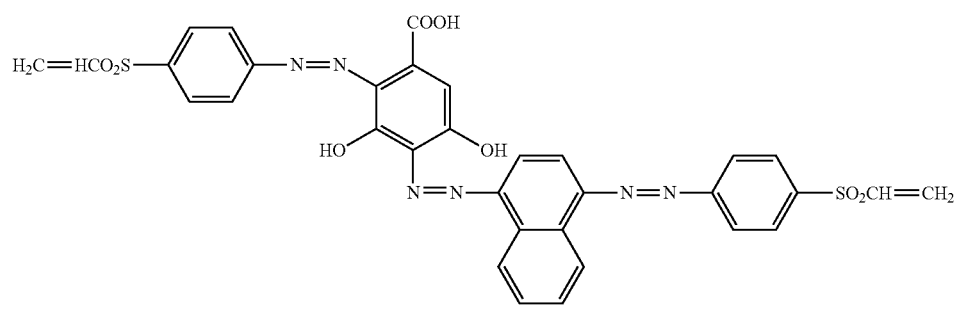
(I-48)
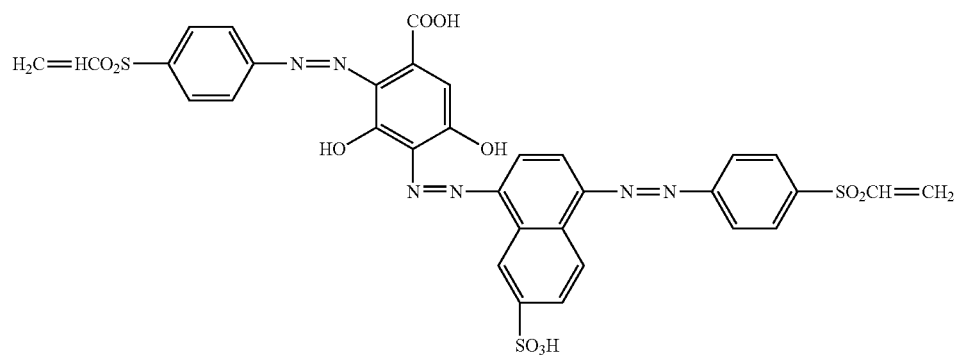
(I-49)
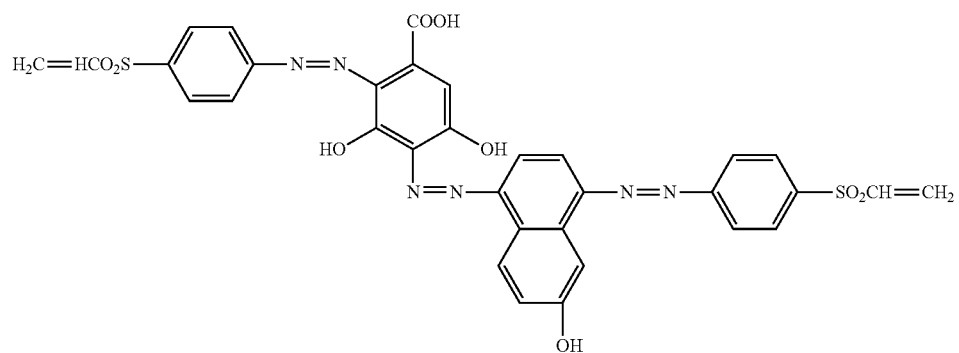
(I-50)
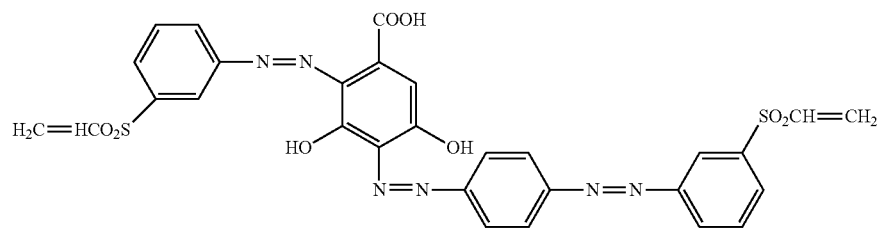
(I-51)

-continued
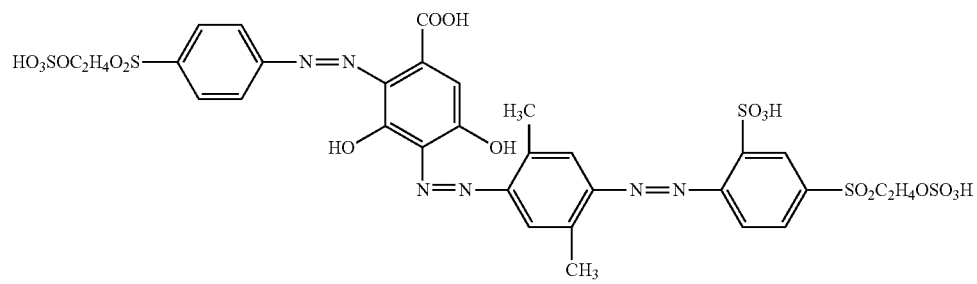
(I-52)
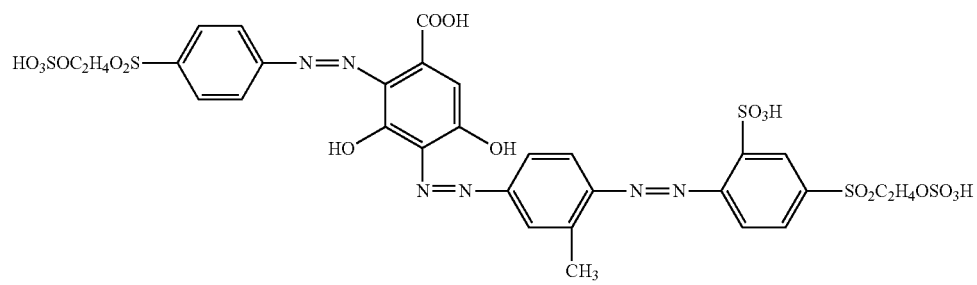
(I-53)
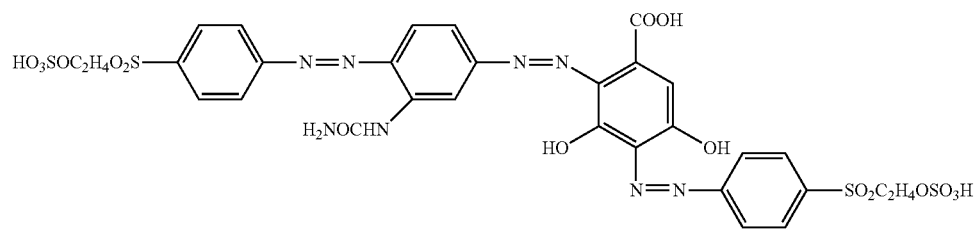
(I-54)
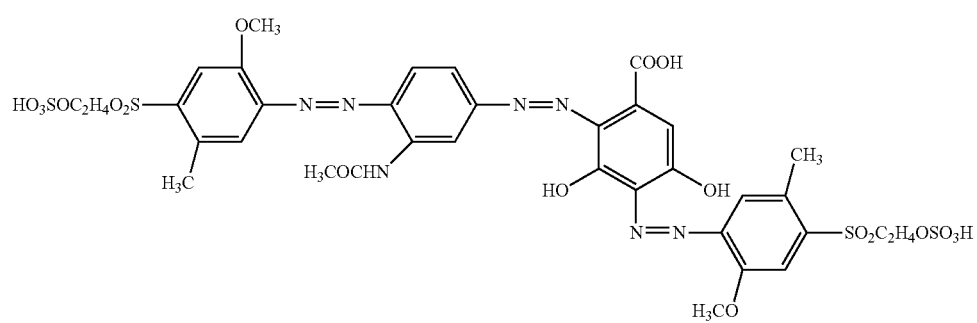
(I-55)
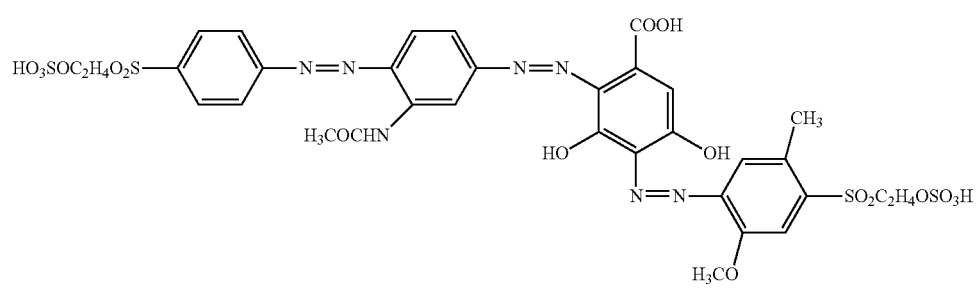
(I-56)

-continued (I-57)
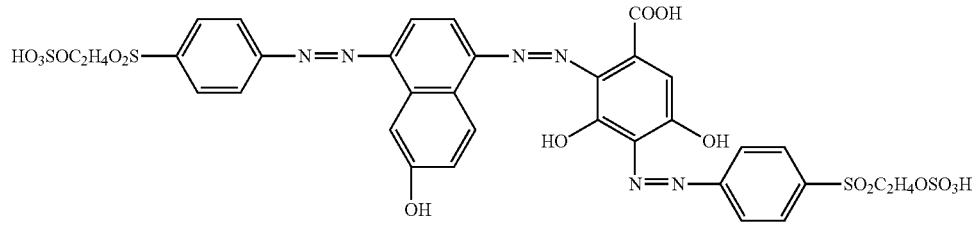

(I-58)
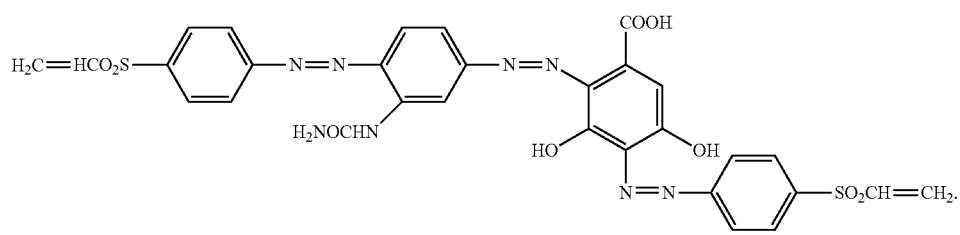

8. The reactive dye compound as claimed in claim 7, wherein the reactive dye compound of formula (I) is selected from the group consisting of the compounds represented by formulae (I-1)~(I-33), (I-52), and (I-53).

9. The reactive dye compound as claimed in claim 7, wherein the reactive dye compound is selected from the group consisting of the compounds represented by formulae (I-1), (I-7), (I-17), (I-18), (I-21), (I-22), (I-24) and (I-25).

10. The reactive dye compound as claimed in claim 1, wherein the reactive dye compound contains a quinohydrazone structure of the following formula (Ib), (Ic), (Id), (Ie), (Ib)
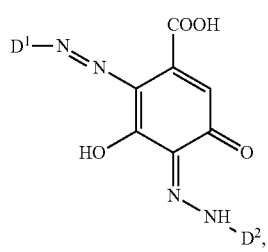

(Ic)
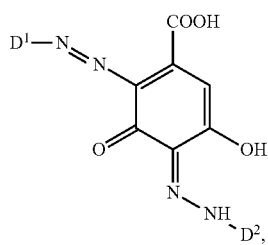

(Id)
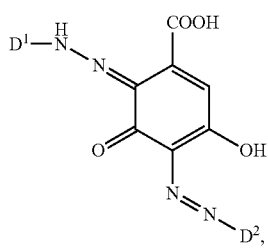

-continued (Ie)
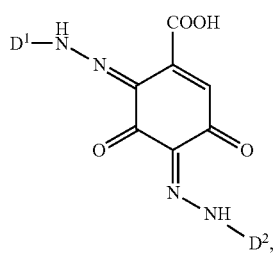

wherein
  each substituent of formula (Ib), (Ic), (Id) and/or (Ie) has the same definition as that of formula (I).

11. The reactive dye compound as claimed in claim 1, wherein the dye compound is prepared and isolated in the form of alkali metal salt in the actual synthesis process for dyeing in the form of alkali metal salt.

12. The reactive dye compound as claimed in claim 11, wherein the alkali metal salt is sodium or potassium salt.

13. The reactive dye compound as claimed in claim 12, wherein the alkali metal salt is sodium salt.

14. A preparation method of the reactive dye compound as claimed in claim 1, comprising:
  (1) diazotization, which is carried out according to the following steps A and B and/or C:
    A: the arylamine compounds represented by formula (IIa), formula (IIb) and/or formula (IIc) are respectively diazotized to obtain respective diazonium salts;
    B: coupling a diazonium salt of a compound of formula (IIb) with an aromatic amine of formula (IIIa) to obtain a compound of formula (IVa), which is subjected to diazotization to obtain a diazonium salt;
    C: coupling a diazonium salt of a compound of formula (IIc) with an aromatic amine of formula (IIIb) to obtain a compound of formula (IVb), which is subjected to diazotization to obtain a diazonium salt;
  (2) coupling reaction, in which 3,5-dihydroxybenzoic acid is added with water and stirred, the resulting solution is first-coupled with a diazonium salt of a compound of formula (IIa), formula (IVa), or formula (IVb) obtained in the step (1), then second-coupled with a diazonium salt of a compound of formula (IIa), formula (IVa), formula (IVb), or the diazonium salts used in the first-coupling and the second-coupling cannot both be the diazonium salt of a compound of formula (IIa), and thus the reactive dye compound (I) is obtained;

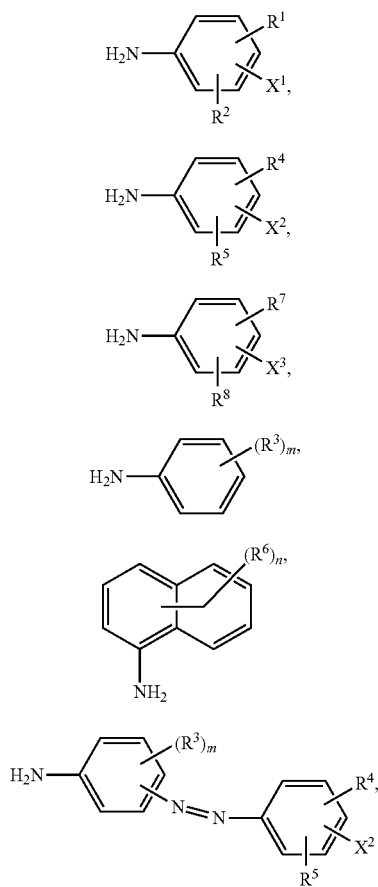

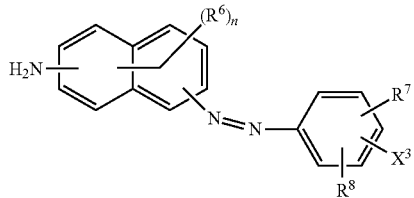

each substituent of formulae (IIa), (IIb), (IIc), (IIIa), (IIIb), (IVa) and (IVb) has the same definition as that of formula (I).

15. A reactive dye product comprising the reactive dye compound as claimed in claim 1 and an auxiliary.

16. The reactive dye product as claimed in claim 15, which contains the reactive dye compound of formula (I) and an auxiliary, wherein the weight of the auxiliary does not exceed 45% of the weight of the reactive dye product.

17. The reactive dye product as claimed in claim 15, wherein the auxiliary is selected from one or more of the following auxiliaries: a naphthalene sulfonic acid formaldehyde condensate, a methylnaphthalenesulfonic acid formaldehyde condensate, a diffusing agent CNF, Yuanming powder, lignosulfonate, sodium acetate, sodium hydrogencarbonate, sodium citrate, sodium dihydrogen phosphate, disodium hydrogen phosphate, and thickener.

18. A method of dying or printing of cellulosic fibers, polyamide fibers or fabrics thereof, the method comprising contacting the reactive dye compound as claimed in claim 1 with the cellulosic fibers, polyamide fibers and fabrics thereof.

19. A method of dying or printing of cellulosic fibers, polyamide fibers or fabrics thereof, the method comprising contacting the reactive dye product as claimed in claim 15 with the cellulosic fibers, polyamide fibers and fabrics thereof.

\* \* \* \* \*